(12) United States Patent
Agblevor et al.

(10) Patent No.: US 11,534,746 B2
(45) Date of Patent: Dec. 27, 2022

(54) RED MUD COMPOSITIONS AND METHODS RELATED THERETO

(71) Applicant: Utah State University, North Logan, UT (US)

(72) Inventors: Foster Agblevor, Logan, UT (US); Hossein Jahromi, Logan, UT (US); Oleksandr Hietsoi, Logan, UT (US); Shereen Hassan, Logan, UT (US)

(73) Assignee: UTAH STATE UNIVERSITY, Logan, UT (US)

( * ) Notice: Subject to any disclaimer, the term of this patent is extended or adjusted under 35 U.S.C. 154(b) by 796 days.

(21) Appl. No.: 16/376,972

(22) Filed: Apr. 5, 2019

(65) Prior Publication Data

US 2019/0308183 A1 Oct. 10, 2019

Related U.S. Application Data

(60) Provisional application No. 62/653,739, filed on Apr. 6, 2018.

(51) Int. Cl.

| | | |
|---|---|---|
| *B01J 37/00* | (2006.01) | |
| *B01J 37/18* | (2006.01) | |
| *B01J 35/10* | (2006.01) | |
| *B01J 35/02* | (2006.01) | |
| *B01J 37/08* | (2006.01) | |

(Continued)

(52) U.S. Cl.
CPC .......... *B01J 37/0072* (2013.01); *B01J 21/04* (2013.01); *B01J 21/20* (2013.01); *B01J 35/023* (2013.01); *B01J 35/1014* (2013.01); *B01J 37/009* (2013.01); *B01J 37/0045* (2013.01); *B01J 37/0221* (2013.01); *B01J 37/08* (2013.01); *B01J 37/18* (2013.01); *B01J 38/10* (2013.01); *C10G 3/44* (2013.01); *C10G 3/62* (2013.01); *B01J 21/08* (2013.01); *B01J 2523/22* (2013.01);

(Continued)

(58) Field of Classification Search
CPC ........ B01J 37/0072; B01J 21/04; B01J 21/20; B01J 35/023; B01J 35/1014; B01J 37/0045; B01J 37/009; B01J 37/0221; B01J 37/08; B01J 37/18; B01J 38/10; C01G 3/44; C01G 3/62

See application file for complete search history.

(56) References Cited

U.S. PATENT DOCUMENTS

| | | |
|---|---|---|
| 3,714,792 A | 2/1973 | Murphy et al. |
| 4,173,454 A | 11/1979 | Heins |

(Continued)

FOREIGN PATENT DOCUMENTS

| | | |
|---|---|---|
| CN | 105950227 A | 9/2016 |
| EP | 2415807 A2 | 2/2012 |
| WO | 20110103313 A2 | 8/2011 |

OTHER PUBLICATIONS

Uysal, Bekir Zuhtu, et al., "Sorption of SO2 on Metal Oxides in a Fluidized Bed", Ind. Eng. Chem. Res. 27, 1988, pp. 434-439.

(Continued)

*Primary Examiner* — James A Fiorito
(74) *Attorney, Agent, or Firm* — Armstrong Teasdale LLP

(57) ABSTRACT

This disclosure relates to red mud compositions. This disclosure also relates to methods of making red mud compositions. This disclosure additionally relates to methods of using red mud compositions.

26 Claims, 56 Drawing Sheets
(9 of 56 Drawing Sheet(s) Filed in Color)

(51) Int. Cl.
  B01J 38/10 (2006.01)
  C10G 3/00 (2006.01)
  B01J 21/04 (2006.01)
  B01J 21/20 (2006.01)
  B01J 37/02 (2006.01)
  B01J 21/08 (2006.01)
(52) U.S. Cl.
  CPC . *B01J 2523/847* (2013.01); *C10G 2300/1011* (2013.01); *C10G 2300/70* (2013.01)

(56) References Cited

U.S. PATENT DOCUMENTS

| | | |
|---|---|---|
| 4,303,497 A | 12/1981 | Mitchell et al. |
| 5,014,462 A | 5/1991 | Malmgren et al. |
| 5,045,179 A | 9/1991 | Langhoff et al. |
| 5,389,691 A | 2/1995 | Cha et al. |
| 8,202,332 B2 | 1/2012 | Agblevor |
| 8,329,967 B2 | 12/2012 | Brandvold et al. |
| 8,389,433 B2 | 3/2013 | Mironov et al. |
| 8,784,513 B2 | 7/2014 | Iversen et al. |
| 9,487,708 B2 | 11/2016 | Doucet et al. |
| 9,580,659 B2 | 2/2017 | Macdonnell et al. |
| 2002/0125172 A1 | 9/2002 | Que et al. |
| 2009/0266541 A1 | 10/2009 | Reynolds |
| 2009/0301930 A1 | 12/2009 | Brandvold et al. |
| 2010/0224576 A1 | 9/2010 | Iannicelli |
| 2011/0213188 A1 | 9/2011 | Agblevor et al. |
| 2012/0142520 A1 | 6/2012 | Bartek et al. |
| 2012/0204481 A1 | 8/2012 | Corredores et al. |
| 2014/0309467 A1 | 10/2014 | O'Connor |
| 2015/0065762 A1 | 3/2015 | Agblevor et al. |
| 2016/0032198 A1* | 2/2016 | Schleiffer ............... B01J 8/008 585/350 |
| 2019/0062647 A1* | 2/2019 | Sollberger ............. C10G 47/04 |
| 2021/0284916 A1* | 9/2021 | Iversen .................. C10G 3/44 |

OTHER PUBLICATIONS

Vermeulen, et al., "Automotive shredder residue (ASR): Reviewing its production from end-of-life vehicles (ELVs) and its recycling, energy or chemicals' valorisation", Journal of Hazardous Materials 190, 2011, pp. 8-27.
Veses, et al., "Production of upgraded bio-oils by biomass catalytic pyrolysis in an auger reactor using low cost materials", Fuel 141, 2015, pp. 17-22.
Wang, Shaobin, et al., "Novel applications of red mud as coagulant, adsorbent and catalyst for environmentally benign processes", Chemosphere 72, 2008, pp. 1621-1635.
Willaims, Paul T., "Pyrolysis of waste tyres: A review", Waste Management 33, 2013, pp. 1714-1728.
Williams, Paul T., "Pyrolysis-thermogravimetric analysis of tyres and tyre components", Fuel vol. 74 No. 9, 1995, pp. 1277-1283.
Yathavan, et al., "Catalytic Pyrolysis of Pinyon-Juniper Using Red Mud and HZSM-5", dx.doi.org/10.1021/ef401853a | Energy Fuels 2013, 27, 2013, pp. 6858-6865.
Zhang, L.Y., et al., "Biodiesel preparation from Jatropha oil catalyzed by KF/Red mud catalyst", Energy Sources, Part A: Recovery, Utilization, and Environmental Effects, 38:12, 2016, pp. 1713-1720.
Peters, Jonathan E, et al., "Catalytic Upgrading of Switchgrass Pyrolysis Bio-oil Vapors", 2010 Annual Meeting of American Institute of Chemical Engineers, Salt Lake City, UT, Nov. 2010, 9 pages.
Halouani, Kamel et al., "Catalytic pyrolysis of olive mill wastewater sludge to produce biofuels", 2014 Annual Meeting of American Institute of Chemical Engineers, Atlanta, GA, Nov. 2014, 32 pages.
Abdellaoui, Hamza, et al., "Catalytic Pyrolysis of Olive Mill Wastewater Sludge", Utah State University All Graduate Theses and Dissertation, Paper 4468, 2015, 154 pages.
Agblevor, F.A., et al., "Catalytic Pyrolysis of Pinyon-Juniper Using Red Mud and HZSM-5", Energy Fuels, 27, 2013, pp. 6858-6865.

Agblevor, et al., "Red Mud Catalytic Pyrolysis of Pinyon Juniper and Single-Stage Hydrotreatment of Oils", DOI: 10.1021/acs. energyfuels.6b00925 Energy Fuels 2016, 2016, pp. 7947-7958.
Alsaleh, Ali, et al., "Waste Tire Pyrolysis: Influential Parameters and Product Properties", Curr Sustainable Renewable Energy Rep, 2014, pp. 129-135.
Alvarez, et al., "A new method for enhancing the performance of red mud as a hydrogenation catalyst", Applied Catalysis A: General 180, 1999, pp. 399-409.
Antoniou, N., et al., "Features of an efficient and environmentally attractive used tyres pyrolysis with energy and material recovery", Renewable and Sustainable Energy Reviews 20, 2013, pp. 539-558.
Bowman, Daniel C., et al., "Growth of Chrysanthemum with Ground Automobile Tires Used as a Container Soil Amendment", Hortscience 29(7), 1994, pp. 774-776.
Boxiong, Shen, et al., "Pyrolysis of waste tyres: The influence of USY catalyst/tyre ratio on products", J. Anal. Appl. Pyrolysis 78, 2007, pp. 243-249.
Buessing, Li, "Energy from olive mill waste: Pyrolysis and oxidation kinetics of olive mill waste", University of New Hampshire, Durham, Master's Theses and Capstones, Spring 2012, 119 pages.
Cristina De Resende, Ellane, "Red Mud Waste From the Bayer Process as a Catalyst for the Desulfurization of Hydrocarbon Fuels", RSC Adv., DOI: 10.1039/C4RA07635D, 2014, 35 pages.
Demirbas, A., "API Gravity, Sulfur Content, and Desulfurization of Crude Oil", Petroleum Science and Technology, 33, 2015, pp. 93-101.
Deng, Li, et al., "Upgraded Acidic Components of Bio-oil through Catalytic Ketonic Condensation", Energy & Fuels 23, 2009, pp. 564-568.
Fan, Hui-Ling, et al., "Testing of Iron Oxide Sorbent for High-Temperature Coal Gas Desulfurization", Energy Sources, 27, 2005, pp. 245-250.
Gaertner, Christian A., et al., "Catalytic coupling of carboxylic acids by ketonization as a processing step in biomass conversion", Journal of Catalysis 266, 2009, pp. 71-78.
Gungor, et al., "Comparison between the "one-step" and "two-step" catalytic pyrolysis of pine bark", Journal of Analytical and Applied Pyrolysis 97, 2012, pp. 39-48.
Hietsoi, Oleksandr, "Literature Survey : Catalytic Tire Pyrolysis on Red Mud", Jan. 18, 2017, 8 pages.
Hita, Iodia, et al., "Opportunities and barriers for producing high quality fuels from the pyrolysis of scrap tires", Renewable and Sustainable Energy Reviews 56, 2016, pp. 745-759.
Islam, M. Rofiqul, et al., "Production of liquid fuels and chemicals from pyrolysis of Bangladeshi bicycle/rickshaw tire wastes", J. Anal. Appl. Pyrolysis 82, 2008, pp. 96-109.
Juma, M., et al., "Pyrolysis and Combustion of Scrap Tire", Petroleum & Coal 48 (1), 2006, pp. 15-26.
Kannan, M., et al., "Analyzing the characteristics of fuel extracted by catalytic conversion of waste engine oil", Energy Sources, Part A: Recovery, Utilization, and Environmental Effects, 38:12, 2016, pp. 1685-1692.
Karimi, et al., "Red Mud as a Catalyst for the Upgrading of Hemp-Seed Pyrolysis Bio-oil", Energy Fuels 2010, 24 : DOI:10.1021/ef101154d, 2010, pp. 6586-6600.
Karimi, et al., "Synergistic co-processing of an acidic hardwood derived pyrolysis bio-oil with alkaline Red Mud bauxite mining waste as a sacrificial upgrading catalyst", Applied Catalysis B: Environmental 145, 2014, pp. 187-196.
Karimi, et al., "Thermal Decomposition of Acetic and Formic Acid Catalyzed by Red Mud;Implications for the Potential Use of Red Mud as a Pyrolysis Bio-Oil Upgrading Catalyst", Energy Fuels 2010, 24: DOI:10.1021/ef1000375, 2010, pp. 2747-2757.
Kastner, James R., et al., "Continuous catalytic upgrading of fast pyrolysis oil using iron oxides in red mud", RSC Adv. 5, 2015, pp. 29375-29385.
Kelkara, Shantanu, et al., "A survey of catalysts for aromatics from fast pyrolysis of biomass", Applied Catalysis B: Environmental 174-175, 2015, pp. 85-95.

(56) References Cited

OTHER PUBLICATIONS

Khoshgoftarmanesh, Amir Hossein, et al., "Bacterial inoculation speeds zinc release from ground tire rubber used as Zn fertilizer for corn and sunflower in a calcareous soil", Plant Soil 361, 2012, pp. 71-81.

Kumaravel, S.T., et al., "Tyre pyrolysis oil as an alternative fuel for diesel engines—A review", Renewable and Sustainable Energy Reviews 60, 2016, pp. 1678-1685.

Liu, Qiang, et al., "Application of red mud as a basic catalyst for biodiesel production", Journal of Environmental Sciences 25(4), 2013, pp. 823-829.

Lopez, et al., "Catalytic pyrolysis of plastic wastes with two different types of catalysts: ZSM-5 zeolite and Red Mud", Applied Catalysis B: Environmental 104, 2011, pp. 211-219.

Ma, et al., "Heterogeneous Catalysis by Metals", Encyclopedia of Inorganic Chemistry, Online © 2006 John Wiley & Sons, Ltd., 2006, 17 pages.

Martinez, Juan Daniel, et al., "Waste tyre pyrolysis—A review", Renewable and Sustainable Energy Reviews 23, 2013, pp. 179-213.

Mohan, Dinesh, et al., "Pyrolysis of Wood/Biomass for Bio-oil: A Critical Review", Energy & Fuels 20, 2006, pp. 848-889.

Mui, Edward L.K., et al., "Production of active carbons from waste tyres—a review", Carbon 42, 2004, pp. 2789-2805.

Newman, Steven E., et al., "Final Report: Adaptation of Waste Tire Rubber for Greenhouse Media and Zinc Fertilizers", Colorado Advanced Materials / Institute Colorado School of Mines, 13 pages.

Ngo, Thanh-An, et al., "Pyrolysis of soybean oil with H-ZSM5 (Proton-exchange of Zeolite Socony Mobil #5) and MICM41 (Mobil Composition of Matter No. 41) catalysts in a fixed-bed reactor". Energy 35, 2010, pp. 2723-2728.

Osayi, Julius I., et al., "Review Article Biocrude Production through Pyrolysis of Used Tyres", Hindawi Publishing Corporation, Journal of Catalysts, vol. 2014, Article ID 386371, 2014, 9 pages.

Parades, C., et al., "Bio-degradation of olive mill wastewater sludge by its co-composting with agricultural wastes", Bioresource Technology 85, 2002, pp. 1-8.

Parthasarathy, Prakash, et al., "Influence of process conditions on product yield of waste tyre pyrolysis—A review", Korean J. Chem. Eng., 33(8), 2016, pp. 2268-2286.

Quek, Augustine, et al., "Liquefaction of waste tires by pyrolysis for oil and chemicals—A review", Journal of Analytical and Applied Pyrolysis 101, 2013, pp. 1-16.

Quek, Augustine, et al., "Mathematical modeling of rubber tire pyrolysis", Journal of Analytical and Applied Pyrolysis 95, 2012, pp. 1-13.

Reed, Anton R., et al., "Thermal processing of biomass natural fibre wastes by pyrolysis", International Journal of Energy Research Int. J. Energy Res. 28, 2004, pp. 131-145.

Roy, Christian, et al., "Conversion of Used Tires to Carbon Black and Oil by Pyrolysis", Rubber-Recycling, 2005, pp. 429-467.

Sahu, Ramesh Chandra, et al., "Removal of hydrogen sulfide using red mud at ambient conditions", Fuel Processing Technology 92, 2011, pp. 1587-1592.

Saleh, Tawfik A., et al., "Processing methods, characteristics and adsorption behavior of tire derived carbons: A review", Advances in Colloid and Interface Science 211, 2014, pp. 93-101.

Senthil, M., et al., "Investigations of red mud as a catalyst in Mahua oil biodiesel production and its engine performance", Fuel Processing Technology 149, 2016, pp. 7-14.

Song, Chunshan, "An overview of new approaches to deep desulfurization for ultra-clean gasoline, diesel fuel and jet fuel", Catalysis Today 86, 2003, pp. 211-263.

Stranges, Anthony N., "From Birmingham to Billingham: High-Pressure Coal Hydrogenation in Great Britain", Technology and Culture, vol. 26, No. 4, Oct. 1985, pp. 726-757.

Sushil, Snigdha, et al., "Catalytic applications of red mud, an aluminium industry waste: A review", Applied Catalysis B: Environmental 81, 2008, pp. 64-77.

Taheri, Soraya, et al., "Kinetics of zinc release from ground tire rubber and rubber ash in a calcareous soil as alternatives to Zn fertilizers", Plant Soil 341, 2011, pp. 89-97.

Undri, Andrea, et al., "Upgraded fuel from microwave assisted pyrolysis of waste tire", Fuel 115, 2014, pp. 600-608.

* cited by examiner

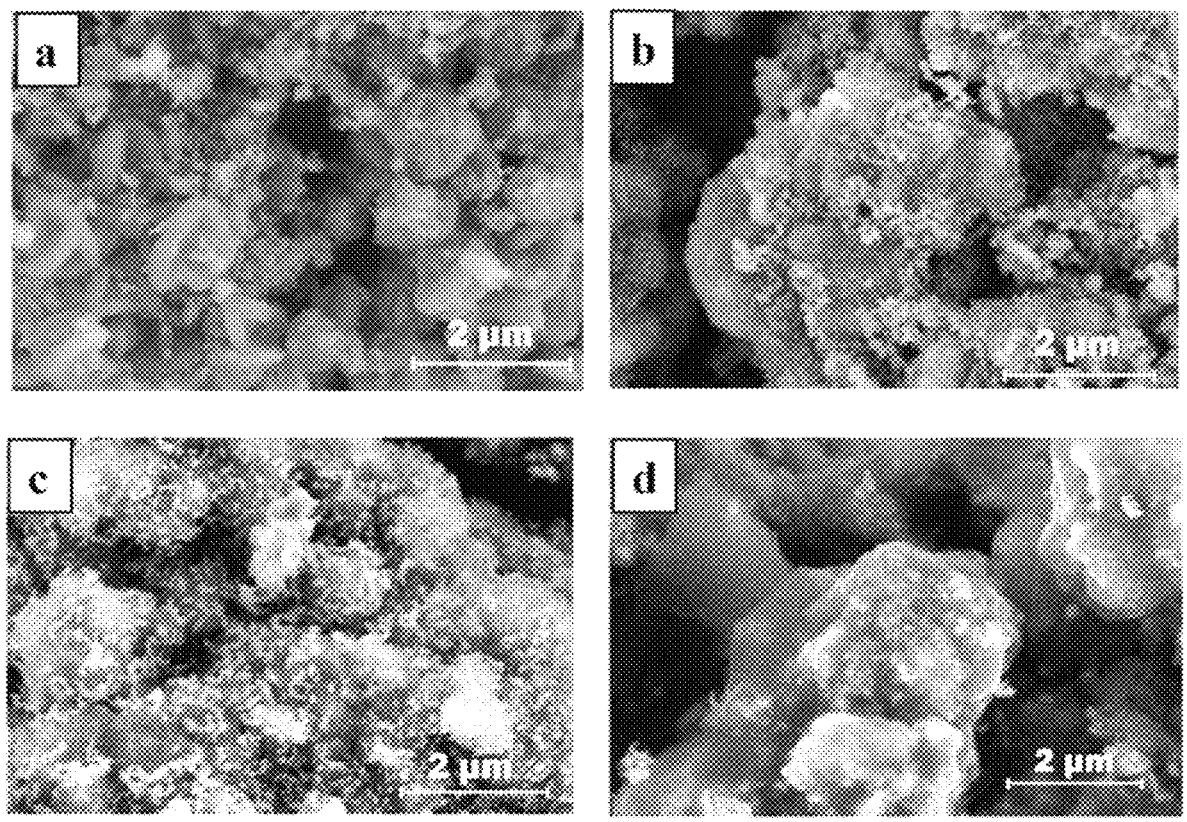
Figs. 12a-d

Figs. 17a-c

| Pot# | Rep | Soil Series | Soil Text | Soil Orig | Wt soil | Wt char | P | K | Ca | Mg | Zn | Mn | Cu | Fe | B | Al |
|---|---|---|---|---|---|---|---|---|---|---|---|---|---|---|---|---|
| 1 | 1 | Bojac | Sandy loam | Suffoik | 100 | 0 | 62 | 137 | 392 | 59 | 1.4 | 8 | 2.3 | 35 | 0.7 | 222 |
| 2 | 2 | Bojac | Sandy loam | Suffoik | 100 | 0 | 62 | 142 | 372 | 59 | 1.3 | 8 | 2.1 | 36 | 1.6 | 229 |
| 3 | 3 | Bojac | Sandy loam | Suffoik | 100 | 0 | 60 | 133 | 368 | 57 | 1.3 | 8 | 2.3 | 35 | 0.7 | 222 |
| 4 | 1 | Bojac | Sandy loam | Suffoik | 90 | 10 | 113 | 193 | 522 | 117 | 147 | 13 | 0.2 | 82 | 2.5 | 256 |
| 5 | 2 | Bojac | Sandy loam | Suffoik | 90 | 10 | 116 | 226 | 574 | 127 | 149 | 13 | 0.2 | 85 | 3.0 | 261 |
| 6 | 3 | Bojac | Sandy loam | Suffoik | 90 | 10 | 118 | 207 | 576 | 129 | 160 | 13 | 0.2 | 84 | 3.2 | 266 |
| 7 | 1 | Bradd | Loam | Kentland | 100 | 0 | 23 | 344 | 1216 | 355 | 3.5 | 53 | 1.1 | 8.1 | 2.4 | 239 |
| 8 | 2 | Bradd | Loam | Kentland | 100 | 0 | 24 | 356 | 1234 | 371 | 3.6 | 57 | 1.0 | 7.9 | 2.2 | 245 |
| 9 | 3 | Bradd | Loam | Kentland | 100 | 0 | 24 | 343 | 1263 | 360 | 3.4 | 58 | 1.1 | 7.7 | 1.6 | 250 |
| 10 | 1 | Bradd | Loam | Kentland | 90 | 10 | 52 | 381 | 1297 | 392 | 132 | 111 | 0.3 | 9.1 | 3.8 | 269 |
| 11 | 2 | Bradd | Loam | Kentland | 90 | 10 | 55 | 391 | 1336 | 405 | 142 | 115 | 0.4 | 11 | 3.0 | 278 |
| 12 | 3 | Bradd | Loam | Kentland | 90 | 10 | 51 | 387 | 1244 | 380 | 144 | 119 | 0.4 | 10. | 3.3 | 275 |

Bradd= Braddock; Soil text = soil texture; Soil orig = soil origin; rep = replicates

Fig. 57

RED MUD COMPOSITIONS AND METHODS RELATED THERETO

CROSS-REFERENCE TO RELATED APPLICATIONS

The application claims the benefit of U.S. Provisional Patent Application No. 62/653,739, filed on Apr. 6, 2018, and titled "RED MUD COMPOSITIONS AND METHODS RELATED THERETO," the entire disclosure of which is hereby incorporated herein by reference.

FEDERALLY SPONSORED RESEARCH OR DEVELOPMENT

This invention was made with government support under contract no. 1445735 awarded by the National Science Foundation, U.S. Dept. of Energy grant no. 200983 awarded by the Battelle Memorial Institute, and U.S. Dept. of Energy grant no. PNNL347647 awarded by the Pacific Northwest National Laboratory. The government has certain rights in the invention.

COPYRIGHT NOTICE

© 2019 Utah State University. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates generally to enhanced industrial byproducts. In particular, this disclosure relates to red mud compositions and methods related thereto.

BACKGROUND

"Red mud" is a waste stream byproduct produced during the Bayer alumina process. In the Bayer process, bauxite is treated with hot sodium hydroxide to produce alumina. Along with the alumina, bauxite also contains a large amount of oxides of other materials, such as iron, silica, titanium, and other elements. As part of the Bayer process, these other materials are separated from the alumina to become a waste stream. This stream is referred to as red mud.

Red mud compositions may be useful in a variety of catalytic processes. A need exists for alternative red mud compositions that can be used with existing catalytic processes and also give rise to additional catalytic processes.

SUMMARY

Red mud compositions are disclosed herein, such as compositions comprising dried and calcined catalytic particles including red mud and one or more additives, wherein the particles comprise at least about 50% red mud by weight.

Methods of making red mud compositions are also disclosed herein, such as methods comprising mixing a slurry of red mud and one or more additives, drying the mixture at a first temperature, and calcining the dried mixture at a second temperature higher than the first temperature to form dried and calcined catalytic particles comprising red mud and the one or more additives.

Methods of using red mud compositions are also disclosed herein, such as methods of hydrotreating or pyrolyzing a material with the compositions disclosed herein.

Aspects and advantages of the compositions and related methods will be apparent from the following detailed description of disclosed embodiments, which proceeds with reference to the accompanying drawings.

BRIEF DESCRIPTION OF THE DRAWINGS

The embodiments disclosed herein will become more fully apparent from the following description and appended claims, taken in conjunction with the accompanying drawings. The patent or application file contains at least one drawing executed in color. Copies of this patent or patent application publication with color drawing(s) will be provided by the Office upon request and payment of the necessary fee. As the color drawings are being filed electronically via EFS-Web, only one set of the drawings is submitted. The drawings depict primarily generalized embodiments, which embodiments will be described with additional specificity and detail in connection with the drawings in which:

FIG. 12a depicts an SEM image of the red mud support of Example 1.

FIG. 12b depicts an SEM image of the 40% Ni/RM (calcined form) used in Example 1.

FIG. 12c depicts an SEM image of the 40% Ni/RM (reduced form) used in Example 1.

FIG. 12d depicts an SEM image of the used 40% Ni/RM catalyst from Example 1.

FIG. 57 lists results of the Mehlich-1 test on biochar and various soil combinations in Example 5.

DETAILED DESCRIPTION

Figure 1:
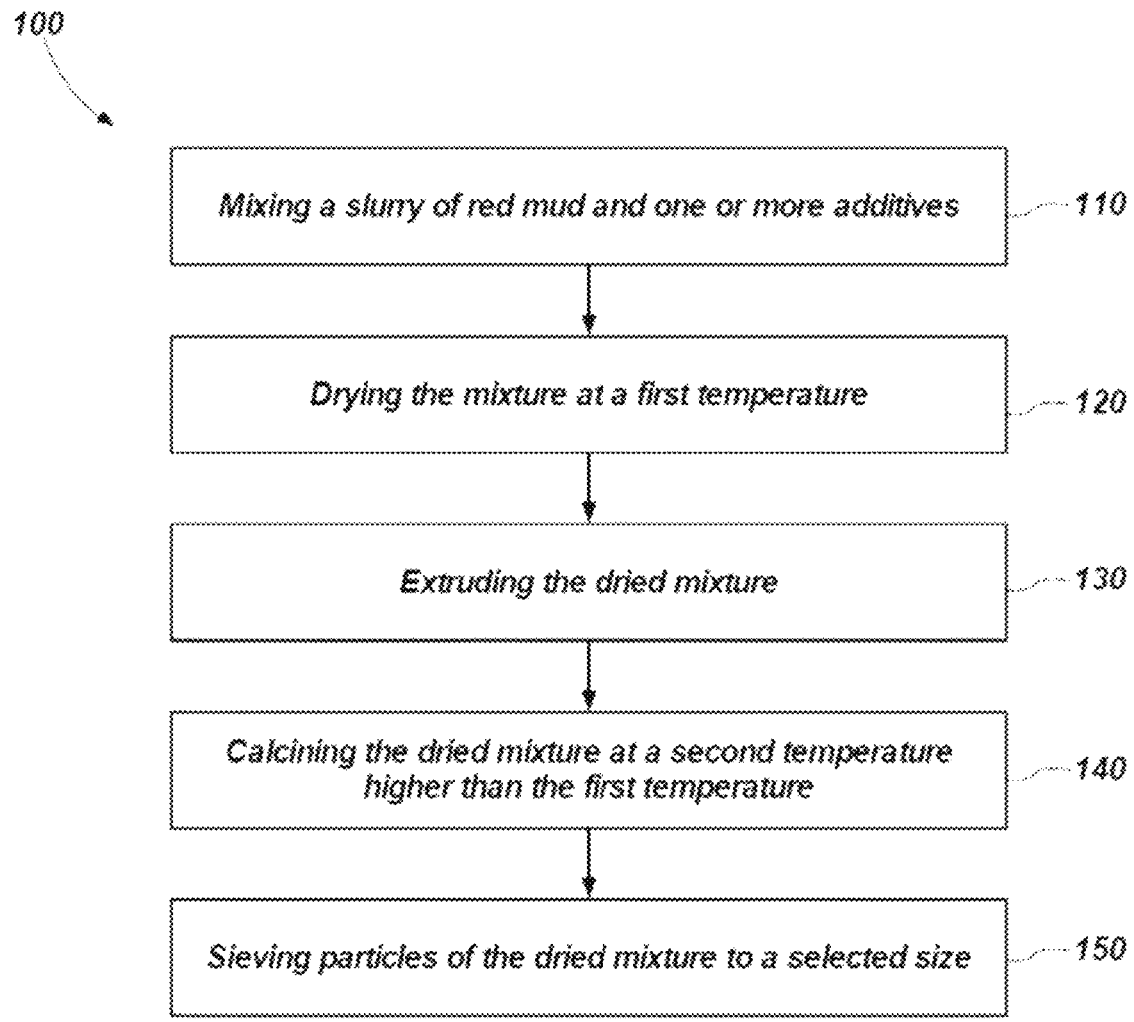
FIG. 1 illustrates one embodiment of making certain compositions disclosed herein.
Figure 2:
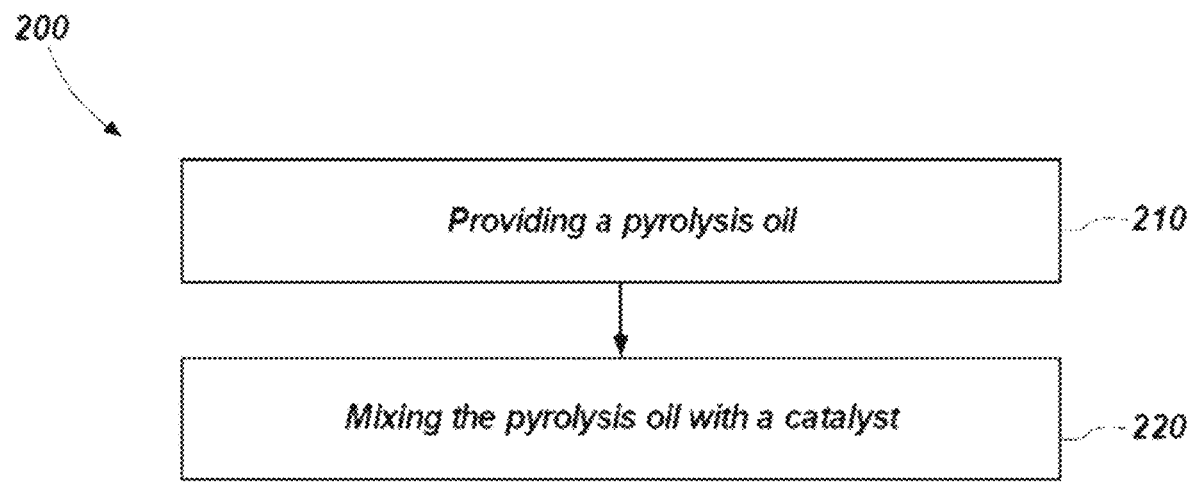
FIG. 2 illustrates one embodiment of using certain compositions disclosed herein.
Figure 3:
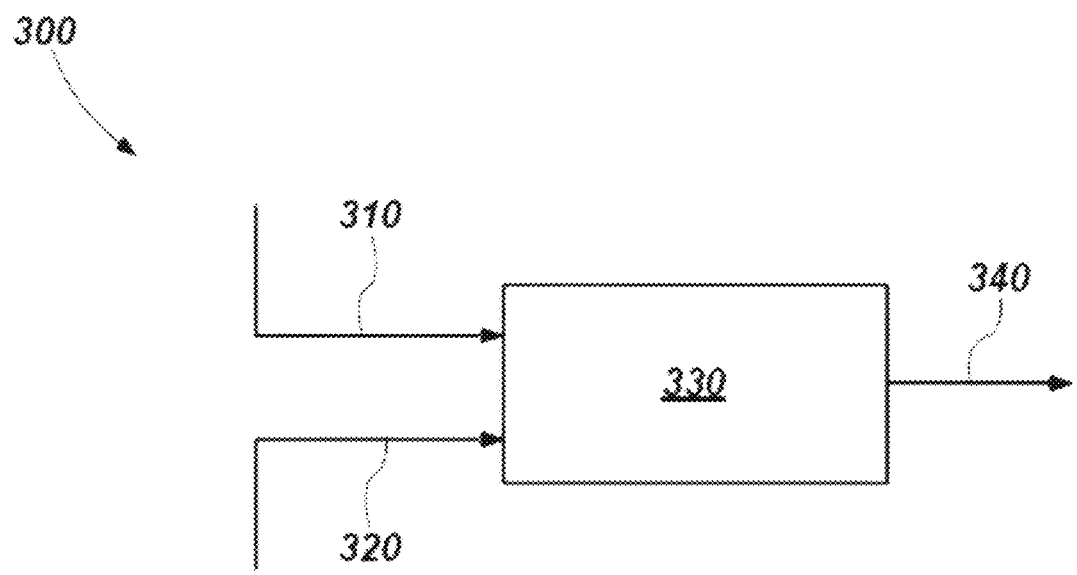
FIG. 3 illustrates another embodiment of using certain compositions disclosed herein.

Alternative red mud compositions are disclosed herein. Methods of making and using the compositions are also disclosed herein.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Red mud is a caustic byproduct of bauxite processing that is generated in the industrial production of alumina using the Bayer process. Red mud can have variability in composition. For example, the red mud may include Fe$_2$O$_3$ (about 30 to about 60 wt %), Al$_2$O$_3$ (about 5 to about 20 wt %), SiO$_2$ (about 5 to about 10 wt %), CaO (about 5 to about 20 wt %), TiO$_2$ (about 5 to about 15 wt %), and Na$_2$O (about 3 to about 10 wt %).

In certain embodiments, the compositions disclosed herein comprise dried and calcined catalytic particles comprising red mud and one or more additives, wherein the particles comprise at least about 50% red mud by weight.

In certain embodiments, the one or more additives comprise nickel deposited onto the surface of the particles. For example, the nickel may account for up to and including about 40% of the particles by weight. The balance of each particle may be red mud. The nickel-laden particles may be reduced in a reducing atmosphere. For example, the reducing atmosphere may be continuously flowing 10% hydrogen and 90% nitrogen, by volume, while the particles are heated to about 450° C. The nickel-laden particles may have a mean particle size of about 50 to about 250 micron and a specific surface area of about 50 to about 80 $m^2/g$.

In certain embodiments, the red mud in the compositions comprises colloidally-dispersed red mud. In such embodiments, the composition may have been dried to a moisture content of about 80% water and extruded into pellets prior calcination. In such embodiments, the one or more additives may include colloidally-dispersed oxides, such as alumina or zirconia. The one or more additives may be mixed with the red mud at the colloidal level, which is referred to herein as "colloidally-dispersed."

In the case of colloidally-dispersed alumina, the alumina may constitute about 10% to about 30% of the particles by weight. Such particles may be pellets with a mean particle size of about 1 mm to about 5 mm and a specific surface area of about 30 to about 65 $m^2/g$. Alternatively, such particles may be a powder that was spray dried and agglomerated. The powder may have a mean particle size of about 250 micron to about 650 micron and have a specific surface area of about 30 to about 65 $m^2/g$.

When the one or more additives include colloidally-dispersed alumina, colloidally-dispersed silica may also be added. For example, the colloidal silica may constitute about 5% to about 20% of the particles by weight. Further additives such as colloidally-dispersed calcium oxide or zinc oxide may be included, such as constituting about 1% to about 3% of the particles by weight.

For example, compositions may include about 60% colloidally-dispersed red mud, about 30% colloidally-dispersed alumina, and about 10% colloidally-dispersed silica, all by weight. In another example, compositions may include about 50% colloidally-dispersed red mud, about 30% colloidally-dispersed alumina, and about 20% colloidally-dispersed silica, all by weight. In yet another example, compositions may include about 60% colloidally-dispersed red mud, about 30% colloidally-dispersed alumina, and about 8% colloidally-dispersed silica, and about 2% colloidally-dispersed calcium oxide, all by weight. In still a further example, compositions may include about 90% colloidally-dispersed red mud and about 10% colloidally-dispersed alumina, all by weight.

For compositions with colloidally-dispersed constituents, the red mud may function as the active material and the alumina may function as a binder. When present, the silica may provide attrition-resistance, such as for fluidized bed applications of the compositions. When present, the calcium oxide and zinc oxide may function as a sulfur scrubber, such as for production of low sulfur pyrolysis oils.

In the case of colloidally-dispersed zirconia, the zirconia may constitute about 10% to about 15% of the particles by weight. Such particles may be a powder that was spray dried and agglomerated. The powder may have a mean particle size of about 250 micron to about 650 micron and have a specific surface area of about 30 to about 65 $m^2/g$. The zirconia may be tetragonal zirconia. For example, compositions may include about 88% colloidally-dispersed red mud and about 12% colloidally-dispersed tetragonal zirconia, all by weight.

In any of the foregoing embodiments, the compositions may be calcined in air at atmospheric pressure and about 600° C. to about 800° C. For example, the compositions may be calcined for about two to about six hours. When the compositions include silica, generally the calcining temperature should be less than 800° C. to avoid glass formation on the surface of the particles.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Methods of making the above-mentioned compositions are also disclosed herein. Methods of making the compositions may include mixing a slurry of red mud and one or more additives, drying the mixture at a first temperature, and calcining the dried mixture at a second temperature higher than the first temperature to form dried and calcined catalytic particles comprising red mud and the one or more additives.

For example, for fluidized bed applications or other applications where a powder is desired, the drying step may include spray drying and agglomerating the mixture. In another example, for packed bed applications or other applications where a pellet is desired, the drying step may include drying the mixture in an oven, such as at about 105° C., for several hours.

In certain embodiments, the second temperature may be about 600° C. to about 800° C.

The methods of making the compositions may further include reducing the dried and calcined catalytic particles in a reducing atmosphere. For example, the particles may be heated and exposed to hydrogen. For example, the particles may be exposed to 10% hydrogen and 90% nitrogen, by volume, continuously blown across the particles while the particles are heated to about 450° C.

The methods of making the compositions may further include sieving the particles to a selected size, such as post-calcination.

Methods of using the above-mentioned compositions are also disclosed herein. Methods of using the compositions include methods of hydrotreating a material, such as a pyrolysis oil, low molecular weight oxygenates (carboxylic acid, ketones, aldehydes, furfural and guaiacol), or pre-pyrolysis feedstock. The methods include providing a pyrolysis oil (or other feedstock) and mixing the pyrolysis oil with a catalyst comprising one of the above-mentioned compositions.

During hydrotreatment processes, multiple reactions may occur, including hydrogenation, hydrogenolysis, hydrodeoxygenation, hydrocracking, alkyl addition, and polymerization. For example, ring saturation may occur via hydrogenation, and hydrocracking may occur during gasification. Methane production can occur under a variety of conditions.

In certain embodiments, when hydrodeoxygenating, such as alkyl addition hydrodeoxygenating, is desired, then compositions comprising the nickel-laden particles may be used.

The nickel-laden particles may be provided in primarily dry form (i.e., low moisture content) or in an aqueous suspension. When provided in aqueous form, the nickel-laden particles may achieve both hydrodeoxygenation and addition of small molecules into fuel-length hydrocarbon chains. For example, molecules such as acetic acid may be hydrodeoxygenated and addition reacted with other molecules to form gasoline- and diesel-type molecules.

The methods of hydrotreating may include pressurizing the mixture of the above-mentioned compositions and pyrolysis oil (or feedstock) with hydrogen gas at a pressure of about 4 MPa to about 7 MPa while heating the mixture to a temperature of about 300° C. to about 400° C.

One benefit of the methods of hydrotreating disclosed herein is that sulfidation of the compositions is not required to activate the particles.

In embodiments where a pyrolysis oil is being hydrotreated, the methods may further include pyrolyzing a feedstock to produce the pyrolysis oil. Exemplary feedstocks include biomass, coal, tires, automobile shredder residue, waxy crude, used lubricating oils, and tar sands. The feedstock may be pyrolyzed in the presence of a red mud composition, such as the above-mentioned compositions. In particular, fast pyrolysis may be used to maximize pyrolysis oil production. The pyrolysis oil may then be separated from any char, aqueous phases, and gases produced.

The methods of hydrotreating may further include regenerating the catalyst in a hydrogen-containing atmosphere at about 400° C. to about 500° C. temperature. The regenerated catalyst may then be reused. Optionally, depending on the application, the regenerated catalyst may also be reduced again.

Methods of using the above-mentioned compositions also include methods of pyrolysis. The methods of pyrolysis include feeding a catalyst comprising one of the above-mentioned compositions to a reactor and heating the catalyst, introducing a feedstock into the reactor; and then pyrolyzing the feedstock to produce pyrolysis products.

In certain embodiments, the reactor may be a fluidized bed reactor. The catalyst may be used as a fluidizing medium. The catalyst and the feedstock may be mixed in the reactor by operation of the reactor. The catalyst may be attrition-resistant variations of the above-mentioned compositions, such as the compositions including colloidally-dispersed silica.

For example, the feedstock may be aqueous phase pyrolysis products from a prior pyrolysis process. The aqueous phase pyrolysis products may have a pH of about 2.5 to about 4 prior to introduction to the reactor. The feedstock may also include pyrolysis char with a specific surface area of less than 50 $m^2/g$ prior to introduction to the reactor. The pyrolysis products include gases, pyrolysis oils, char, and water. In some embodiments, the condensed water (e.g., vapor-phase, gas-phase, or both, water produced within the reactor may be condensed) has a pH of about 6.5 and does not have detectable organics, as measured by Karl Fischer titration. In the same embodiments, the produced char has been magnetized and activated. Additionally, the produced char has a specific surface area of greater than 500 $m^2/g$. For example, the feedstock char may have a specific surface area of about 6 $m^2/g$ and the produced char may have a specific surface area of about 750 $m^2/g$.

In another example utilizing fluidized bed reactors, the feedstock may include pulverized coal. For example, the ratio of coal to catalyst may be about 1:1 to about 1:5. The methods may include heating the catalyst to about 700° C. to about 900° C. Steam may also be introduced into the reactor. Biomass can also be added to improve the hydrogen to carbon monoxide ratio in the produced synthesis gas, such as to a hydrogen to carbon monoxide ratio of at least about 2:1.

In another example utilizing fluidized bed reactors, the feedstock may be primarily biomass, such as woody or herbaceous biomass or olive mill waste water sludge. The catalyst may be heated to about 400° C. to about 600° C. The residence time for the feedstock in the reactor may be about one second to about five seconds.

In certain embodiments, the reactor may be a packed bed reactor and the catalyst is part or all of the packing material of the packed bed reactor.

For example, the feedstock for the packed bed reactor may include tire crumbs or another sulfur-rich material and the pyrolysis product could include pyrolysis oil with a sulfur content less than 0.5% by weight of the pyrolysis oil. In this example, the catalyst may be the above-mentioned compositions with particles including colloidally-dispersed calcium oxide, zinc oxide, or both or other sulfur-removing compositions.

In another example, the feedstock for the packed bed reactor may include waxy crude, used lubricating oil, tar sand, or other long-chain hydrocarbon source. In this example, the catalyst may be the above-mentioned compositions with particles with hydrocracking activity, such as particles high in colloidally-dispersed red mud and a small amount of binder, such as colloidally-dispersed alumina. In such methods, the catalyst may be heated to about 400° C. to about 450° C. and the residence for the feedstock controlled to about 10 minutes to about 30 minutes. In such methods, it may be beneficial to preheat the feedstock to a flowable state prior to introducing the feedstock to the reactor.

In certain embodiments, the methods are not reactor dependent. For example, for pyrolyzing biomass with certain compositions, such as the above-mentioned compositions containing colloidally-dispersed zirconia, a variety of reactors could be used. For example, when compositions including particles containing the colloidally-dispersed zirconia are used in the slow pyrolysis of biomass with the catalyst heated to less than 600° C., it is not necessary to have a reactor designed to quickly remove gases from the reactor. Instead, a variety of reactor designs (e.g., packed bed or fluidized bed) can be used. The pyrolysis products will be char-free. In other words, the pyrolysis products will be primarily gases and liquids.

In the pyrolysis methods discussed above, the pyrolysis products can include synthesis gas having a hydrogen to carbon monoxide ratio of at least about 2:1, such as about 4:1, 6:1, or 8:1.

Methods of using the above-mentioned compositions include using the compositions as a flocculant or coagulant. For example, the above-mentioned compositions, in particular, magnetic compositions can be used as a flocculant for wastewater clarification. When the above-mentioned compounds are calcined in a reducing atmosphere, such as 10% hydrogen and 90% nitrogen, at 600-700° C., then magnetite and hematite are formed. This renders the compositions magnetic. Magnetic embodiments of the above-mentioned compositions may be added to the wastewater. The compositions may be mixed with the wastewater via agitation or some other method. The residence time for the process can be sufficient to allow floc to form with the compositions. At least a portion of the floc may then be removed from the wastewater. The compositions may then be regenerated using heat and the compositions magnetically separated (such as with a magnetic drum) and the compositions reused.

For wastewater clarification, it may be beneficial for the above-mentioned compositions to have a particle size less than 100 micron. The particle size may be achieved by spray drying the compositions prior to calcination. The composition could be added to the wastewater at a concentration of about 1 gram/liter to about 10 gram/liter. In addition to reducing the turbidity, the compositions may help maintain the pH of the wastewater between about 6.0 and 8.0.

EXAMPLES

Example 1—Hydrodeoxygenation

Bio-oil is a complicated mixture of more than 200 compounds such as aromatics, aliphatics, aldehydes, ketones, and ethers. Therefore, it is difficult to interpret the hydrodeoxygenation (HDO) results of the actual bio-oil. Guaiacol is a suitable model compound representing the decomposition products of lignin pyrolysis, as it contains phenolic hydroxyl and methoxy groups like many degradation products of lignocellulose.

Material

Guaiacol, anisole, catechol, and nickel nitrate hexahydrate ($Ni(NO_3).6H_2O$) were purchased from Alfa Aesar (Haverhill, Mass., USA). Cyclohexane and toluene were bought from Pharmco-Aaper (Brookfield, Conn., USA). Commercial nickel on silica/alumina (~65% wt % Ni loading) catalyst powder, benzene, and phenol were purchased from Sigma-Aldrich (St. Louis, Mo., USA). Hexane and xylene were obtained from Fisher Scientific (Hampton, N.H., USA). All chemicals were analytical grade and were used as received without any further purification. High purity (99%) hydrogen (Airgas, Pa., USA) was used for HDO experiments.

Preparation and Characterization of Nickel and Red Mud (Ni/RM) Catalyst

Ni/RM catalysts (i.e., exemplary nickel-laden particles of the above-mentioned compositions) were prepared at 40 wt % nickel metal loading using a wet impregnation method [1,2]. The calculated amount of $Ni(NO_3).6H_2O$ equivalent to 40 wt % nickel metal loading was dissolved in 100 ml deionized water and then mixed with red mud (particle size<90 µm). The mixture was heated to 70° C. and continuously stirred for five hours to prepare the catalyst precursor. The catalyst precursor was dried at 105° C. for 10 hours and then calcined in air at 620° C. in a muffle furnace (Thermo Fisher Scientific, Inc., Waltham, Mass., USA) for five hours. The calcined material was reduced for six hours at 450° C. using a reducing gas mixture of 10% $H_2$ and 90% $N_2$ at flow rate of 20 ml/min. to obtain the final catalyst.

The Brunauer-Emmett-Teller (BET) specific surface area of the catalysts was determined on a MS-16 BET analyzer (Quantachrome Instruments, Boynton Beach, Fla., USA). About 0.1 g catalyst sample was used in each measurement. Prior to the analysis, the catalyst samples were milled into fine powder using a SPEX Certiprep 6750 cryogenic miller (Metuchen, N.J., USA). All samples were degassed at 300° C. for four hours prior to duplicate measurements. A porous $Al_2O_3$ standard was measured along with each run to ensure consistency between the different samples.

Metal loading determination was carried out using inductively coupled plasma atomic emission spectrometry (ICP-AES) analysis. For this purpose, 0.5 g catalyst sample was digested in nitric acid at 95° C. for one hour. Then 12 ml, 30 wt % hydrogen peroxide was added to the digestion tube and cooled to room temperature [3]. The extracts were measured using a Thermo iCAP 6300 ICP-OES Inductively-Coupled Plasma Spectrophotometer (Thermo Fisher Scientific, Inc., Waltham, Mass., USA) with Optical Emission.

Thermogravimetric-temperature programmed reduction (TG-TPR) studies were carried out using a TGA Q500 (TA Instruments, Lindon, Utah, USA). Twenty-five mg of catalyst (calcined form) was heated in a flow of 10% $H_2$/90% $N_2$ (20 ml/min.) from room temperature to 700° C. at a heating rate of 10° C./min. Hydrogen uptake was monitored by the change in sample weight according to the plot of derivative weight vs. temperature.

X-ray powder diffraction (XRD) analyses were carried out by Hazen Research Inc. (Golden, Colo., USA). The samples were ground in a mortar and pestle with isopropyl alcohol and analyzed using a Bruker D8 Advance with Davinci design and a Lynxeye detector. The diffraction pattern was measured in the interval from 5 to 85 in 2e using a 0.02 step size and 40 seconds of counting time.

Scanning electron microscopy (SEM) analysis was conducted on a FEI Quanta FEG-650 (Thermo Fisher Scientific, Inc., Waltham, Mass., USA). For preparation of the specimens a small amount of catalyst was placed on a two-sided sticky tape resting on an aluminum holder and observed at different magnifications. Images were recorded using a low vacuum secondary electron (LFD) detector.

Hydrodeoxygenation (HDO) Experiments

All experiments were conducted in a Parr Series 4560 300 mL autoclave reactor (Parr Instruments, Moline, Ill., USA). This reactor had a variable speed magnetic drive and turbine agitator. A temperature sensor, immersed in the reactor content, was used to measure the liquid temperature. The reaction temperature was maintained at its desired value with an accuracy of ±1° C. The setup had an electrically heated jacket to ensure isothermal conditions. The temperature and speed of agitation were controlled by using a Parr 4848 controller. In each experiment, the reactor was charged with guaiacol (30 g) and catalyst (4.5 g). The reactor was then purged with $N_2$ to ensure an inert atmosphere. The reactor was then charged with high purity hydrogen supplied from a reservoir tank to desired pressures of 4.83, 5.52, or 6.21 MPa (700, 800, or 900 psi) via a pressure regulator. A gas sample was taken from a gas release valve from the gas sampling port for gas analysis when the reactor was at room temperature. The reactor was then heated to reaction temperature (300, 350, or 400° C.) at a heating rate of 15° C./min. The reaction time was recorded when the set temperature was reached. The reactor content was stirred at the desired speed of agitation (~1000 rpm) for all experiments. Seven liquid samples were collected at fixed time intervals for kinetic studies. Every time, a sample volume equal to 0.3 $cm^3$ was collected. The change in volume of liquid inside the reactor was negligible. After the desired reaction time (30 minutes), the reactor was cooled to room temperature using the internal cooling coil and an external air fan simultaneously. A gas sample was collected in a tedlar bag for gas analysis when the reactor was cooled to room temperature. The reproducibility of experiments was checked, and the error in all experimental measurements was found to be less than 3%.

In a blank experiment (without catalyst) 30 g of guaiacol was charged into the reactor and the reactor was pressurized to 6.2 MPa (900 psi) with hydrogen and allowed to react for 30 minutes at 400° C. All experiments were conducted in triplicate.

Analysis of HDO Products

Hydrogen consumption, gas analysis, and product yields were determined as described in previous work [4]. The liquid products of HDO experiments were analyzed by HPLC (Shimadzu Scientific, Columbia, Md., USA) using a RID-10A detector and a Kromasil 100-5-C18 column obtained from AkzoNobel (Amsterdam, Netherlands). The HPLC was equipped with an LC-10AT pump, SCL-10Avp controller, and SIL-10A autosampler. CLASS-VP 7.3 SP1 software was used to analyze HPLC chromatograms. A CTO-10A column oven was used to maintain the column temperature at 55° C. during the analysis. The injection volume was 0.25 μl and acetonitrile at a flow rate of 0.6 ml/min. was used as the mobile phase. Data acquisition time was 60 minutes for all analyses.

The liquid samples were analyzed for guaiacol, anisole, catechol, phenol, cyclohexane, hexane, benzene, toluene, and xylene. To quantify the amount of each compound, five solutions of 20, 40, 60, 80, and 100 wt % of each compound were prepared and injected to the HPLC system and peak area vs. concentration was plotted to obtain the calibration curve of the compounds.

The elemental composition of HDO products was determined using ThermoFischer Scientific Flash 2000 organic elemental analyzer (Thermo Fisher Scientific, Inc., Waltham, Mass., USA), and the oxygen content was calculated by difference according to ASTM D5291.

Conversion of guaiacol and product selectivity were calculated using equations (1) and (2) respectively [5]:

$$\text{Conversion \%} = \frac{\text{Moles of guaiacol reacted}}{\text{Moles guaiacol fed}} \times 100 \quad (1)$$

$$C_p \text{ Selectivity \%} = \frac{\text{moles } C_p}{\sum \text{moles } C_p} \times 100 \quad (2)$$

Where $C_p$ represents the content of products.

Kinetic studies using the integral method were performed to estimate the reaction rate equations according to equation (3) [6].

$$-r_G = \frac{dC_G}{dt} = k \cdot C_G^n \quad (3)$$

Where $r_G$ is the rate of disappearance of guaiacol, $C_G$ is the concentration of guaiacol at time t, k is the reaction rate constant and n is the reaction order.

The water content of the aqueous products was determined by Karl Fischer titration method using Hydranal®—composite 5 solution. A Metrohm 701KF Titrino and 703 titration stand setup (Brinkmann Instruments, Riverview, Fla., USA) were used for the volumetric Karl Fischer titration.

Characterization of Ni/RM Catalyst

RM (in reduced form) was tested in HDO experiment to investigate whether the support had HDO activity or it acted as an inert support. The BET specific surface area of RM support (calcined form) was relatively low (37.51 m²/g). Reduction of the calcined RM increased its specific surface area to 54.34 m²/g. The increase in specific surface area may be attributed to reduction of some metallic oxides.

The specific surface area of the Ni/RM catalyst precursor (calcined form) was 51.34 m²/g while after activation by reduction, the BET specific surface area increased to 79.34 m²/g. The increase in BET specific surface area after the reduction may be attributed to the pores that were created to accommodate the shrinkage in the catalyst precursor associated with reduction of NiO to Ni [7-10]. These results are in agreement with those reported in literature [11].

The ICP analysis of the RM and 40% Ni/RM catalyst showed that the major metals present in RM were Al, Ca, Fe, Na, Si and Ti and trace amounts of other metals such as As, Cd, Cu, Mo, Zn etc. (Table 1). The Ni content of the red mud was negligible, but after the impregnation the Ni content was 40.8%, which was close to the estimated amount incorporated. The Ni loading of the commercial $Ni/SiO_2$—$Al_2O_3$ catalyst was 63.3% (Table 1), which was close to the 65 wt % stated on the sample bottle by the manufacturer.

TABLE 1

ICP analysis of RM support, Ni/RM, and $Ni/SiO_2$—$Al_2O_3$ catalysts.

|  | RM | Ni/RM | Ni/$SiO_2$—$Al_2O_3$ |
|---|---|---|---|
| Metal (wt %) | | | |
| Al | 9.08 | 4.44 | 16.17 |
| Ca | 1.20 | 0.65 | 0.25 |
| Fe | 21.56 | 9.47 | 1.21 |
| K | 0.03 | 0.02 | 0.01 |
| Mg | 0.07 | 0.04 | 0.07 |
| Na | 7.17 | 3.51 | 0.05 |
| Ni | <0.01 | 40.8 | 63.3 |
| P | 0.03 | 0.01 | 0.02 |
| S | 0.10 | 0.06 | 0.04 |
| Si | 4.35 | 2.53 | 12.71 |
| Ti | 4.10 | 1.53 | 0.35 |
| Metal (mg/kg) | | | |
| As | 0.87 | <DL* | <DL |
| B | 9.41 | 0.85 | <DL |
| Ba | 10.4 | 4.55 | 7.27 |
| Cd | 5.79 | 3.37 | <DL |
| Co | 278 | 12.3 | 226 |
| Cr | 245 | 132 | 5.69 |
| Cu | 3.13 | <DL | 21.3 |
| Mn | <DL | <DL | 24.1 |
| Mo | 1.62 | 0.48 | 1.06 |
| Pb | 156 | 7.09 | 140 |
| Se | <DL | <DL | <DL |
| Sr | 23.1 | 2.28 | 9.57 |
| Ti | <DL | <DL | <DL |
| Zn | 2105 | 26.1 | 2994 |

*Less than detection limit (0.05 mg/kg)

Figure 4:
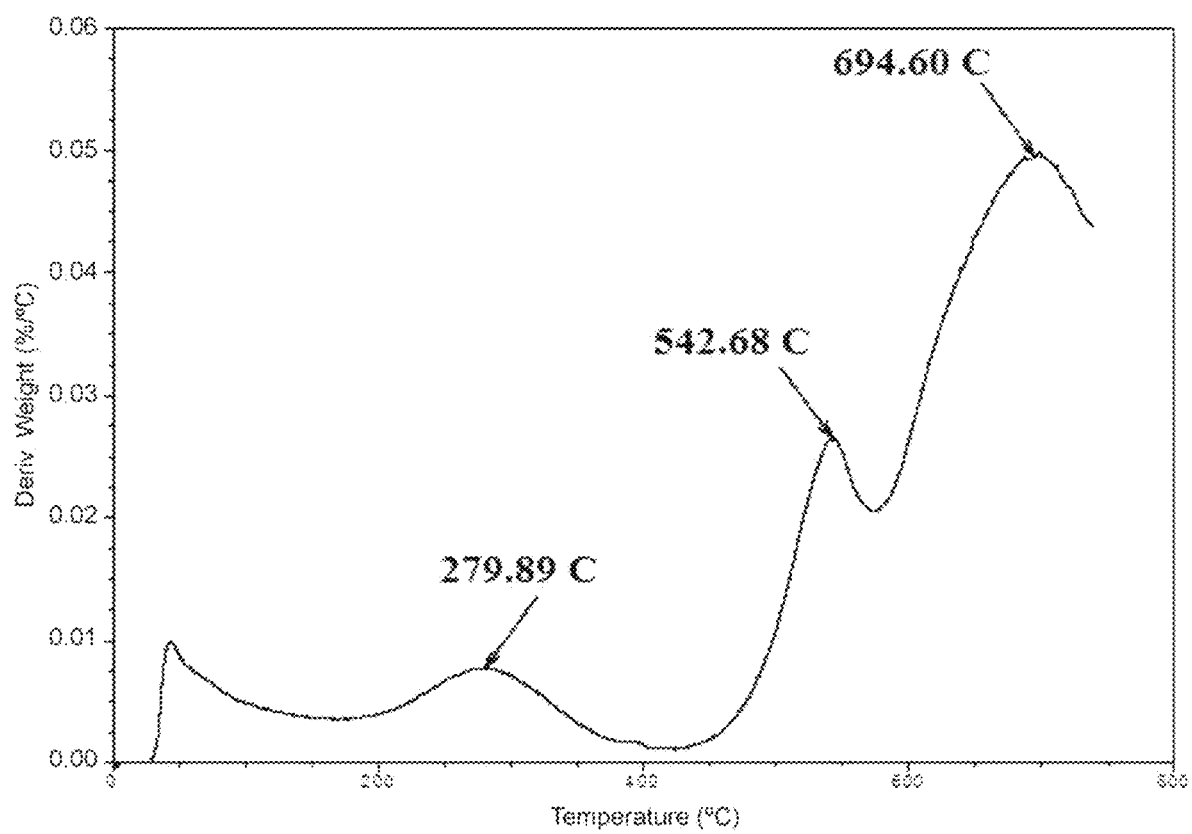
FIG. 4 depicts a temperature programmed reduction (TPR) profile of the red mud used in Example 1.

TG-TPR was performed to investigate the reducibility of nickel oxide, RM support, and the interaction between nickel and the RM (red mud) support. The TPR profile of RM showed three major reduction peaks at 279.9, 542.7, and 694.6° C. (FIG. 4). The peak at 279.89° C. could be due to the reduction of $Fe_2O_3$ to $Fe_3O_4$, and the unresolved peaks centered at 542.68° C. and 694.6° C. could be due to the reduction of $Fe_3O_4$ to FeO and then to elemental Fe [12].

Figure 5:
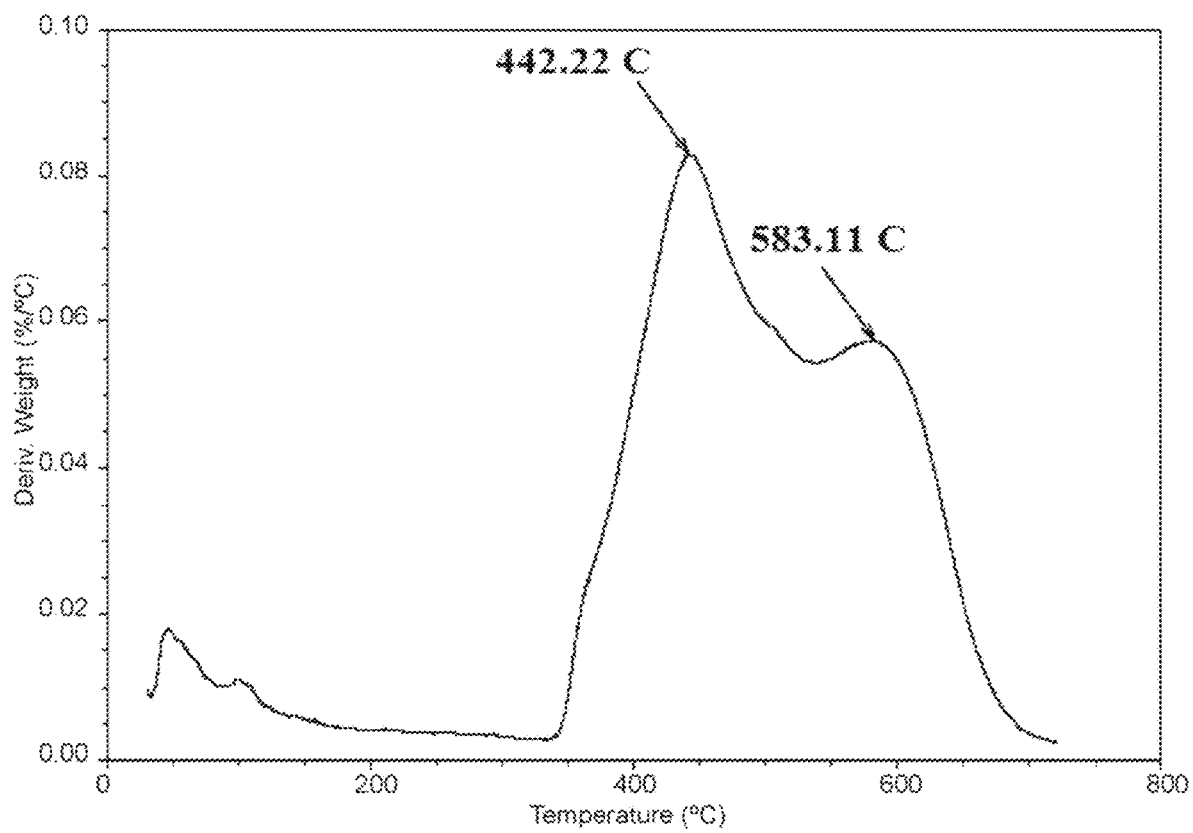
FIG. 5 depicts a TPR profile of the Ni/RM catalyst used in Example 1.
Figure 6:
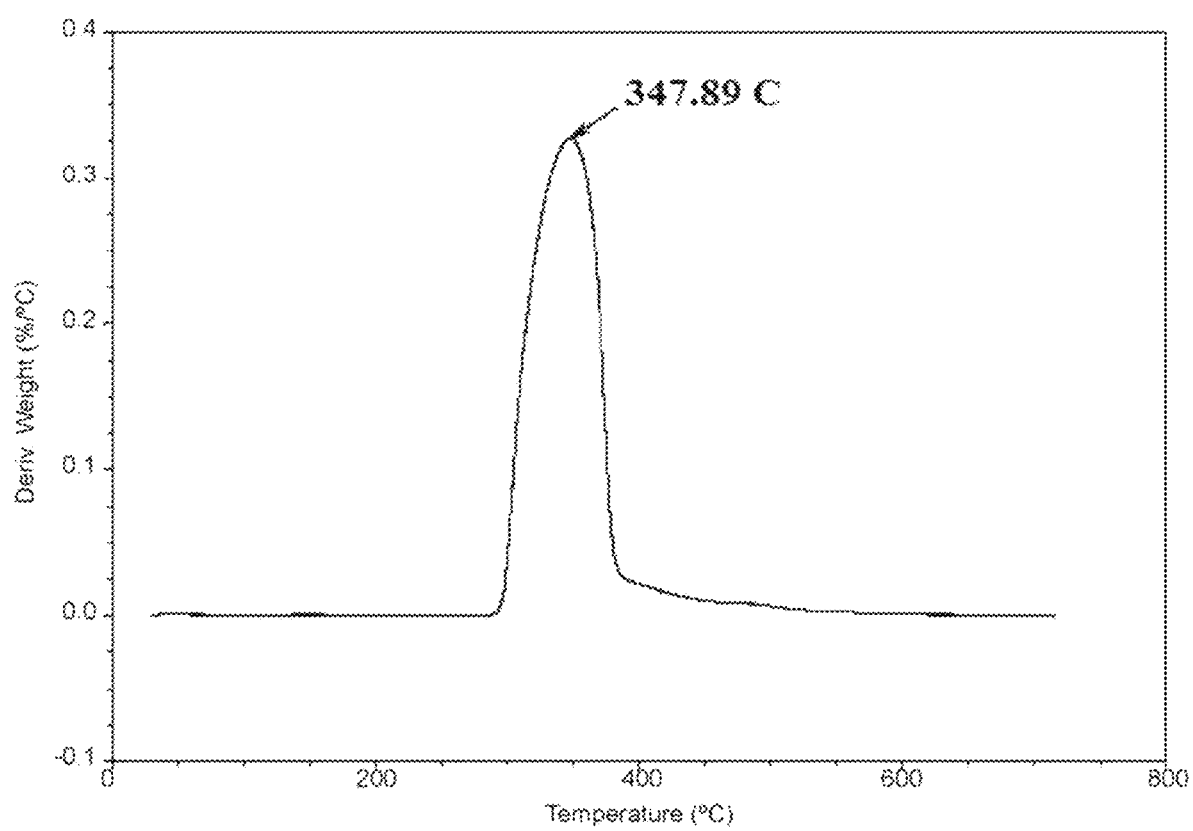
FIG. 6 depicts a TPR profile of nickel oxide used in Example 1.
Figure 7:
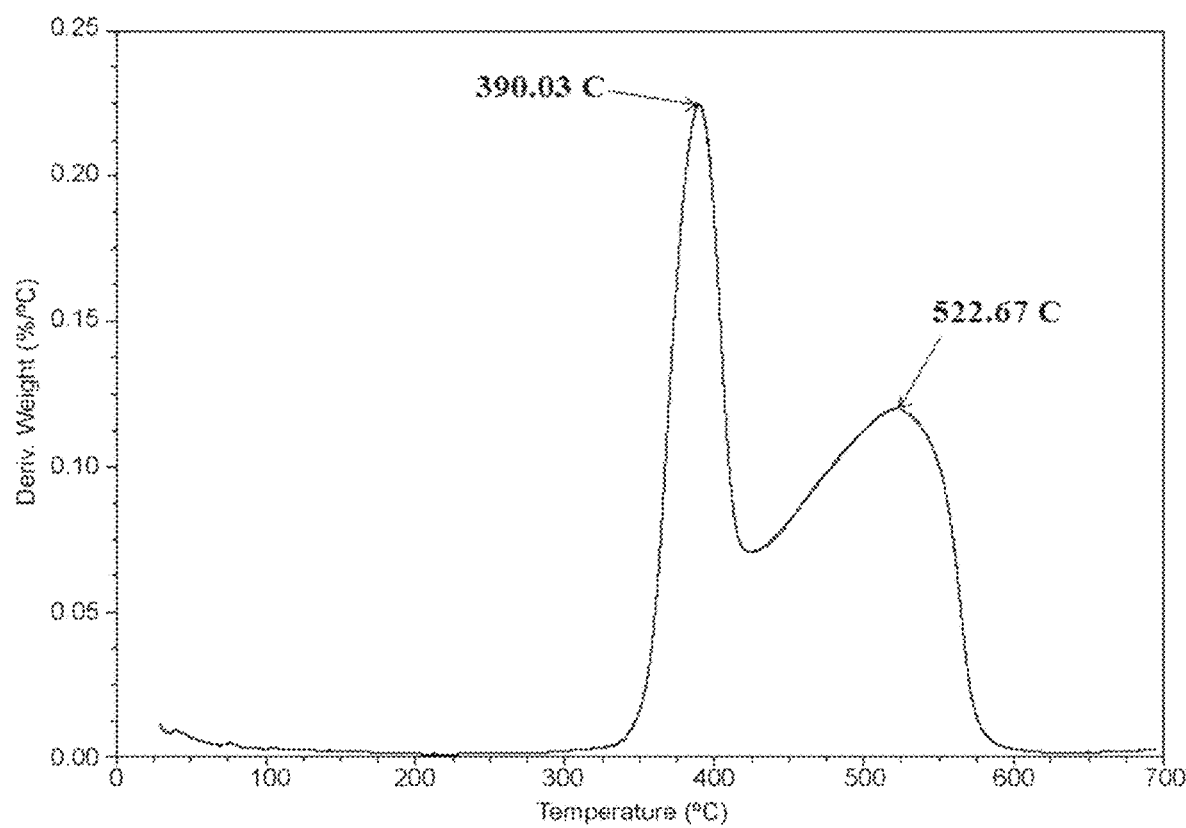
FIG. 7 depicts a TPR profile of $NiO/Fe_2O_3$ used in Example 1.

The TPR profiles of Ni/RM catalyst showed two major reduction peaks at 442.22 and 583.11° C. (FIG. 5). The peak at 442.22° C. was attributed to reduction of nickel oxide, but this peak also indicated a possible interaction with RM support since its intensity increased with increasing the Ni content (data not reported) and its reduction temperature shifted towards that of nickel oxide (347.89° C. according to FIG. 6). This observation is in agreement with Jeangros et al. (2013) who observed interaction between $SiO_2$ and NiO during the reduction of NiO to Ni [9]. The peak at 583.11° C. was attributed to the reduction of RM components (mostly $Fe_2O_3$) since its intensity decreased as Ni loading increased (data not provided). Ni supported on $Fe_2O_3$ was prepared using wet impregnation method to investigate the effect of the presence of $Fe_2O_3$ (which was the major RM component) on the reducibility of Ni. The TPR profile of $NiO/Fe_2O_3$(FIG. 7) showed interaction between NiO and $Fe_2O_3$ at 390.03° C. The peak at 522.67° C. was ascribed to reduction of $Fe_2O_3$ to magnetite. These results suggested that, besides $Fe_2O_3$, Ni interacted with other components of RM too.

Figure 8:
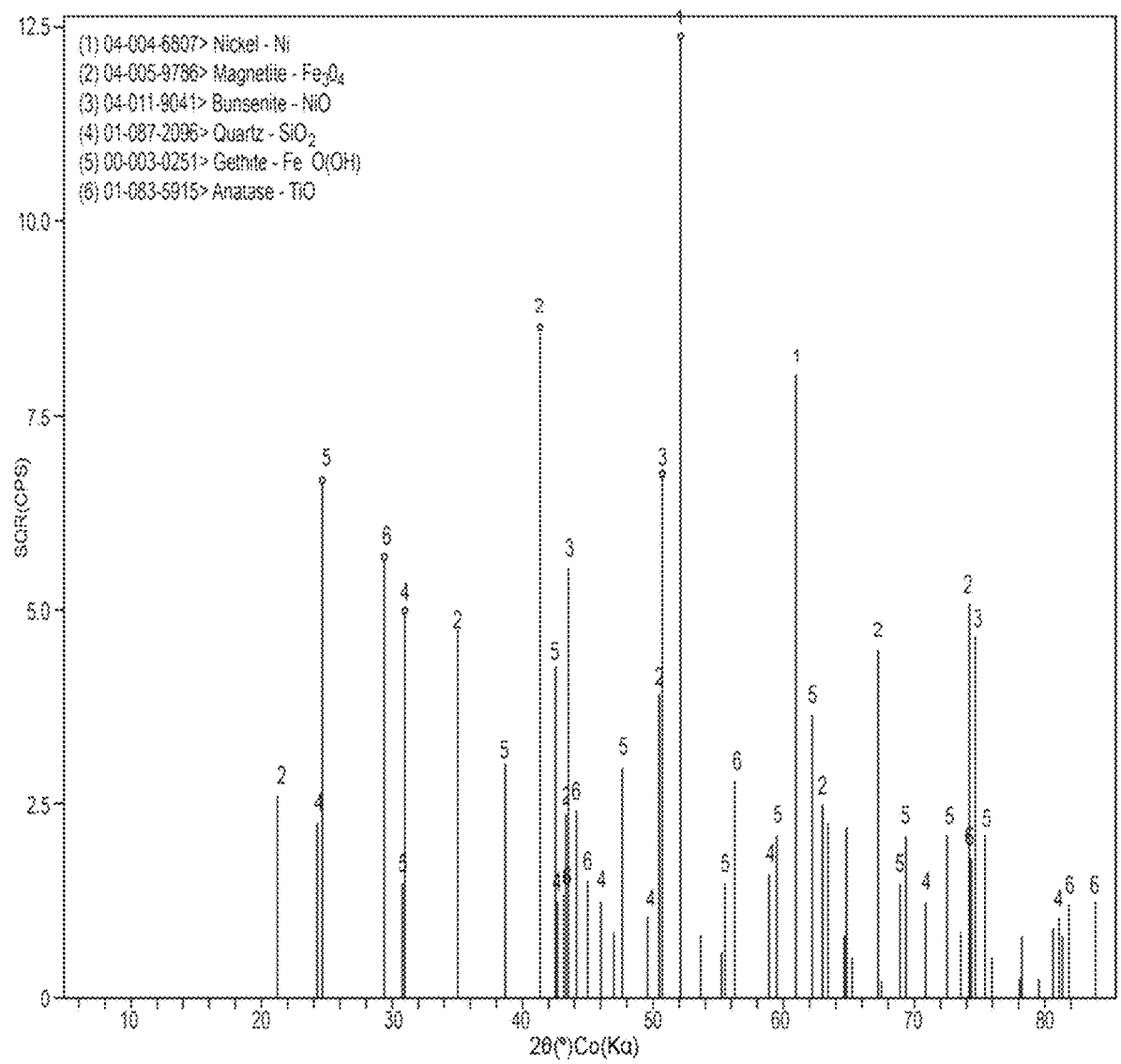
FIG. 8 depicts an XRD pattern of fresh Ni/RM catalyst used in Example 1.

FIG. 8 shows the XRD pattern of fresh Ni/RM catalyst. Distinct sharp peaks observed at 2θ 52.2°, 61 were attributed to elemental Ni from the reduction of NiO. The detection of NiO signal at 2θ 43.7°, 50.9°, and 74.7° showed that nickel oxide was not completely reduced to elemental Ni after treatment with $H_2$ (FIG. 8), which is in agreement with Jeangros et al. (2013) who reported that complete NiO reduction does not occur until the reduction temperatures is above 600° C. [9]. Detection of magnetite ($Fe_3O_4$) peaks at 2Θ 21.6°, 35.1°, 41.7°, and 74.3° was due to the reduction of hematite ($Fe_2O_3$) that was present in the original RM [13].

Figure 9:
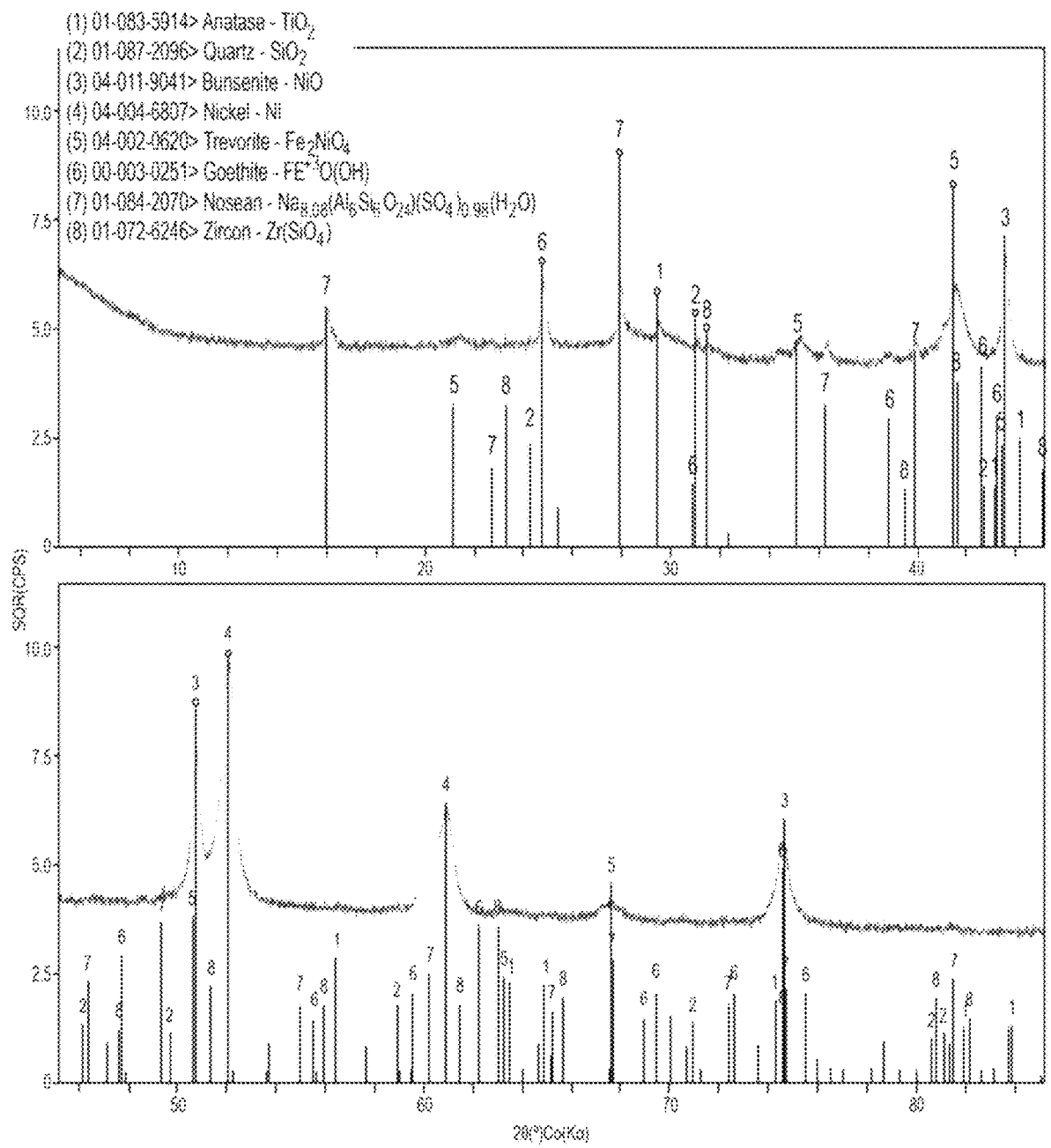
FIG. 9 depicts an XRD pattern of used Ni/RM catalyst from Example 1.

XRD pattern of used Ni/RM catalyst (FIG. 9) showed stronger NiO peaks compared to the fresh catalyst suggesting that Ni was partially oxidized during HDO. This could be one reason for the partial deactivation of the catalyst. Additionally, iron nickel oxide (trevorite) ($Fe_2NiO_4$) peaks were also detected after HDO, which could be another reason for partial deactivation of active Ni sites. The detection of weak elemental nickel peaks (2Θ 52.1° and 61°) in the used catalyst suggested that the Θ catalyst was only partially deactivated.

Figure 10:
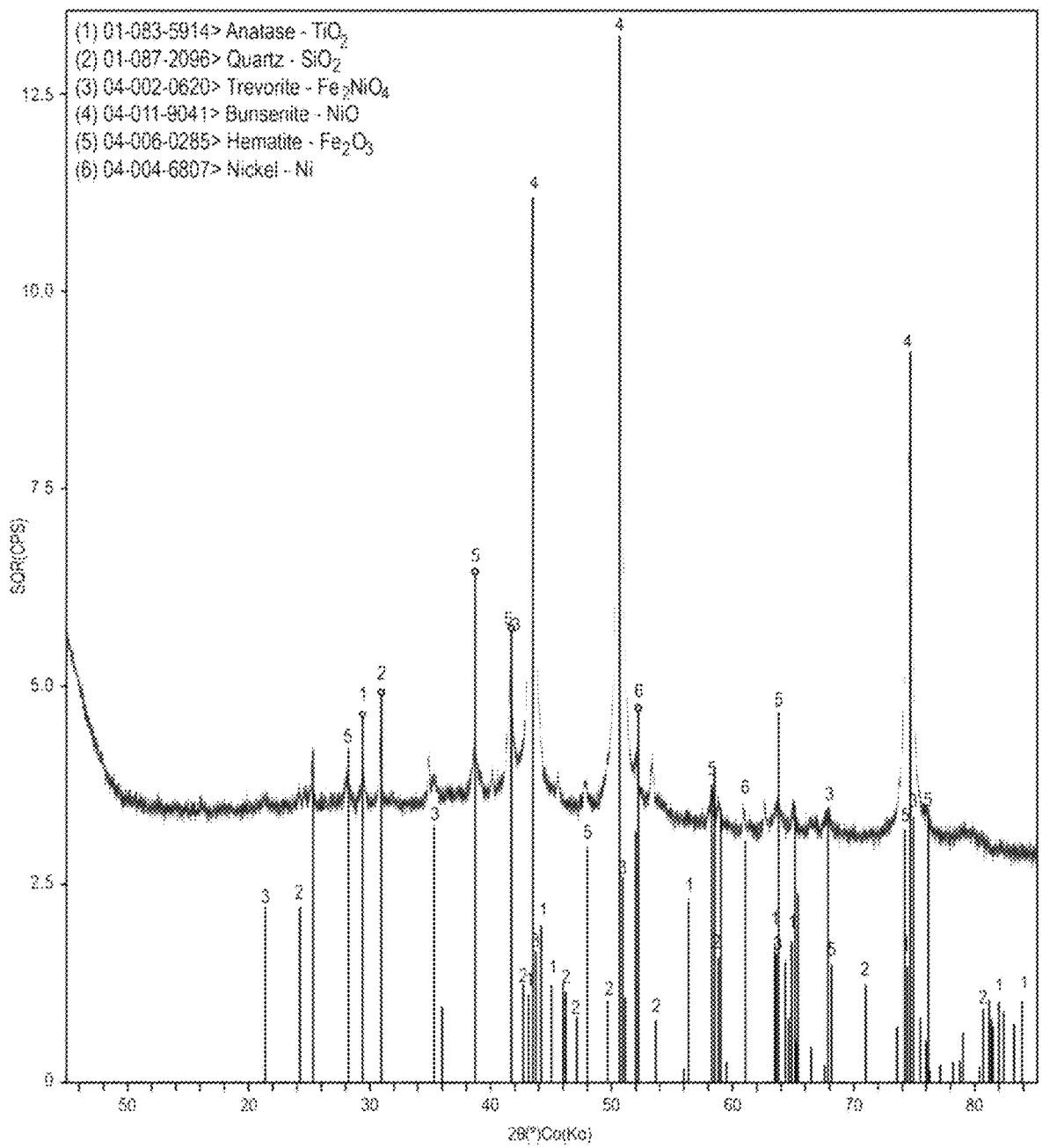
FIG. 10 depicts an XRD pattern of regenerated Ni/RM catalyst from Example 1.

In order to recycle the catalyst, the used catalyst was regenerated in the muffle furnace to burn off the deposited carbonaceous compounds (coke) at 400° C. for four hours. The XRD pattern of the regenerated catalyst (FIG. 10) showed strong NiO diffraction peaks at 2Θ 43.90, 50.8°, and 75°, which was due to the oxidation of nickel to NiO under heat treatment in air. Existence of hematite ($Fe_2O_3$) diffraction peaks in regenerated catalyst was ascribed to oxidation of magnetite. Furthermore, it was interesting to note that weak elemental Ni diffraction peaks were present in the XRD pattern of the regenerated catalyst (FIG. 10). This suggested that some Ni particles in the interior of the RM were not exposed to oxygen due to mass transfer limitations.

Figure 11:
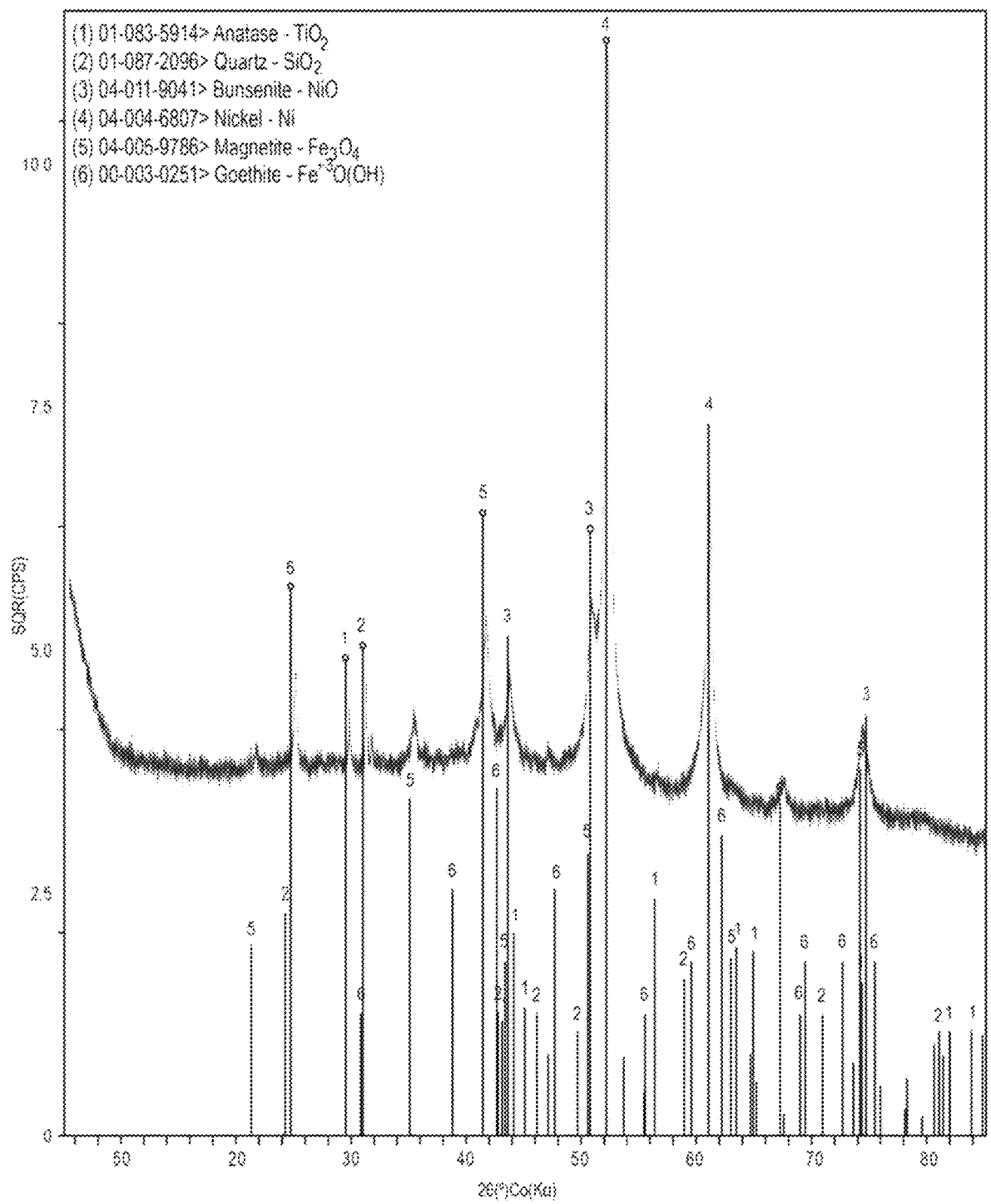
FIG. 11 depicts an XRD pattern of regenerated and activated Ni/RM catalyst from Example 1.

The regenerated catalyst was then activated by reduction in $H_2$. The XRD pattern of the regenerated and activated catalyst (FIG. 11) showed similar diffraction peaks as the fresh catalyst (FIG. 8) suggesting complete regenerability of the catalyst, which was in contrast to the commercial catalyst that could not be regenerated using a similar procedure. More detailed information on the catalytic activity of the used catalyst and the recycled catalyst is discussed further below.

The surface morphology of the catalyst was studied by using scanning electron microscopy (SEM). The SEM images of the Red Mud support, Ni/RM catalyst precursor (calcined form), fresh Ni/RM catalyst (reduced form), and used 40% Ni/RM catalyst are presented in FIGS. 12a-d. In the case of RM support (FIG. 12a), in addition to amorphous-looking particles, crossed concentric discs and spherical-shaped particles were observed. The SEM image of the Ni/RM catalyst in calcined form is shown in FIG. 12b. Ni particles with a relatively uniform morphology and an approximate mean diameter of 90 nm were dispersed on the surface of RM components in the case of activated Ni/RM (FIG. 12c). The SEM picture for the used catalyst (FIG. 12d) showed that the catalyst was coated with coke after the HDO process, which could inhibit the hydrogen transfer and partially deactivate the catalyst.

HDO Products Yield Distribution and Selectivity

In the blank experiment without the catalyst, the guaiacol did not convert to any other compounds, and neither did it produce any gas or coke, hence the reactor was not catalytically active and did not influence the HDO experiments.

The major HDO liquid products using the nickel catalysts were catechol, anisole, phenol, cyclohexane, hexane, benzene, toluene, and xylene. CO, $CO_2$ and $C_1$-$C_5$ hydrocarbon gases as well as water and coke. When RM was treated using similar reaction conditions as Ni/RM catalyst and used in the HDO experiment, the guaiacol conversion was only 2.7%. A relatively high amount of coke was formed (18.3 wt %), and 96.3 wt % of the final liquid products was unreacted guaiacol and small amounts of benzene, phenol, and anisole. The results of HDO experiments using RM support are summarized in Table 2. Therefore, the RM support contribution to HDO process was very low. The effects of reaction temperature and hydrogen pressure are discussed below.

TABLE 2

Effect of RM support on guaiacol HDO (the reaction temperature and $H_2$ initial pressure were 400° C. and 900 psi respectively).

| Conv. | $H_2$ Consumption (mol $H_2$/kg | Yield (wt %) | | | |
|---|---|---|---|---|---|
| (%) | guaiacol) | Organic | Aqueous | Gas | Coke |
| 2.7 | 0.03 | 75.4 | 0 | 4.7 | 18.3 |

| Liquid product analysis (wt %) | | | | |
|---|---|---|---|---|
| Guaiacol | Benzene | Phenol | Anisole | Others |
| 96.3 | 1.4 | 1.2 | 1.1 | 0 |

| Gas product analysis (mol %) | | | |
|---|---|---|---|
| CO | $CO_2$ | $CH_4$ | $C_2$-$C_5$ |
| 46.3 | 33.1 | 19.7 | 0 |

Reaction Temperature Effect

Figure 13A:
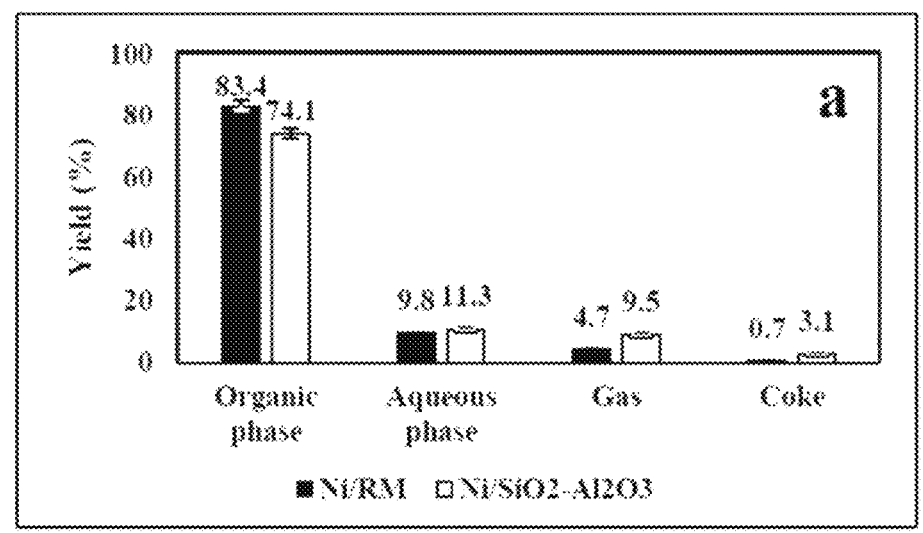
FIG. 13a depicts Example 1 products yield distribution using Ni/RM and $Ni/SiO_2$—$Al_2O_3$ at 300° C.
Figure 13B:
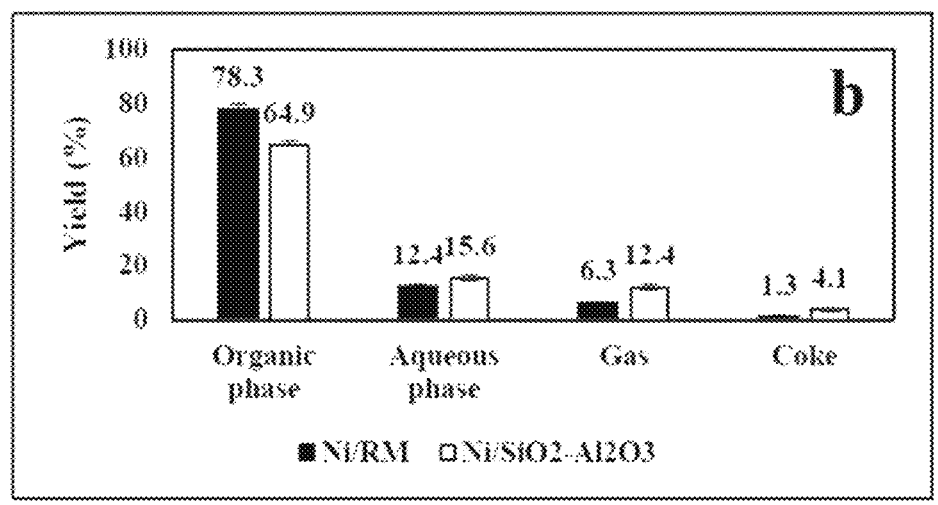
FIG. 13b depicts Example 1 products yield distribution using Ni/RM and $Ni/SiO_2$—$Al_2O_3$ at 350° C.
Figure 13C:
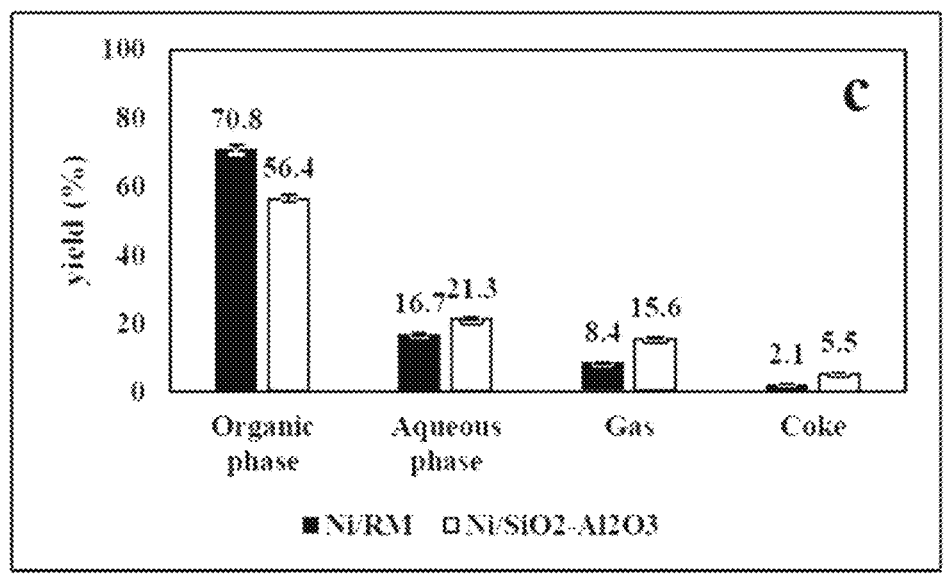
FIG. 13c depicts Example 1 products yield distribution using Ni/RM and $Ni/SiO_2$—$Al_2O_3$ at 400° C.

FIGS. 13a-c shows the overall products yield distribution of guaiacol HDO as a function of reaction temperature. At all reaction temperatures, the Ni/RM catalyst produced higher organic liquid yield compared to Ni/SiO$_2$—Al$_2$O$_3$. In contrast, higher amounts of gas and coke were formed in the case of Ni/SiO$_2$—Al$_2$O$_3$, which could be due to the higher specific surface area and higher Ni content of the catalyst. The aqueous liquid yields at reaction temperatures of 300, 350, and 400° C. were 9.8%, 12.4% and 16.7% respectively for the Ni/RM catalyst while those for Ni/SiO$_2$—Al$_2$O$_3$ were 11.3%, 15.6%, and 21.1% respectively. The higher aqueous liquid yield was due to water production from increased methanation of carbon dioxide over the commercial Ni/SiO$_2$—Al$_2$O$_3$(Table 3) [4, 14]. The aqueous phase was 99.9 wt % H$_2$O.

Figure 14A:
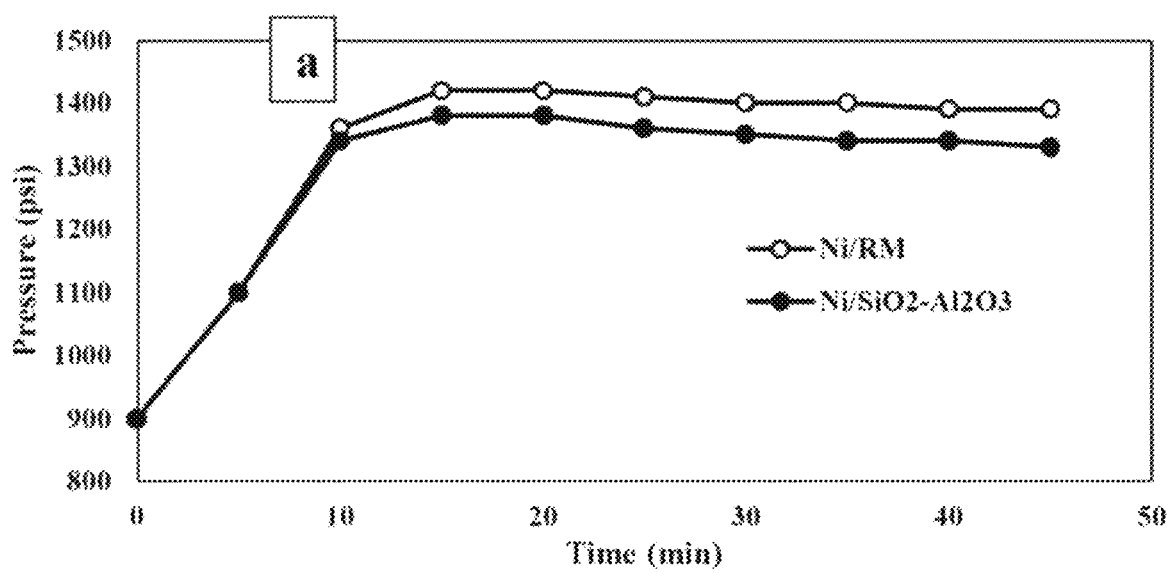
FIG. 14a depicts Example 1 pressure change during hydrodeoxygenation (HDO) of guaiacol at a reaction temperature of 300° C.
Figure 14B:
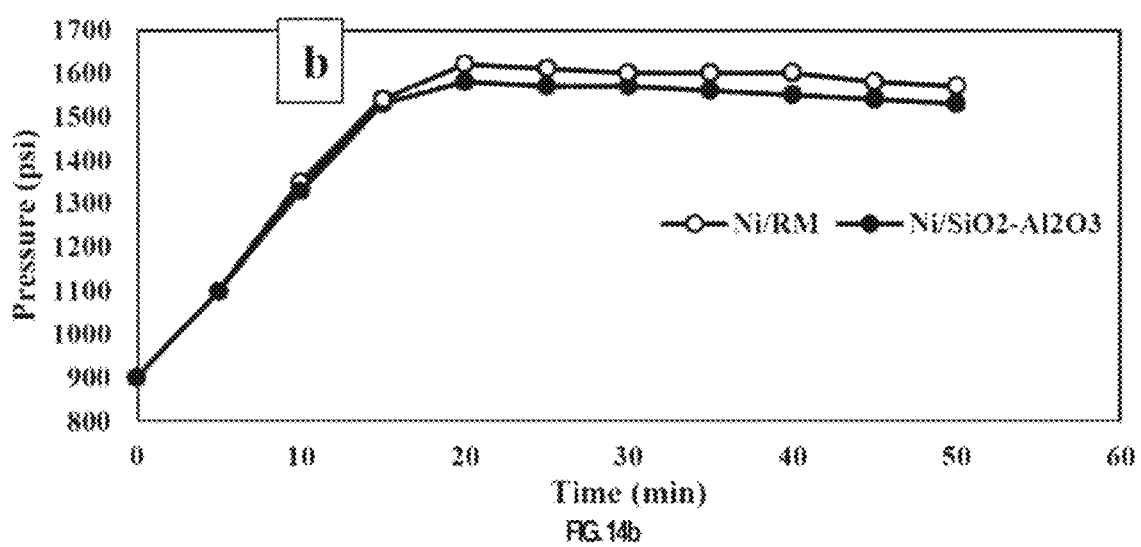
FIG. 14b depicts Example 1 pressure change during HDO of guaiacol at a reaction temperature of 350° C.
Figure 14C:
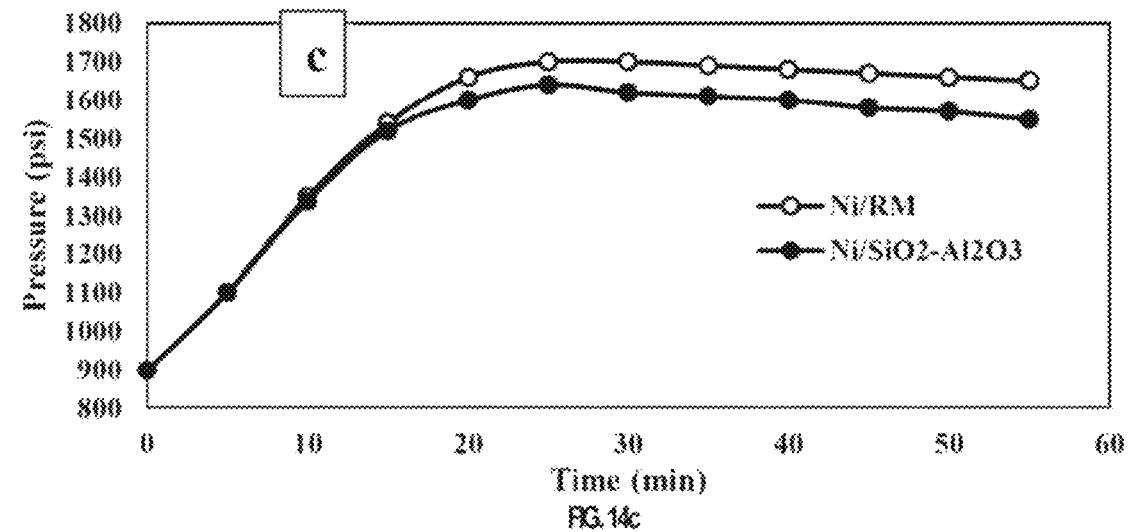
FIG. 14c depicts Example 1 pressure change during HDO of guaiacol at a reaction temperature of 400° C.
Figure 15:
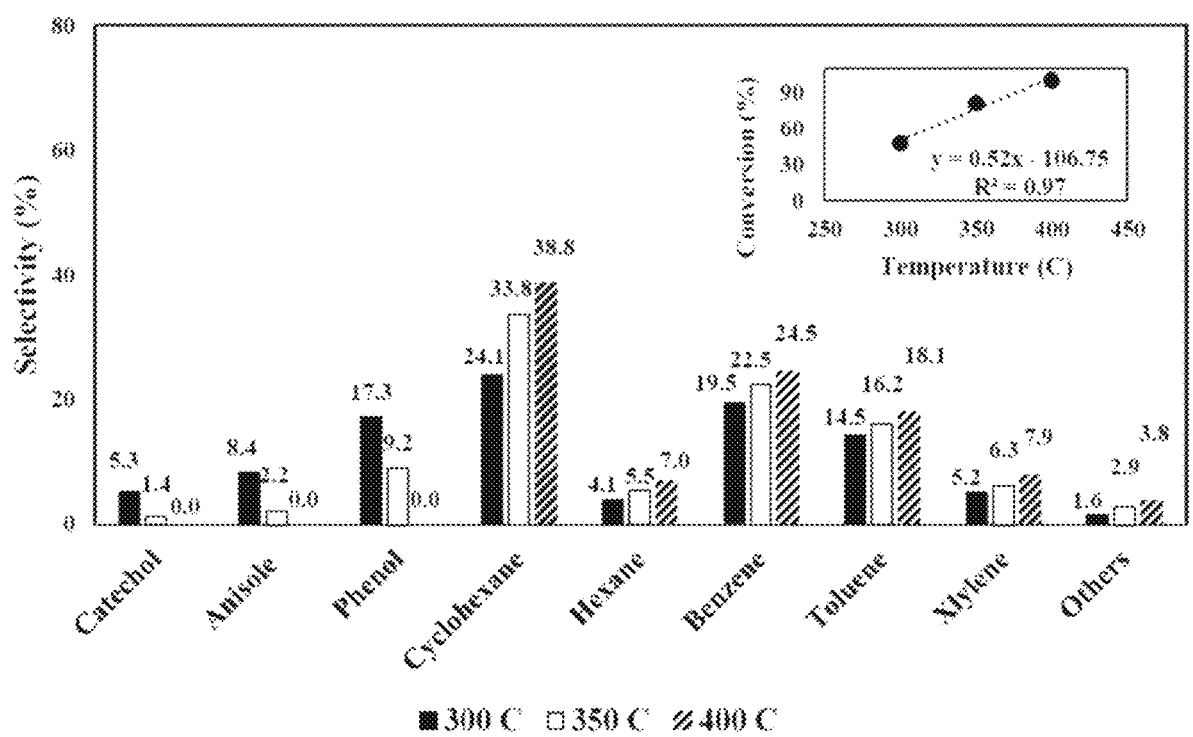
FIG. 15 depicts Example 1 guaiacol conversion and products selectivity at different temperatures using Ni/RM catalyst.
Figure 16:
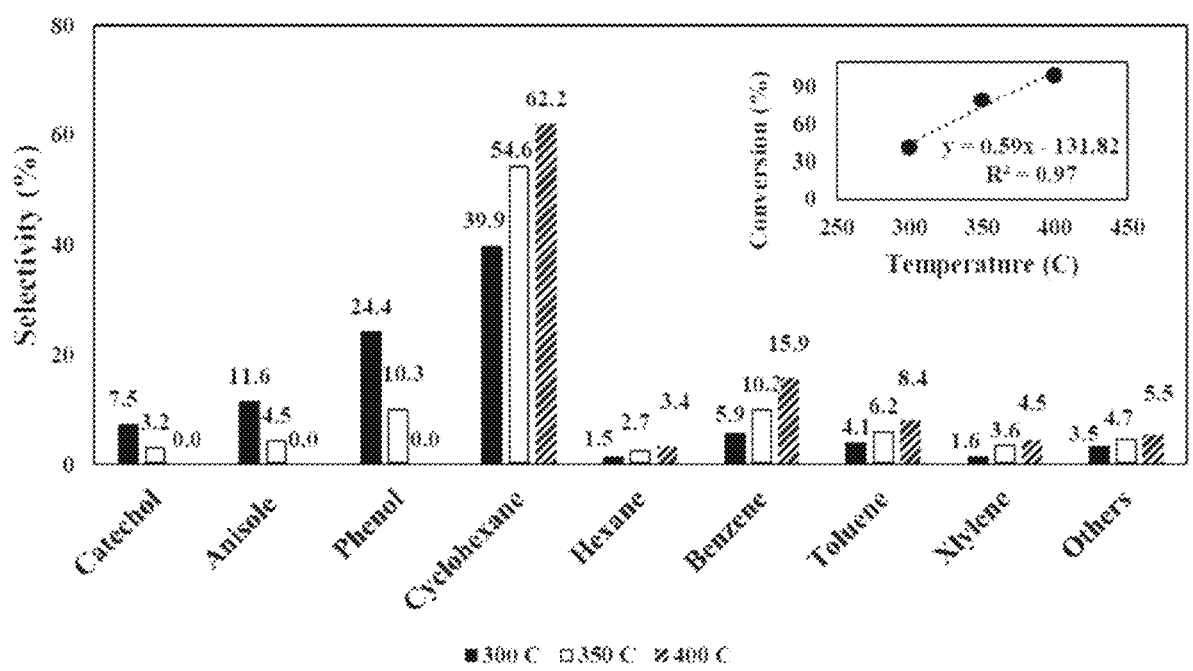
FIG. 16 depicts Example 1 guaiacol conversion and products selectivity at different temperatures using Ni/SiO$_2$—Al$_2$O$_3$ catalyst.

Pressure changes during the HDO of guaiacol at different reaction temperatures are shown in FIGS. 14a-c. The total pressure profile using Ni/SiO$_2$—Al$_2$O$_3$ fell below the pressure profile of Ni/RM catalyst due to higher hydrogen consumption in the case of the commercial catalyst (Table 3).

relatively lower selectivity as a result of ring opening. At a reaction temperature of 400° C. complete hydrodeoxygenation of guaiacol was achieved with both catalysts. However, Ni/SiO$_2$—Al$_2$O$_3$ was more effective in hydrogenation of aromatic ring compared to Ni/RM resulting in benzene, toluene, and xylene selectivities of 24.5%, 17.1%, and 7.9% respectively for Ni/RM, while these values were 15.9%, 8.4%, and 4.5% respectively for Ni/SiO$_2$—Al$_2$O$_3$. Higher rates of hydrogenation reaction over Ni/SiO$_2$—Al$_2$O$_3$ resulted in cyclohexane selectivity of 62.2% versus 38.8% for Ni/RM at 400° C. (FIGS. 15 and 16). This result is also reflected in higher hydrogen consumption over Ni/SiO$_2$—Al$_2$O$_3$ compared to Ni/RM (Table 3). The major gas product was methane for both catalysts.

Hydrogen Pressure Effect

Figure 17:
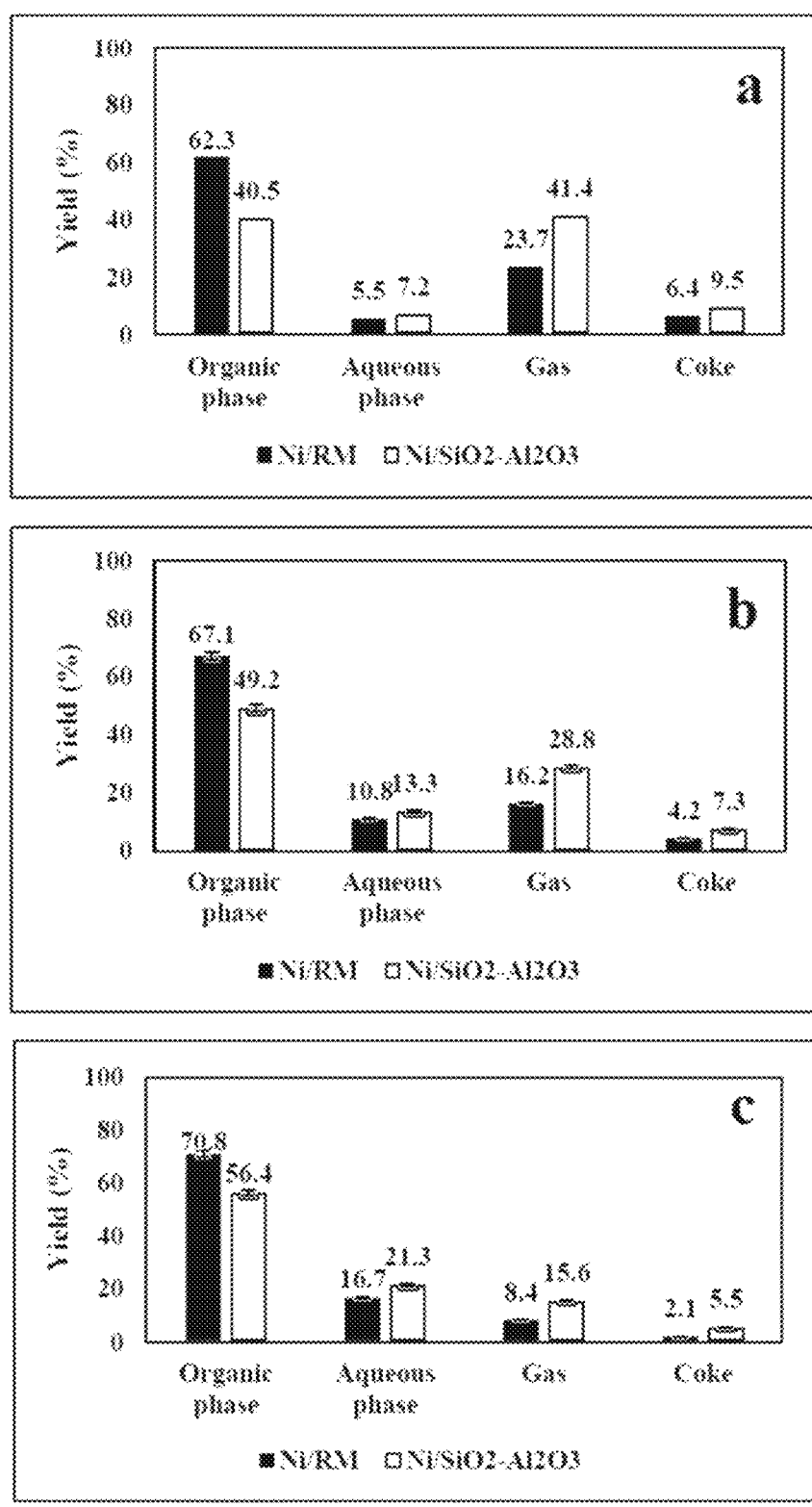
FIG. 17a depicts Example 1 products yield distribution using Ni/RM and Ni/SiO$_2$—Al$_2$O$_3$ at a hydrogen pressure of 4.83 MPa (700 psi).
FIG. 17b depicts Example 1 products yield distribution using Ni/RM and Ni/SiO$_2$—Al$_2$O$_3$ at a hydrogen pressure of 5.52 MPa (800 psi).
FIG. 17c depicts Example 1 products yield distribution using Ni/RM and Ni/SiO$_2$—Al$_2$O$_3$ at a hydrogen pressure of 6.21 MPa (900 psi).

The influence of hydrogen pressure on the guaiacol HDO products yield distribution is shown in FIGS. 17a-c. Increasing the initial hydrogen pressure from 4.83 to 6.21 MPa increased the total liquid product yield for both catalysts;

TABLE 3

Hydrogen consumption and gas composition of guaiacol HDO at different temperatures (the initial hydrogen pressure was 6.21 MPa) (the standard deviation of all data was within ±0.05).

| | Temperature (° C.) | | | | | |
|---|---|---|---|---|---|---|
| | 300 | | 350 | | 400 | |
| Catalyst | Ni/RM | Ni/SiO$_2$—Al$_2$O$_3$ | Ni/RM | Ni/SiO$_2$—Al$_2$O$_3$ | Ni/RM | Ni/SiO$_2$—Al$_2$O$_3$ |
| H$_2$ Consumption (mol H$_2$/kg guaiacol) | 0.19 | 0.24 | 0.29 | 0.38 | 0.37 | 0.45 |
| Gas composition (mol %) | | | | | | |
| CO | 6.8 | 0 | 5.4 | 0 | 4.4 | 0 |
| CO$_2$ | 10.4 | 8.5 | 9.8 | 6.2 | 8.2 | 2.3 |
| CH$_4$ | 42.2 | 57.3 | 49.6 | 66.9 | 55.8 | 71.5 |
| C$_2$H$_6$ | 9.3 | 7.4 | 11.5 | 9.6 | 13.4 | 11.6 |
| C$_3$H$_8$ | 17.3 | 15.4 | 11.6 | 9.8 | 9.6 | 8.4 |
| C$_4$H$_{10}$ | 9.2 | 6.6 | 7.4 | 4.3 | 5.3 | 3.2 |
| C$_5$H$_{12}$ | 4.1 | 3.7 | 3.7 | 2.1 | 2.1 | 1.7 |

FIGS. 16 and 17a-c show the HDO product selectivity and guaiacol conversion as a function of reaction temperature for Ni/RM and Ni/SiO$_2$—Al$_2$O$_3$ catalysts respectively. Increasing the reaction temperature improved the conversion of guaiacol in all HDO experiments. At reaction temperatures of 300 and 350° C., catechol, anisole, and phenol were produced due to demethylation, dehydroxylation, and demethoxylation of guaiacol respectively; however, the selectivity to these compounds was lower for Ni/RM compared to Ni/SiO$_2$—Al$_2$O$_3$(FIGS. 15 and 16). In contrast, the selectivity to benzene, toluene, and xylene (BTX) was lower for Ni/SiO$_2$—Al$_2$O$_3$ suggesting that Ni/RM was more effective in hydrodeoxygenation than Ni/SiO$_2$—Al$_2$O$_3$.

Figure 18:
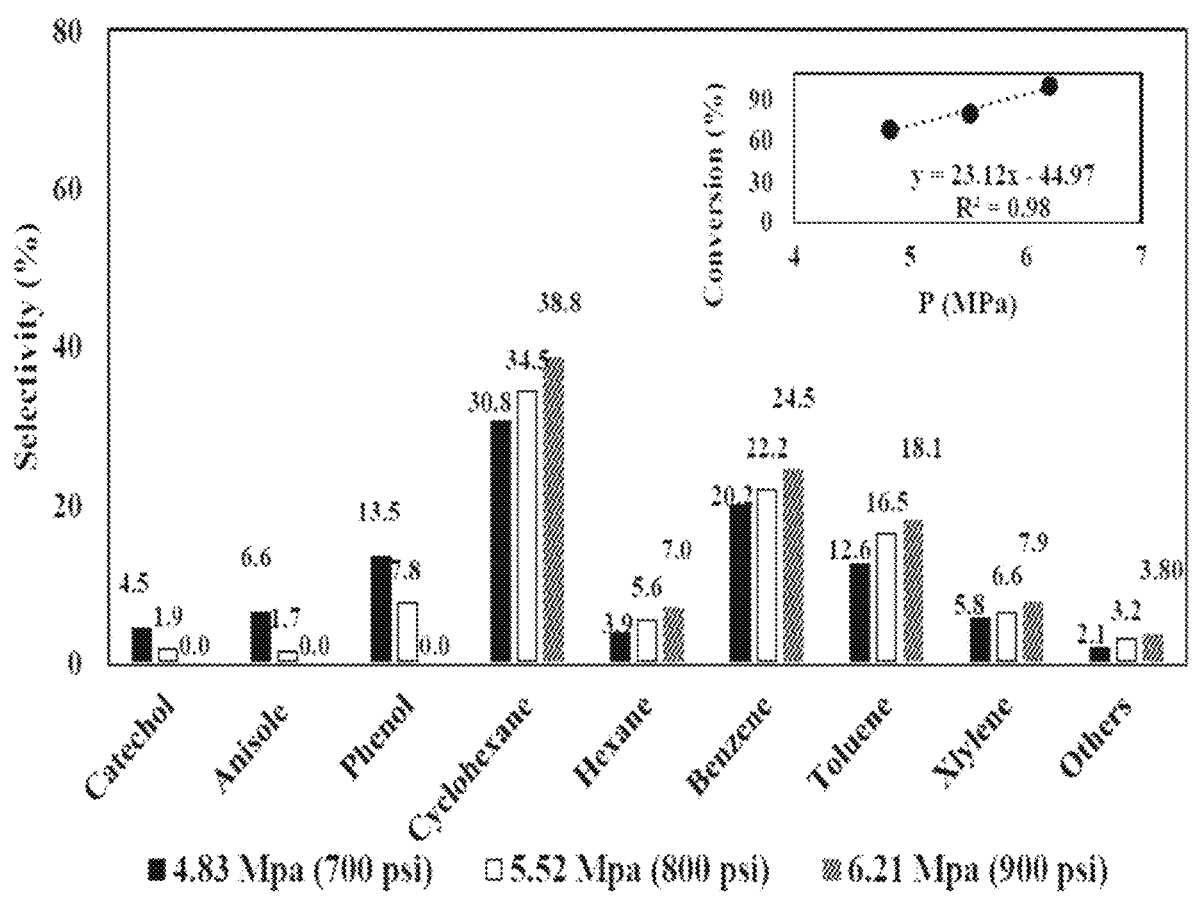
FIG. 18 depicts Example 1 guaiacol conversion and products selectivity at different hydrogen pressures using Ni/RM catalyst.

When the reaction temperature was increased from 300° C. to 400° C. the selectivity to oxygenated intermediates (catechol, anisole, and phenol) decreased significantly indicating that guaiacol was first converted to catechol, anisole, and phenol via demethylation, dehydroxylation, and demethoxylation, and subsequently to cyclohexane, benzene, toluene, and xylene. Hexane was also obtained in however, the organic liquid yield was much higher for Ni/RM. The increase in organic liquid yield could be due to an increase in concentration of adsorbed hydrogen on the catalyst surface and an increase in the amount of dissolved H$_2$ in the organic phase, as hydrogen pressure was increased [4, 15, 16]. For Ni/RM, the gas yield decreased from 23.7% to 8.4% over this pressure range while the gas yield decreased from 41.4% to 16.6% for Ni/SiO$_2$—Al$_2$O$_3$. The coke yield decreased from 6.4% to 2.1% for Ni/RM and from 9.5% to 5.5% using Ni/SiO$_2$—Al$_2$O$_3$(FIGS. 17a-c). This would suggest that higher levels of hydrogen pressure helped HDO reactions to predominate cracking and (re)polymerization reactions that produce gas and coke [17]. The increase in aqueous liquid yield by increasing hydrogen pressure could also confirm that higher H$_2$ pressures favored HDO reactions. Pressure profiles during the HDO of guaiacol at different hydrogen pressures are shown in FIG. 18. The reaction pressure in the case of Ni/SiO$_2$—Al$_2$O$_3$ was lower than that of Ni/RM due to higher hydrogen consumption by the commercial catalyst (Table 4).

TABLE 4

Hydrogen consumption and gas composition of guaiacol HDO at different pressures (the reaction temperature was 400° C.) (the standard deviation of all data was within ±0.05).

| | Pressure (MPa) | | | | | |
|---|---|---|---|---|---|---|
| | 4.83 | | 5.52 | | 6.21 | |
| | Catalyst | | | | | |
| | Ni/RM | Ni/SiO$_2$—Al$_2$O$_3$ | Ni/RM | Ni/SiO$_2$—Al$_2$O$_3$ | Ni/RM | Ni/SiO$_2$—Al$_2$O$_3$ |
| H$_2$ Consumption (mol H$_2$/kg guaiacol) | 0.22 | 0.29 | 0.31 | 0.36 | 0.39 | 0.45 |
| Gas composition (mol %) | | | | | | |
| CO | 10.4 | 0 | 7.6 | 0 | 4.4 | 0 |
| CO$_2$ | 18.7 | 14.4 | 10.1 | 7.7 | 8.2 | 2.3 |
| CH$_4$ | 42.8 | 61.3 | 51.9 | 68.6 | 55.8 | 71.5 |
| C$_2$H$_6$ | 10.2 | 8.7 | 11.5 | 9.3 | 13.4 | 11.6 |
| C$_3$H$_8$ | 7.8 | 6.6 | 8.2 | 6.5 | 9.6 | 8.4 |
| C$_4$H$_{10}$ | 5.7 | 4.2 | 5.5 | 3.7 | 5.3 | 3.2 |
| C$_5$H$_{12}$ | 4.3 | 2.8 | 3.3 | 2.4 | 2.1 | 1.7 |

Figure 19:
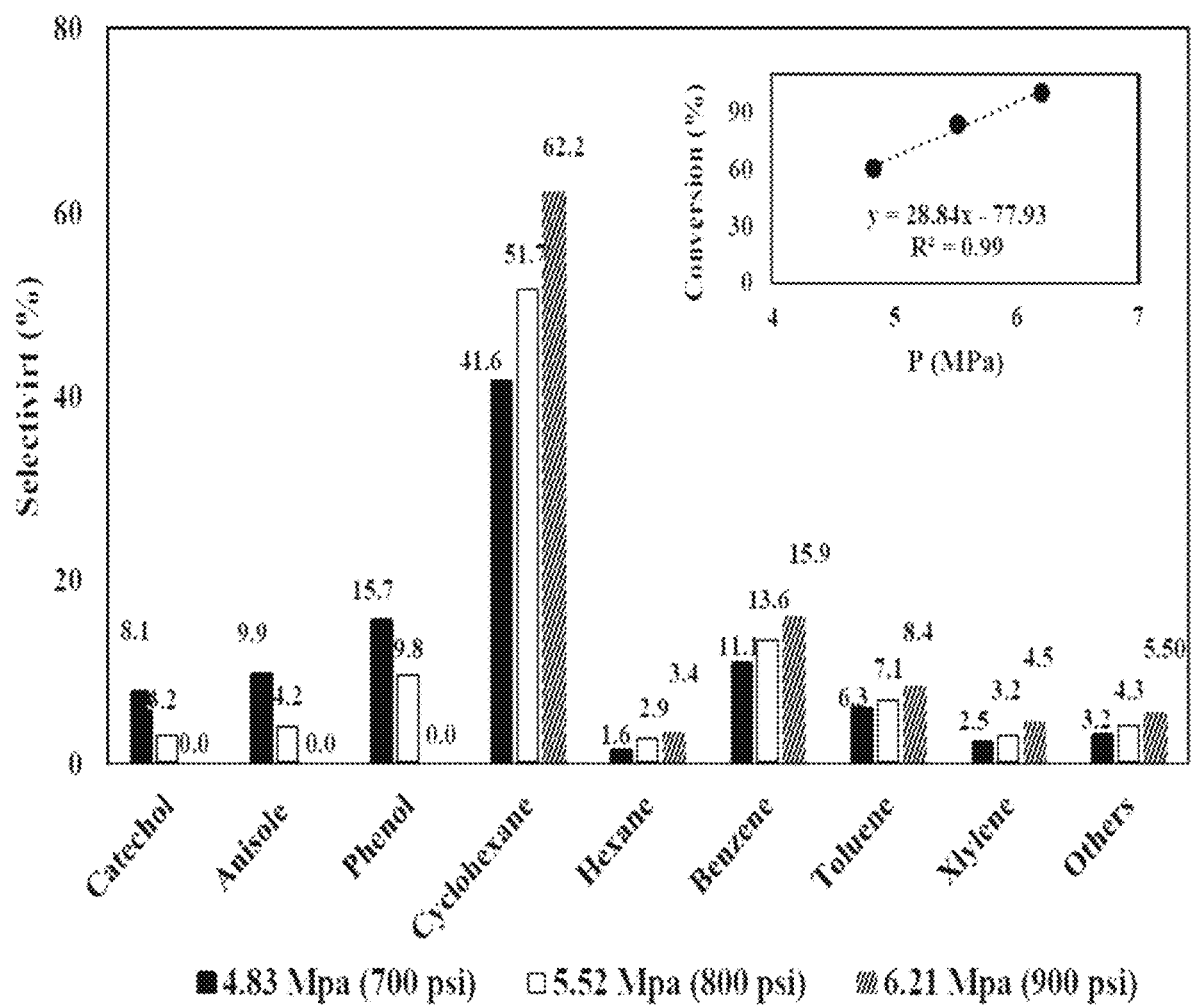
FIG. 19 depicts Example 1 guaiacol conversion and products selectivity at different hydrogen pressures using Ni/SiO$_2$—Al$_2$O$_3$ catalyst.

During the catalytic hydrotreatment processes, multiple reactions may occur, including hydrogenation, hydrogenolysis, hydrodeoxygenation, hydrocracking, and polymerization [18, 19]. Hydrogenation for ring saturation, hydrocracking for gasification, and methanation made hydrogen consumption exceed the deoxygenated stoichiometric ratio [19]. In order to reduce the hydrogen consumption, the direct deoxygenation without ring saturation is desirable in HDO. FIGS. 18 and 19 show the guaiacol conversion and evolution of products as a function of hydrogen pressure over Ni/RM and Ni/SiO$_2$—Al$_2$O$_3$ respectively. At initial H$_2$ pressures of 4.83 MPa and 5.52 MPa, oxygenated intermediates (catechol, anisole, and phenol) were produced, while these compounds were completely deoxygenated when the initial H$_2$ pressure was 6.21 MPa. However, higher selectivity to benzene, toluene, and xylene was observed (24.5%, 18.1%, and 7.9% respectively) for Ni/RM compared to Ni/SiO$_2$—Al$_2$O$_3$ (15.9%, 8.4%, and 4.5% respectively) resulting in less hydrogen consumption in the case of Ni/RM (Table 4). This result was attributed to higher ring hydrogenation activity of Ni/SiO$_2$—Al$_2$O$_3$ since this catalyst had a higher Ni loading (63.3% according to Table 1) than Ni/RM (40%). Furthermore, higher catalytic activity of Ni/SiO$_2$—Al$_2$O$_3$ led to higher cyclohexane selectivity of 62.2% (FIG. 20) because of the hydrogenation of the aromatic ring and demethylation reaction resulting in lower BTX selectivity.

The major gas product for both catalysts was methane (Table 4) because of demethylation, methanation and cracking reactions. It is interesting to note that at all temperatures and pressures, the Ni/RM produced CO, whereas the Ni/SiO$_2$—Al$_2$O$_3$ did not produce any CO probably because of the methanation reaction that was stronger in this catalyst than the Ni/RM.

Guaiacol HDO liquid products (organic and aqueous phases) were analyzed for Ni using ICP in order to investigate leaching effect. The Ni content of HDO products was below the detection limit (0.05 mg/kg) suggesting that Ni did not leach into the HDO products (data not reported).

Evaluation of HDO Process

Figure 20:
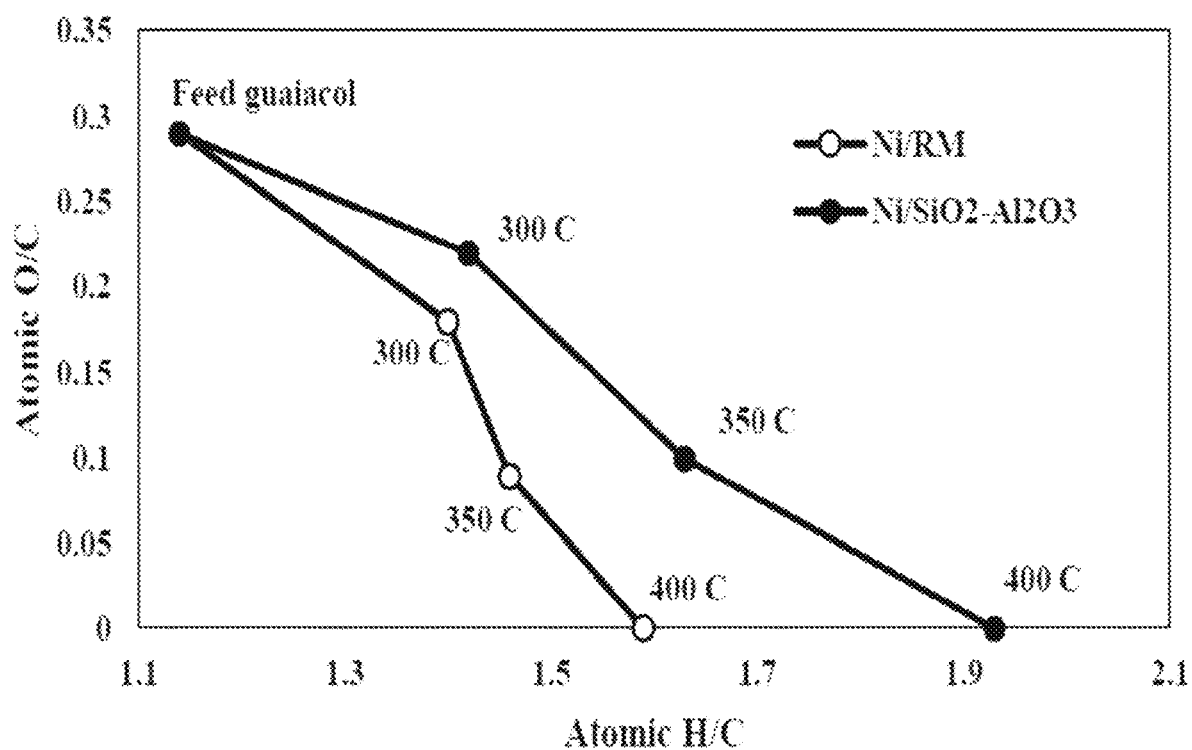
FIG. 20 depicts a Van-Krevelen diagram of guaiacol HDO products from Example 1 at different reaction temperatures.
Figure 21:
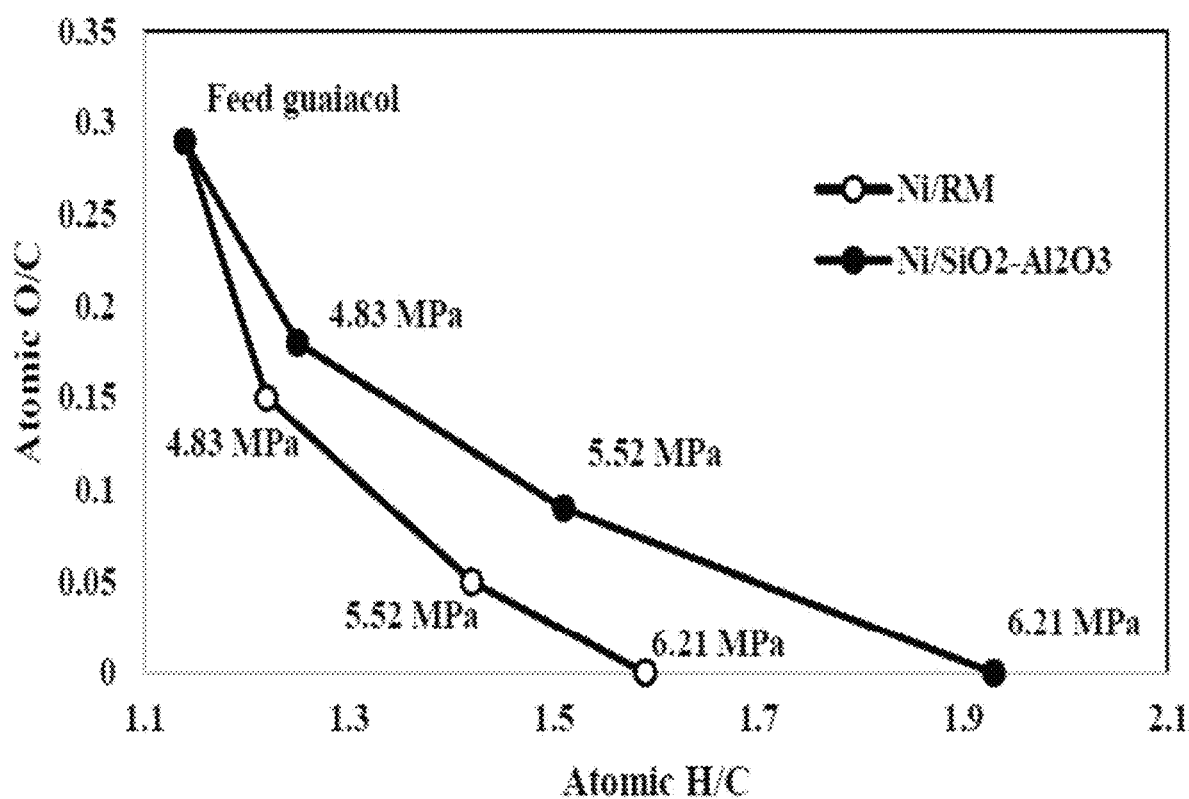
FIG. 21 depicts a Van-Krevelen diagram of guaiacol HDO products from Example 1 at different initial hydrogen pressures.

To accurately visualize and extrapolate trends from elemental analysis, the elemental composition of the products was plotted in Van Krevelen-type diagrams. The molar O/C versus molar H/C ratios of the feed guaiacol and the HDO products are shown in FIGS. 20 and 21 at different temperatures and initial hydrogen pressures respectively. The O/C ratio of HDO products decreased as a function of reaction temperature for both catalysts; however, higher hydrogenation occurred over Ni/SiO$_2$—Al$_2$O$_3$. At 300° C. the O/C ratio of HDO products of Ni/RM was 0.18 versus 0.22 for Ni/SiO$_2$—Al$_2$O$_3$. At 350° C. this value was relatively the same for Ni/RM and Ni/SiO$_2$—Al$_2$O$_3$ (0.09 and 0.10 respectively); however, the H/C ratios at 300, 350, and 400° C. were 1.40, 1.46, and 1.59 respectively for Ni/RM versus 1.42, 1.63, and 1.93 respectively for Ni/SiO$_2$—Al$_2$O$_3$ HDO products. Thus, there was more hydrogenation with Ni/SiO$_2$—Al$_2$O$_3$ than Ni/RM. Moreover, the Van Krevelen plot of HDO products over Ni/RM catalyst at different H$_2$ pressures (FIG. 21) fell below the HDO products over Ni/SiO$_2$—Al$_2$O$_3$ showing that for HDO of guaiacol, less saturation of double bonds took place over Ni/RM catalyst resulting in lower hydrogen consumption, which is desirable in HDO process. These results were mainly attributed to higher catalytic activity of Ni/SiO$_2$—Al$_2$O$_3$ because of the higher Ni loading that favored hydrogenation and hydrocracking reactions. Also, to a lesser extent, silica and alumina can catalyze demethylation reaction [20, 21, 22] contributing to increased hydrogen consumption in the case of Ni/SiO$_2$—Al$_2$O$_3$.

Reaction Pathways

Figure 22:
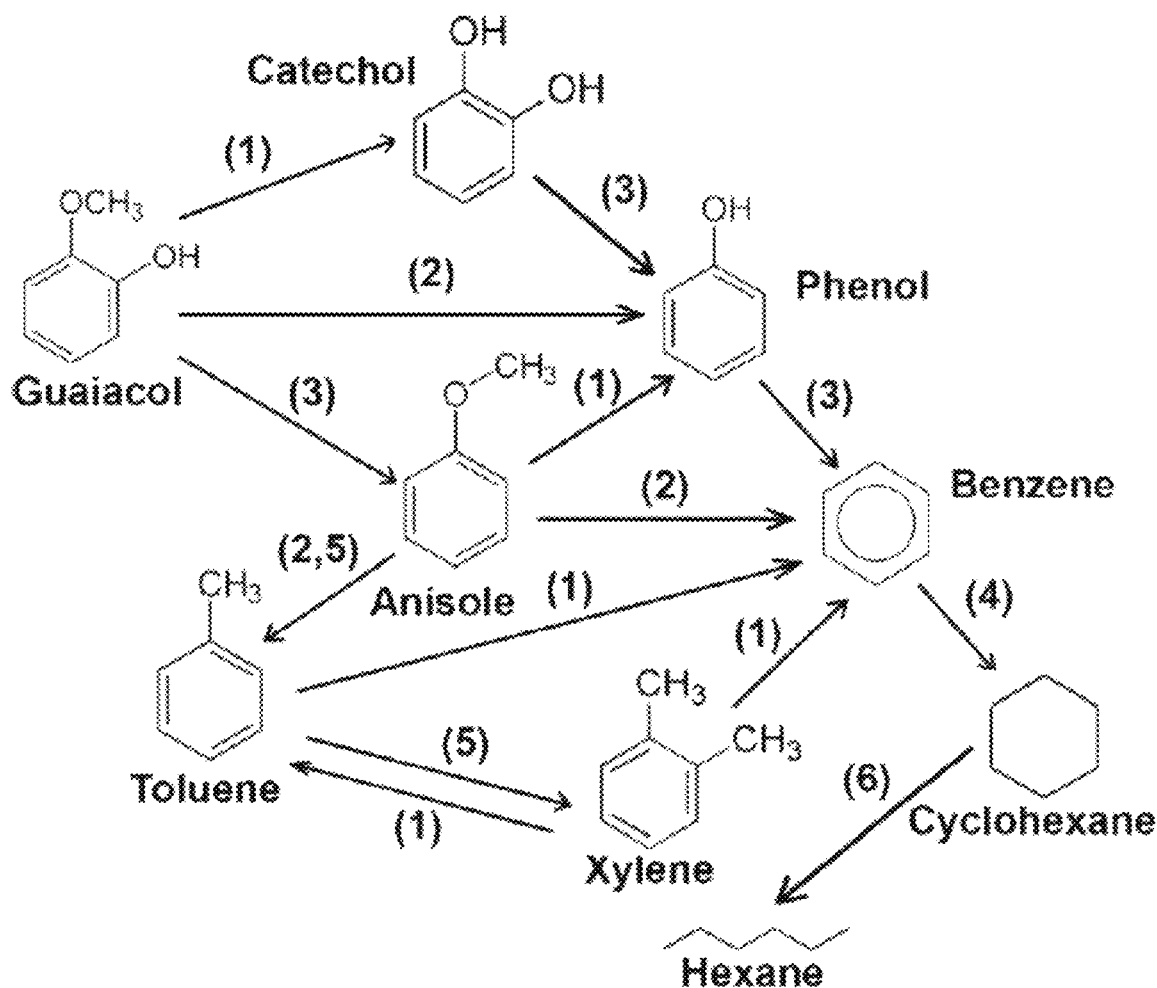
FIG. 22 illustrates an exemplary reaction network of guaiacol HDO. 1: DME (demethylation), 2: DMO (demethoxylation), 3: DHO (dehydroxylation), 4: HYD (hydrogenation), 5: TAL (transalkylation), 6: RO (ring opening).

For the study of HDO pathways of guaiacol over Ni/RM and Ni/SiO$_2$—Al$_2$O$_3$, HDO of catechol, anisole, phenol, cyclohexane, benzene, toluene, and xylene was carried out under the same conditions as the HDO of guaiacol. These reaction results are shown in Table 5. Guaiacol was first converted to catechol, anisole, and phenol via demethoxylation and dehydroxylation reactions. The selectivity to catechol, anisole, and phenol was 1.5%, 2.3%, and 9.5% respectively for Ni/RM and 3.4%, 4.7%, and 10.8% respectively for the commercial catalyst after HDO of guaiacol. Anisole underwent demethylation, demethoxylation, and alkylation to produce phenol, benzene, and toluene respectively. Catechol was first converted to phenol via dehydroxylation and then converted to benzene. Benzene was initially formed via demethoxylation of anisole, dehydroxlylation of phenol, and demethylation of toluene, and then hydrogenated to cyclohexane. At relatively lower selectivity compared to other intermediates, xylene was formed via a transalkylation reaction [23, 24]. HDO of benzene produced cyclohexane through ring hydrogenation at selectivity of 88.2% and 67.6% over Ni/RM and Ni/SiO$_2$—Al$_2$O$_3$ respectively, but the ring opening was more pronounced over the commercial catalyst (32.4% selectivity) compared to Ni/RM (11.8% selectivity) (Table 5). A summary of the HDO pathways of guaiacol based on the observed product distribution is proposed in FIG. 22. Pathways 1, 2, and 3 are demethylation, demethoxylation, and dehydroxylation processes, respectively. Pathway 4 is hydrogenation which was more pronounced over Ni/SiO$_2$—Al$_2$O$_3$ than Ni/RM. Pathway 5 is a transalkylation reaction in which the methyl group is transferred to the aromatic ring [25]. In conclusion, similar reaction pathways over both catalysts were observed while products selectivity was quite different as discussed previously. Overall, the conversion of oxygenated compounds (guaiacol, catechol, anisole, and phenol) was higher for Ni/RM compared to the commercial catalyst suggesting higher activity of Ni/RM catalyst for deoxygenation than hydrogenation (Table 5). The Ni/SiO$_2$—Al$_2$O$_3$ showed higher conversion for hydrogenation of BTX and ring opening compared to Ni/RM.

TABLE 5

Conversion and selectivity of guaiacol and intermediates HDO (the standard deviation of all data was within ± 0.5).

| Sub. | Catalyst | Conv. (%) | catechol (OH,OH) | anisole (OCH₃) | phenol (OH) | cyclohexane | hexane | benzene | toluene (CH₃) | xylene (CH₃,CH₃) |
|---|---|---|---|---|---|---|---|---|---|---|
| guaiacol (OCH₃, OH) | Ni/RM | 83.2 | 1.5 | 2.3 | 9.5 | 34.8 | 5.7 | 23.1 | 16.6 | 6.5 |
|  | Ni/SiO₂—Al₂O₃ | 78.6 | 3.4 | 4.7 | 10.8 | 57.3 | 2.8 | 10.7 | 6.5 | 3.8 |
| catechol (OH, OH) | Ni/RM | 81.4 | — | — | 21.6 | 19.6 | 11.5 | 47.3 | — | — |
|  | Ni/SiO₂—Al₂O₃ | 76.4 | — | — | 36.9 | 31.4 | 7.6 | 24.1 | — | — |
| anisole (OCH₃) | Ni/RM | 71.3 | — | — | 14.5 | 17.4 | 4.9 | 38.1 | 15.7 | 9.4 |
|  | Ni/SiO₂—Al₂O₃ | 66.7 | — | — | 22.7 | 32.8 | 8.3 | 20.4 | 10.6 | 5.2 |
| phenol (OH) | Ni/RM | 85.6 | — | — | — | 31.6 | 9.8 | 58.6 | — | — |
|  | Ni/SiO₂—Al₂O₃ | 74.9 | — | — | — | 58.3 | 5.4 | 36.3 | — | — |
| cyclohexane | Ni/RM | 68.2 | — | — | — | — | 100 | — | — | — |
|  | Ni/SiO₂—Al₂O₃ | 76.4 | — | — | — | — | 100 | — | — | — |

Selectivity (%)

TABLE 5-continued

Conversion and selectivity of guaiacol and intermediates HDO (the standard deviation of all data was within ± 0.5).

| Sub. | Catalyst | Conv. (%) | catechol | guaiacol | phenol | cyclohexane | hexane | benzene | toluene | xylene |
|---|---|---|---|---|---|---|---|---|---|---|
| benzene | Ni/RM | 71.4 | — | — | — | 88.2 | 11.8 | — | — | — |
|  | Ni/SiO$_2$—Al$_2$O$_3$ | 89.3 | — | — | — | 67.6 | 32.4 | — | — | — |
| toluene | Ni/RM | 78.6 | — | — | — | 34.4 | 15.6 | 44.4 | — | 5.6 |
|  | Ni/SiO$_2$—Al$_2$O$_3$ | 91.1 | — | — | — | 66.5 | 9.8 | 21.3 | — | 2.4 |
| xylene | Ni/RM | 74.3 | — | — | — | 26.7 | 13.6 | 37.3 | 22.4 | — |
|  | Ni/SiO$_2$—Al$_2$O$_3$ | 80.2 | — | — | — | 56.8 | 8.7 | 20.6 | 13.9 | — |

Selectivity (%)

Reaction conditions: 350° C., 6.21 MPa, 30 min.

Kinetic Studies

Figure 23:
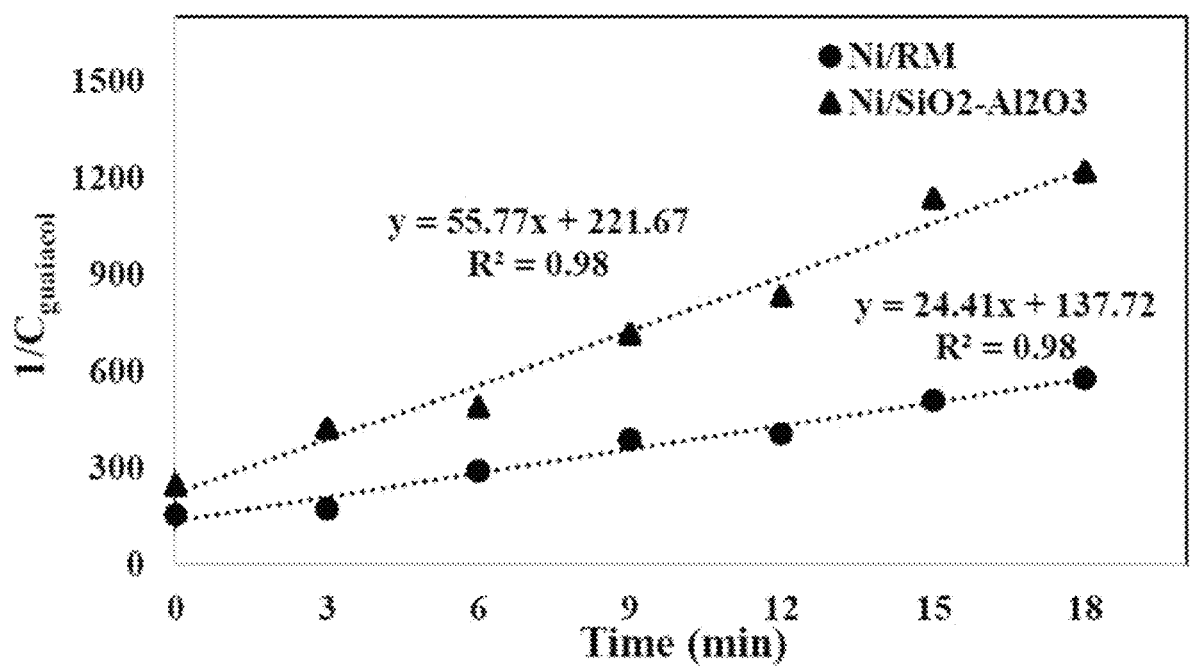
FIG. 23 depicts from Example 1 determination of reaction order and rate constant by integral method: reaction temperature 400° C., H$_2$ pressure 6.21 MPa (900 psi).
Figure 24:
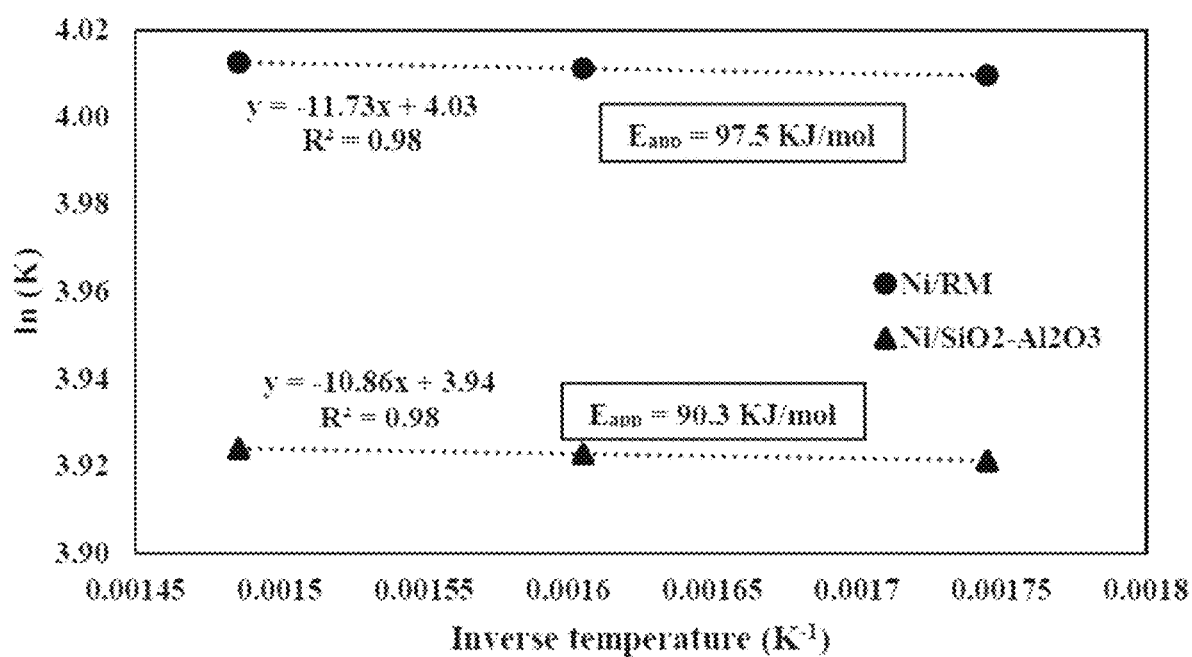
FIG. 24 depicts from Example 1 an Arrhenius-type plot for guaiacol HDO on Ni/RM and Ni/SiO$_2$—Al$_2$O$_3$.

In order to determine the reaction order and rate constant of the reaction, the activity data (concentration and time) was fitted to power-law equation [6]. As shown in FIG. 23, the slope of a plot of $1/C_{guaiacol}$ as a function of reaction time is linear with slope of k; hence, HDO of guaiacol global kinetics followed the second order mechanism, which was in agreement with other studies [26]. The rate constant of Ni/SiO$_2$—Al$_2$O$_3$ (55.8 ml/mol·s) was more than two times higher than the Ni/RM catalyst (24.4 ml/mol·s), which explains the higher activity of Ni/SiO$_2$—Al$_2$O$_3$ compared to Ni/RM. Ni/RM has shown better performance than Ni/SiO$_2$—Al$_2$O$_3$ since the latter favored ring hydrogenation reaction. Since the support was different for both catalysts, the activity difference could be due to both Ni loading and interaction with support. In the case of Ni/RM the elemental Ni loading was less than the nominal 40% because the XRD pattern showed the presence of NiO after the reduction with H$_2$. Apparent activation energy for each catalyst was calculated using Arrhenius-type plots (equation (4)) [6](FIG. 24). The apparent activation energy for the Ni/RM and Ni/SiO$_2$—Al$_2$O$_3$ catalysts was 97.5 KJ/mol and 90.3 KJ/mol, respectively. These values were within the range of various values reported in literature [26, 24, 27]. Therefore the global kinetic model for guaiacol on Ni/RM and Ni/SiO$_2$—Al$_2$O$_3$ catalysts are shown in equations (5) and (6) respectively:

$$\ln(k) = \ln(k_0) - \frac{E}{RT} \quad (4)$$

$$-r_G = 56.56 e^{\left(-\frac{97.5}{RT}\right)} \cdot C_G^2 \quad (5)$$

$$-r_G = 51.42 e^{\left(-\frac{90.3}{RT}\right)} \cdot C_G^2 \quad (6)$$

Catalyst Deactivation and Regeneration

Three mechanisms contributed to catalyst deactivation: coke formation, oxidation of Ni, and formation of iron nickel oxide. In order to evaluate the catalyst life, the recovered catalysts after HDO experiments were washed with a solution of 1:1 (wt. ratio) toluene/methanol and then used consecutively after each wash for HDO tests without any catalyst regeneration. The selectivity of HDO products changed as the catalyst deactivated. A summary of the results of these experiments is shown in Table 6. Metal loading and pore structure of support have been proposed to affect coke deposition [19, 28]. After four consecutive runs using Ni/RM, the catalyst completely deactivated due to coking and possible oxidation of active Ni sites, both of which can contribute to the reduction of BET-specific surface area from 79.34 m$^2$/g to 59.17 m$^2$/g. After the fifth run the catalyst did not show any activity and the guaiacol did not undergo any HDO reactions. There was more coke built up on the catalyst surface that further reduced the BET-specific surface area to 56.35 m$^2$/g. The Ni/SiO$_2$—Al$_2$O$_3$ completely deactivated after five consecutive runs and its BET-specific surface area reduced from 118.38 m$^2$/g to 77.93 m$^2$/g. After the sixth run the catalyst did not show any activity for HDO reactions; however, its BET-specific surface area further reduced to 72.19 m$^2$/g. The reduction in BET-specific surface area suggested that coke was formed in the pores of the catalyst.

The spent catalysts were placed in the muffle furnace to burn off the deposited coke at 400° C. for four hours followed by reduction as explained previously. The regenerated/activated catalyst was used in HDO experiments. A summary of these HDO test results is shown in Table 6. Guaiacol conversion and HDO products selectivity over Ni/RM were similar to those of the fresh catalyst (Table 7). These results indicated that the Ni/RM catalyst regained its activity after the regeneration/activation process. However, the regeneration of the commercial Ni/SiO$_2$—Al$_2$O$_3$ was not possible following the same procedure and the catalyst did not show HDO activity after regeneration/reduction. The BET-specific surface area of the regenerated Ni/SiO$_2$—Al$_2$O$_3$ catalyst was 88.81 m$^2$/g, which was much lower than the fresh catalyst (118.38 m$^2$/g), suggesting that some Ni particles probably formed stable compounds with the support phase during regeneration. Additionally, when exposed to air, the reduced Ni/SiO$_2$—Al$_2$O$_3$ catalyst underwent spontaneous exothermic reaction that could be due to oxidation of free Ni particles that were not interacting with the support phase.

TABLE 6

Catalyst recyclability results (reaction temperature 400° C., H$_2$ initial pressure 6.21 MPa) (the standard deviation of conversion and selectivity data was within ±0.5, and the standard deviation of BET data was within ±1.5).

| Catalyst/ Reuse # | BET surface area (m$^2$/g) | Conv. (%) | Catechol | Guaiacol | Phenol | Cyclohexane |
|---|---|---|---|---|---|---|
| Ni/RM | | | | | | |
| Fresh | 79.34 | 100 | 0 | 0 | 0 | 40.2 |
| Reuse 1 | 71.22 | 100 | 4.2 | 3.2 | 7.1 | 35.5 |
| Reuse 2 | 67.51 | 81.4 | 7.9 | 8.9 | 5.6 | 32.8 |
| Reuse 3 | 63.48 | 47.5 | 10.5 | 17.1 | 3.5 | 31.4 |
| Reuse 4 | 59.17 | 23.7 | 15.8 | 19.9 | 1.2 | 30.1 |
| Reuse 5 | 56.35 | 0 | — | — | — | — |

TABLE 6-continued

Ni/SiO$_2$—Al$_2$O$_3$

| | | | | | | |
|---|---|---|---|---|---|---|
| Fresh | 118.38 | 100 | 0 | 0 | 0 | 65.9 |
| Reuse 1 | 107.36 | 100 | 2.5 | 3.2 | 5.5 | 59.8 |
| Reuse 2 | 100.28 | 68.8 | 5.7 | 5.9 | 8.3 | 53.4 |
| Reuse 3 | 91.57 | 54.3 | 6.6 | 9.4 | 9.5 | 51.5 |
| Reuse 4 | 84.36 | 34.7 | 7.5 | 10.6 | 10.9 | 50.8 |
| Reuse 5 | 77.93 | 17.2 | 10.9 | 11.7 | 11.7 | 48.6 |
| Reuse 6 | 72.19 | 0 | — | — | — | — |

| | Selectivity (%) | | | |
|---|---|---|---|---|
| Catalyst/Reuse # | pentane | benzene | toluene | xylene |
| Ni/RM | | | | |
| Fresh | 7.3 | 25.5 | 18.8 | 8.2 |
| Reuse 1 | 6.7 | 23.6 | 15.4 | 4.3 |
| Reuse 2 | 4.9 | 21.9 | 14.8 | 3.2 |
| Reuse 3 | 2.6 | 20.7 | 12.5 | 1.7 |
| Reuse 4 | 1.5 | 19.4 | 11.3 | 0.8 |
| Reuse 5 | — | — | — | — |
| Ni/SiO$_2$—Al$_2$O$_3$ | | | | |
| Fresh | 3.6 | 16.8 | 8.9 | 4.8 |
| Reuse 1 | 3.3 | 12.6 | 8.8 | 4.3 |
| Reuse 2 | 3.1 | 11.2 | 8.5 | 3.9 |
| Reuse 3 | 2.8 | 8.7 | 7.9 | 3.6 |
| Reuse 4 | 2.5 | 7.5 | 7.4 | 2.8 |
| Reuse 5 | 2.1 | 6.6 | 6.3 | 2.1 |
| Reuse 6 | — | — | — | — |

TABLE 7

HDO results of regenerated catalysts (the standard deviation of conversion and selectivity data was within ±0.5, and the standard deviation of BET data was within ±1.5).

| Catalyst | BET surface area (m$^2$/g) | Conv. (%) | catechol | guaiacol | phenol | cyclohexane | pentane | benzene | toluene | xylene |
|---|---|---|---|---|---|---|---|---|---|---|
| Ni/RM | 79.85 | 100 | 0 | 0 | 0 | 39.7 | 7.5 | 26.2 | 19.1 | 7.5 |
| Ni/SiO$_2$—Al$_2$O$_3$ | 88.81 | 0 | 0 | 0 | 0 | 0 | 0 | 0 | 0 | 0 |

Red mud, which is a waste material from the aluminum industry, was used as support material for preparation of the nickel hydrogenation/hydrodeoxygenation catalyst. Hydrodeoxygenation of guaiacol as a lignin model compound was investigated over the red mud-supported nickel catalyst.

For comparison, commercial Ni/SiO$_2$—Al$_2$O$_3$ was tested in the HDO process under similar conditions. Unlike traditional HDO catalysts (CoMo/Al$_2$O$_3$ and NiMo/Al$_2$O$_3$), this catalyst did not require any pre-treatments such as sulfidation and could be used as received. Also, this catalyst was much cheaper than typical noble metal catalysts that are widely used for HDO reactions. The Van-Krevelen diagrams of HDO products at different reaction temperatures and hydrogen pressures showed that increasing the reaction temperature and hydrogen pressure improved HDO reactions. Complete deoxygenation of guaiacol was achieved at a reaction temperature of 400° C. when the initial hydrogen pressure was 6.21 MPa (900 psi). Ni/RM showed higher activity for deoxygenation while hydrogenation of the aromatic ring was more pronounced for the commercial Ni/SiO$_2$—Al$_2$O$_3$. Consequently, the Ni/RM consumed less hydrogen than Ni/SiO$_2$—Al$_2$O$_3$. Hydrocracking and coke formation were significantly lower in the case of Ni/RM catalyst, which is desirable in HDO process. The kinetics of guaiacol HDO followed the second order model for both catalysts, while higher rate constant and lower activation energy were determined for Ni/SiO$_2$—Al$_2$O$_3$ catalyst compared to Ni/RM. The increased catalytic activity of Ni/SiO$_2$—Al$_2$O$_3$ was ascribed to higher Ni loading and higher BET-specific surface area of the catalyst.

Coke formation was the major mechanism of catalyst deactivation, although oxidation of active Ni sites and formation of iron nickel oxide could also contribute to catalyst deactivation. After regeneration by burning off the coke and reducing with hydrogen, the activity of the Ni/RM catalyst was completely restored in contrast to the commercial catalyst that was not regenerable. Red mud can serve as a nickel catalyst support for HDO processes.

Example 2—Hydrodeoxygenation of Pinyon Juniper Catalytic Pyrolysis Oil Using Red Mud-Supported Nickel Catalysts In this example, Ni/RM catalysts were used for upgrading of Pinyon Juniper (PJ) catalytic pyrolysis oil via hydrodeoxygenation (HDO).

Material

PJ biomass chips were supplied by the U.S. Bureau of Land Management. Red mud was used as the catalyst for fast pyrolysis of biomass. The wet red mud was dried at room temperature, reformulated and then ground and sieved to a particle size of 125-180 μm. The ground particles were calcined at 550° C. in a muffle furnace (Thermo Fisher Scientific, Inc. Waltham, Mass., USA) for 5 h before being used for the pyrolysis. The detailed characterization of the red mud has been reported by Yathavan and Agblevor [29]. Analytical-grade nickel nitrate hexahydrate (Ni(NO3).6H$_2$O) was purchased from Alfa Aesar (Haverhill, Mass., USA). High purity (99%) hydrogen (Airgas, Pa., USA) was used for HDO experiments. Commercial nickel on silica/alumina (~65 wt % loading Ni) catalyst powder, obtained from Sigma-Aldrich (St. Louis, Mo., USA), was used (as received) in HDO experiments for comparison.

PJ woodchips ground to pass a 2-mm mesh were used as feedstock for production of catalytic pyrolysis oil. The pyrolysis was carried out in a pilot plant bubbling fluidized bed reactor described in detail by Mante and Agblevor [30]. At a feeding rate of 0.9 kg/h (2 lb/h), catalytic pyrolysis oil was produced at 400° C. using the RM catalyst. The pyrolytic products were condensed using a series of two ethylene glycol-cooled condensers and an electrostatic precipitator (ESP) operating at 30 kV. Details of the pyrolysis pilot plant can be found elsewhere [30].

Ni/RM Catalyst Preparation

Ni/RM catalysts were prepared at different concentrations of nickel using the same wet impregnation method from Example 1[1, 2]. At room temperature the calculated amount of Ni(NO3).6H$_2$O was dissolved in 100 ml of deionized water and then mixed with red mud (particle size<90 μm). The mixture was heated to 70° C. and continuously stirred for five hours to prepare the catalyst precursor. The catalyst precursor was dried at 105° C. for 10 hours and then calcined at 620° C. for five hours. The catalyst precursor was reduced for six hours at 450° C. using a reducing gas mixture of 10% H$_2$ and 90% N$_2$ at a flow rate of 20 ml/min. to obtain the tested catalyst, which was designated as x wt % Ni/RM (x=10, 20, 30, 40, 50, 65).

The BET (Brunauer-Emmett-Teller) surface area of Ni/RM catalysts was determined on an MS-16 BET analyzer (Quantachrome Instruments, Boynton Beach, Fla., USA). A 0.1 g catalyst sample was used in each measurement. All samples were degassed at 300° C. for four hours prior to duplicate simultaneous measurements. A standard porous Al$_2$O$_3$ sample was also recorded along with each run to ensure consistency between the different samples.

TG-TPR (thermo gravimetric-temperature programmed reduction) studies were carried out using a TGA Q500 (TA Instruments, Lindon, Utah, USA). Twenty-five mg of catalyst (calcined form) was heated in a flow of 10% H$_2$/90% N$_2$ (20 ml/min.) from room temperature to 700° C. at a heating rate of 10° C./min. Hydrogen uptake was monitored by the change of sample weight according to the plot of derivative weight vs. temperature.

X-ray powder diffraction (XRD) analyses were carried out by Hazen Research Inc. (Golden, Colo., USA). The samples were pulverized by hand in a mortar and pestle with isopropyl alcohol and analyzed using a Bruker D8 Advance with Davinci design and a Lynxeye detector. The pattern was measured in the interval from 5 to 85 in 2e using a 0.02 step size and 40 seconds of counting time.

Scanning electron microscopy (SEM) analysis was conducted on a FEI Quanta FEG-650 (Thermo Fisher Scientific, Inc., Waltham, Mass., USA). For preparation of the specimens a small amount of catalyst was placed on a two-sided sticky tape resting on an aluminum holder and observed at different magnifications. Images were recorded using a low vacuum secondary electron (LFD) detector.

For inductively-coupled plasma (ICP) analysis, 0.5 g of a catalyst sample was digested in nitric acid at 95° C. for one hour. Then 12 ml 30 wt % hydrogen peroxide was added to the digestion tube and cooled to room temperature [33]. The extracts were measured using a Thermo iCAP 6300 ICP-OES Inductively-Coupled Plasma Spectrophotometer (Thermo Fisher Scientific, Inc., Waltham, Mass., USA) with Optical Emission.

Hydrodeoxygenation of Bio-Oil

The bio-oil was subjected to HDO reactions in a Parr Series 4560 300 mL autoclave reactor (Parr Instruments, Moline, Ill., USA). The reactor can withstand a maximum pressure of 14 MPa at 500° C. A Parr 4848 controller was used to control the internal temperature and impeller speed. In a typical test, bio-oil (20 g) and catalyst (3 g) were loaded into the reactor. The reactor was first flushed with nitrogen three times and then flushed with hydrogen three times to purge the reactor. High purity hydrogen was supplied from a reservoir tank via a pressure regulator. The reactor was then pressurized with hydrogen to 6.2 MPa, and a gas sample was taken from a gas release valve from the gas sampling port for gas analysis when the reactor was at room temperature. The reactor was then heated to a reaction temperature (400 or 450° C.) at a heating rate of 15° C./min. using a heating mantle. The reaction time was recorded when the required temperature was reached. The stirrer speed was kept constant (~1000 rpm) in all experiments.

After the desired reaction time (30 minutes), the reactor was cooled to room temperature using the internal cooling coil and an external air fan simultaneously. A gas sample was collected in a tedlar bag for gas analysis when the reactor was cooled down to room temperature. Hydrogen consumption was measured using equation (1).

$$H_2 \text{ consumption}\left(\frac{\text{mole } H_2}{\text{g biooil}}\right) = (n_{i_{H2}} - x_{f_{H2}} \cdot n_{f_{tot}}) \times \frac{1}{20 \text{ g biooil}} \quad (1)$$

Where $n_{i_{H2}}$ is the initial number of mole of hydrogen, $x_{f_{H2}}$ is the final mole fraction of hydrogen, and $n_{f_{tot}}$ is the total number of moles of gas at the end of the experiment.

After each experiment, the liquid products were collected in centrifuge test tubes and centrifuged (using a 5702 R centrifuge, Eppendorf, Germany) for 30 minutes at g-force of 2147 to separate the resulting aqueous and organic phases and residual solids and catalyst. Both liquid phases were separated and weighed for mass balance determination. The solids (catalyst and coke) were collected and dried at 95° C. for six hours. The vessel and reactor parts were rinsed with methanol-toluene mixture (1:1 vol. ratio) to collect any remaining catalyst and oil. The solvent washings were filtered through Whatman 42 ashless filter paper (GE Healthcare, United Kingdom) and dried at 95° C. The weight of filter paper was recorded before and after filtration.

The total mass of gaseous product was calculated back using equation (2):

$$W_g = \Sigma_i x_i \cdot MW_i \cdot n_{tot} \quad (2)$$

Where $W_g$ is the total mass of gaseous product (g), $x_i$ is the mole fraction of gas i, $MW_i$ is the molecular weight of gas i (g/mole), and $n_{tot}$ is the total number of moles of gas product. The yield of liquid, gas, and solid product was calculated using equations (3), (4), and (5) respectively.

$$Y_{liquid}(\%) = \frac{W_l}{W_f} \times 100 \quad (3)$$

$$Y_{gas}(\%) = \frac{W_g}{W_f} \times 100 \quad (4)$$

$$Y_{coke}(\%) = \frac{(W_s - W_C)}{W_f} \times 100 \quad (5)$$

Where $W_f$ is the mass of feed bio-oil and consumed hydrogen combined (g), $W_l$ is the mass of liquid product (g), $W_g$ is the mass of gas product (g), $W_s$ is the weight of total solid residues (g), and $W_c$ is the weight of catalyst (g).

An elemental carbon balance before and after each experiment was performed.

In a blank experiment, without the catalyst, 20 g of PJ bio-oil was charged into the reactor and the reactor was pressurized to 6.2 MPa with hydrogen. The bio-oil was allowed to react for 30 minutes at 400° C. All experiments were conducted in triplicate.

Characterization of PJ Wood, Catalytic Pyrolysis Oil, and HDO Products

Physical Properties

The moisture content of the PJ wood was determined according to standard method ASTM E1756-08. The ash content of the PJ wood was determined according to ASTM E1755-01 method. The water content of the crude bio-oil and hydrotreated oil was determined by Karl Fischer titration method with Hydranal®-composite 5 solution. A Metrohm 701KF Titrino and 703 titration stand setup (Brinkmann Instruments, Riverview, Fla., USA) were used for the volumetric Karl Fischer titration. The pH was measured using Mettler Toledo pH meter and probe (Mettler-Toledo GmbH, Switzerland). The density and kinematic viscosity of the bio-oil and HDO oil were measured at 40° C. using Anton Parr Stabinger viscometer svm 3000 (Ashland, Va., USA).

Chemical Properties

The higher heating value (HHV) of PJ wood, bio-oil, and hydrotreated oil was determined using an IKA Model C2000 basic bomb calorimeter (IKA Inc., Wilmington, N.C., USA). The elemental composition of biomass, bio-oil, and hydrogenated oil was determined using Thermo Fischer Scientific Flash 2000 organic elemental analyzer (Thermo Fisher Scientific, Inc., Waltham, Mass., USA). Fourier transform infrared spectroscopy (FT-IR) over the range of 600 to 4000 nm was recorded using Avatar 360 FT-IR instrument (Thermo Fisher Scientific, Inc., Waltham, Mass., USA). The 13C NMR spectra were recorded on a Bruker AvancelII HD Ascend 500 MHz NMR spectrometer (Billerica, Mass., USA). In a 5-mm sample probe about 0.5 g of oil was dissolved in 1.5 g deuterated solvent. Dimethyl sulfoxide-d6 (DMSO-d6) (Sigma-Aldrich, St. Louis, Mo., USA) was used for catalytic pyrolysis oil and chloroform-d (Cambridge Isotope Laboratories, Inc., USA) was used for HDO oil. The observing frequency for the $^{13}C$ nucleus was 100.58 MHz, the pulse width was 10 µs, the acquisition time was 1.58 seconds, and the relaxation delay was two seconds. The spectra were obtained with 3000 scans and a sweep width of 20 kHz.

Gas Analysis

Gas samples were collected in tedlar sampling bags from the sampling port installed on the reactor head and injected to a Varian 490-micro GC system (Agilent Technology, Santa Clara, Calif., USA). The microGC was equipped with two modules: a 10 m Molsieve 5A (MS) column, and a 10 m porous polymer (PPU) column. Each module had a thermal conductivity detector. MS was used to analyze hydrogen, methane, and carbon monoxide (CO), while carbon dioxide ($CO_2$) and $C_1$-$C_5$ hydrocarbons were analyzed on the PPU column. Gas concentrations were calculated using calibration curves of three standard gas mixtures supplied from Scotty Specialty Gases (Fremont, Calif., USA). Gas samples were analyzed for $H_2$, CO, $CO_2$, $CH_4$, $C_2H_4$, $C_2H_6$, $C_3H_8$, $C_4H_{10}$, and $C_5H_{12}$.

Results and Discussion

The biomass was characterized on the basis of moisture, ash content, elemental composition, and higher heating value (HHV). The physicochemical properties of the PJ wood are shown in Table 8. The ESP-captured oil was used in HDO experiments because this was representative of all the oil fractions and had the least amount of water. The ESP oil was characterized for ash content, ultimate composition, HHV, pH, water content, density, and dynamic viscosity. The yield of organic liquid after fast pyrolysis of biomass was about 30% mass of fed PJ wood (dry basis). The physicochemical properties of the raw bio-oil are shown in Table 1. The ultimate composition was similar to those reported by Yathavan and Agblevor [24]. The HHV was similar to those reported for other biomass feedstocks [34].

TABLE 8

Characterization of pinyon juniper biomass and bio-oil.

| Properties | PJ biomass | Catalytic PJ bio-oil |
|---|---|---|
| Composition (wt %) | | |
| Ash content | 0.53 ± 0.06 | 0.00 |
| Nitrogen | 0.17 ± 0.01 | 0.47 ± 0.04 |
| Carbon | 54.43 ± 0.11 | 67.42 ± 0.21 |
| Hydrogen | 6.27 ± 0.09 | 7.23 ± 0.07 |
| Sulfur | Below detection limit | Below detection limit |

TABLE 8-continued

Characterization of pinyon juniper biomass and bio-oil.

| Properties | PJ biomass | Catalytic PJ bio-oil |
|---|---|---|
| Oxygen (by difference) | 38.60 ± 0.12 | 24.88 ± 0.12 |
| HHV (MJ/kg) | 19.37 ± 0.11 | 28.41 ± 0.23 |
| pH | Not applicable | 3.27 ± 0.05 |
| Water content (wt %) | 6.65 ± 0.09 | 3.36 ± 0.08 |

TABLE 8-continued

Characterization of pinyon juniper biomass and bio-oil.

| Properties | PJ biomass | Catalytic PJ bio-oil |
|---|---|---|
| Density (g/cm$^3$) | 0.55 ± 0.03 | 1.16 ± 0.02 |
| Dynamic viscosity (cP) | Not applicable | 95.5 ± 1.5 |

Characterization of the catalyst was carried out as described in Example 1.

Results of HDO Experiments: Mass Balance of HDO Products

Figure 25:
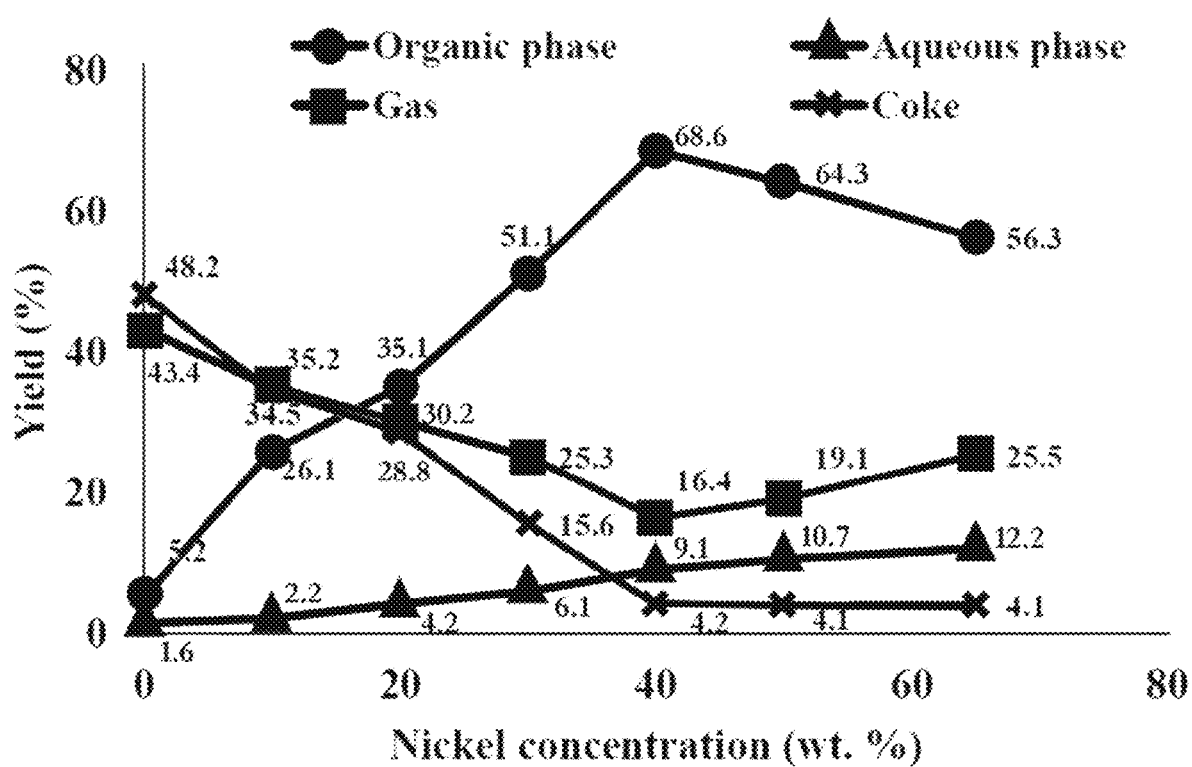
FIG. 25 depicts from Example 2 the effect of nickel concentration on product yields distribution using Ni/RM catalyst.
Figure 26:
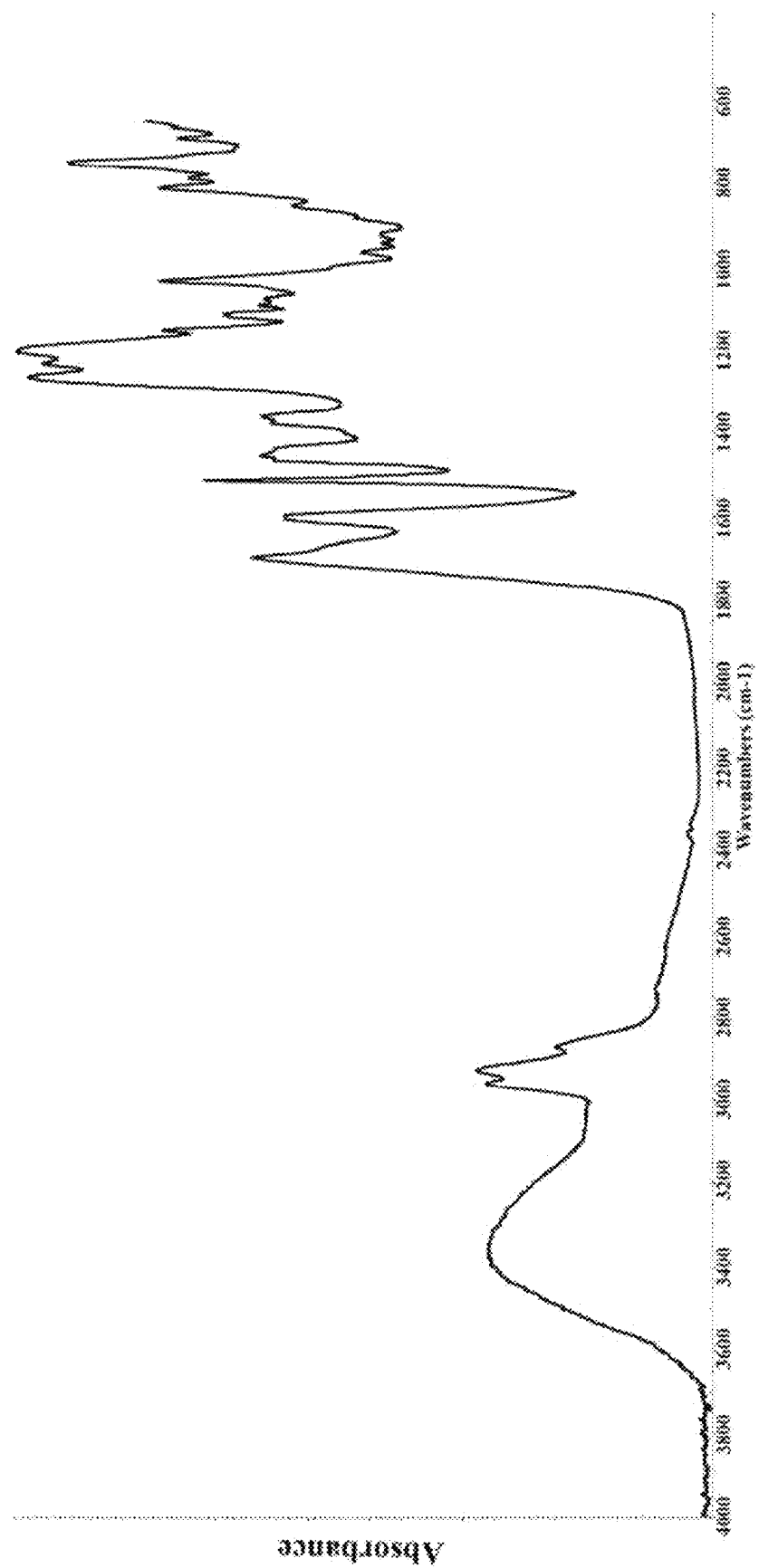
FIG. 26 depicts an FT-IR spectrum of the raw bio-oil from Example 2.
Figure 27:
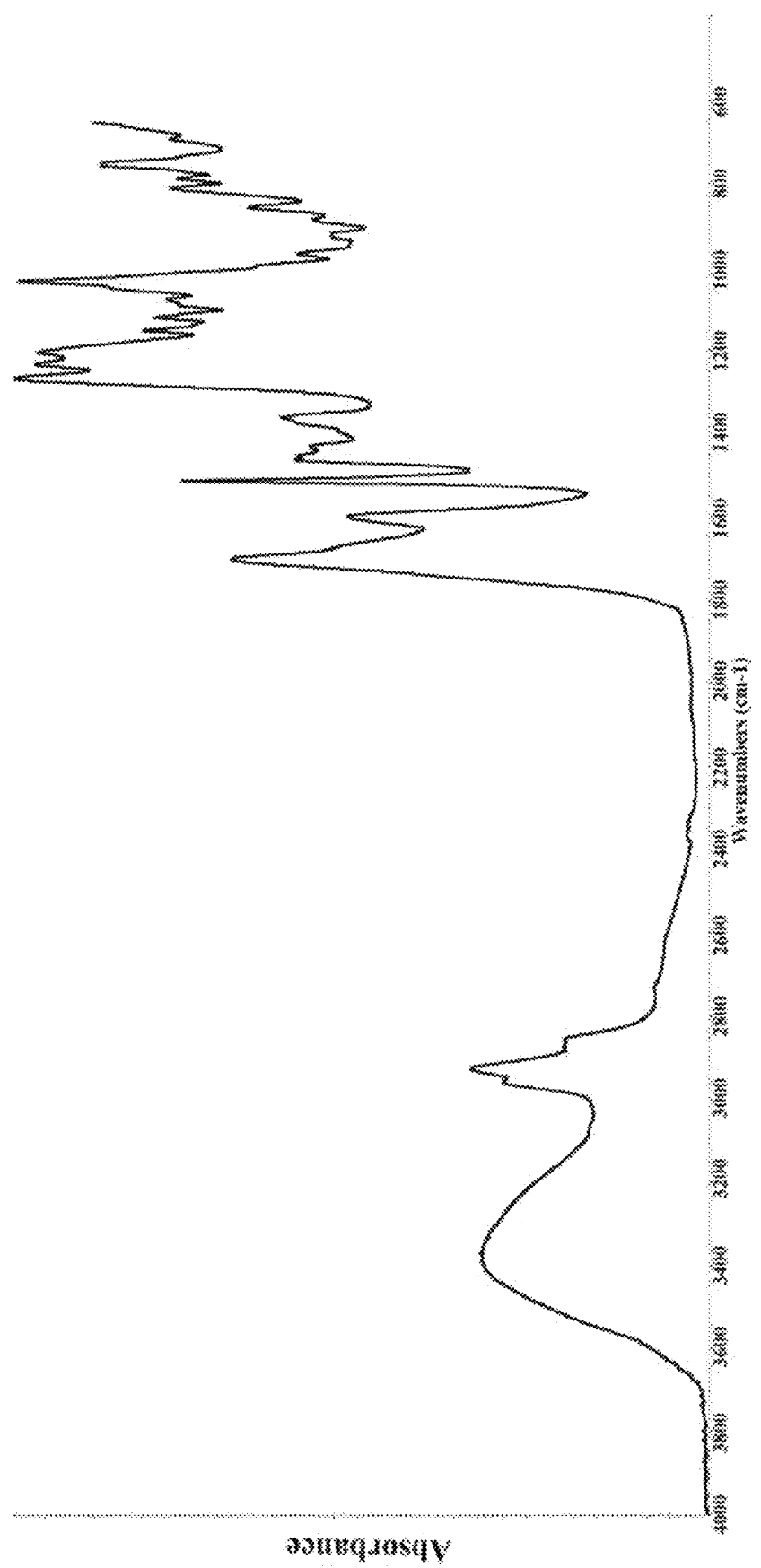
FIG. 27 depicts an FT-IR spectrum of HDO oil using the RM catalyst from Example 2.
Figure 28:
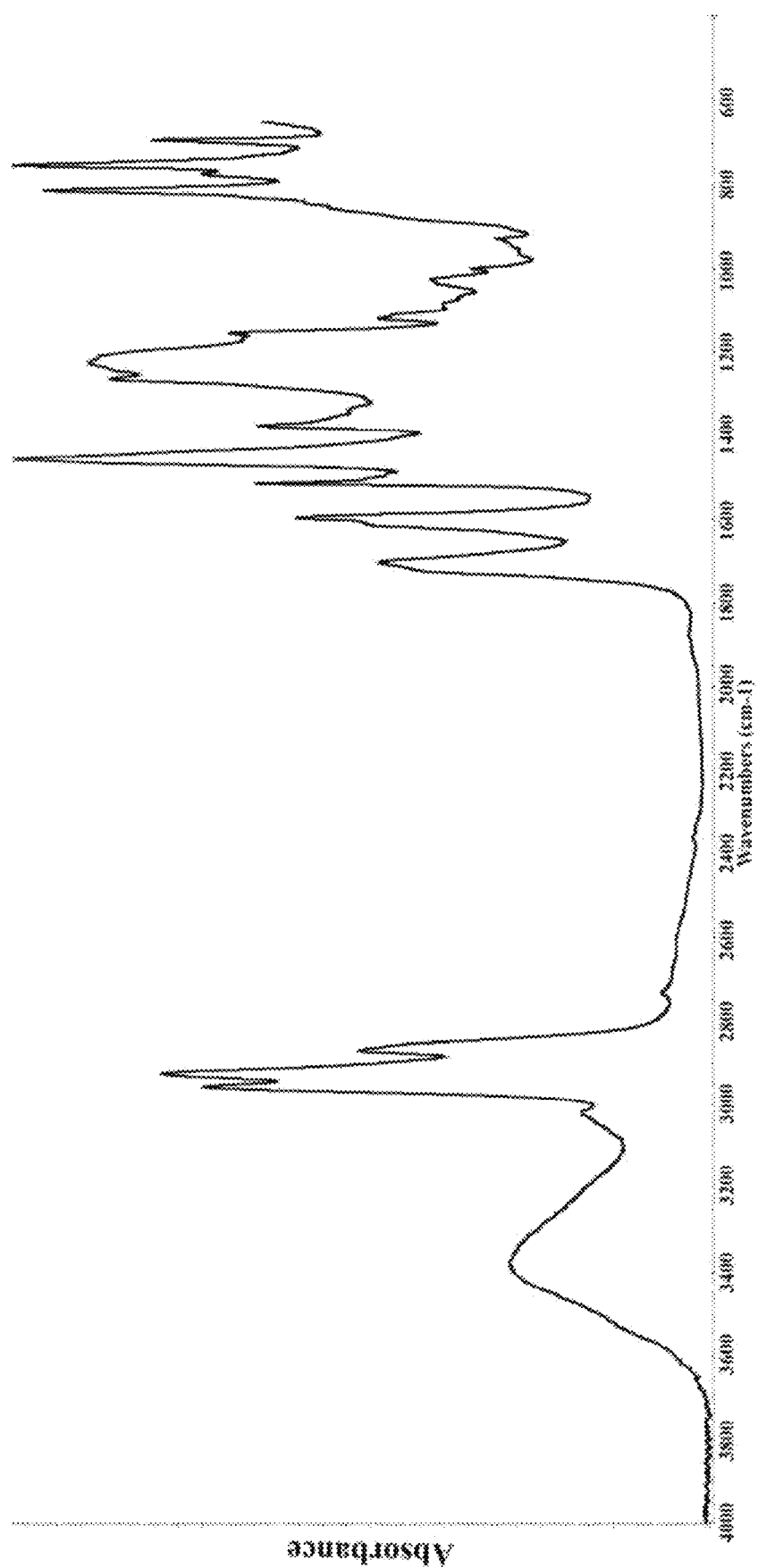
FIG. 28 depicts an FT-IR spectrum of HDO oil using the 10% Ni/RM catalyst from Example 2.
Figure 29:
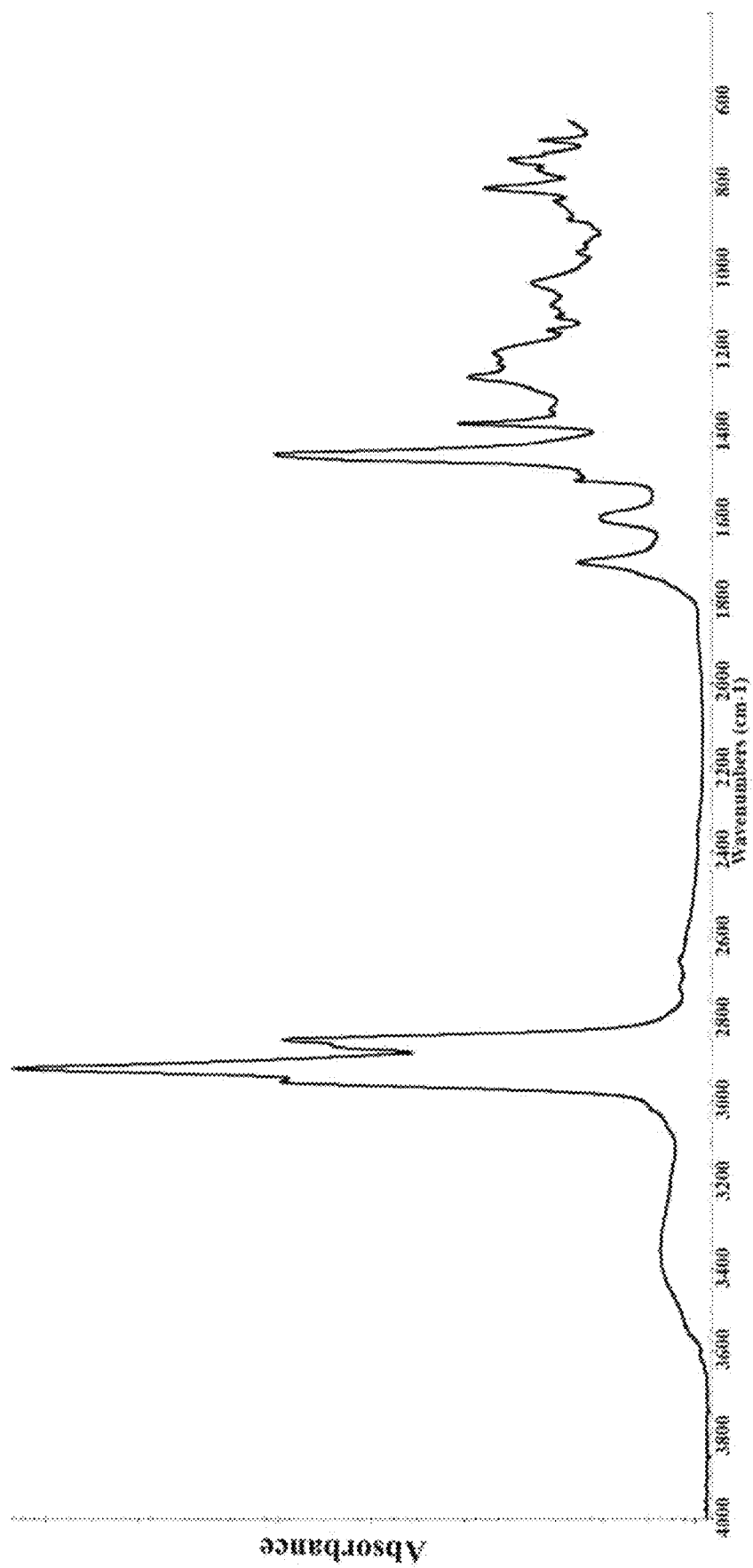
FIG. 29 depicts an FT-IR spectrum of HDO oil using the 20% Ni/RM catalyst from Example 2.
Figure 30:
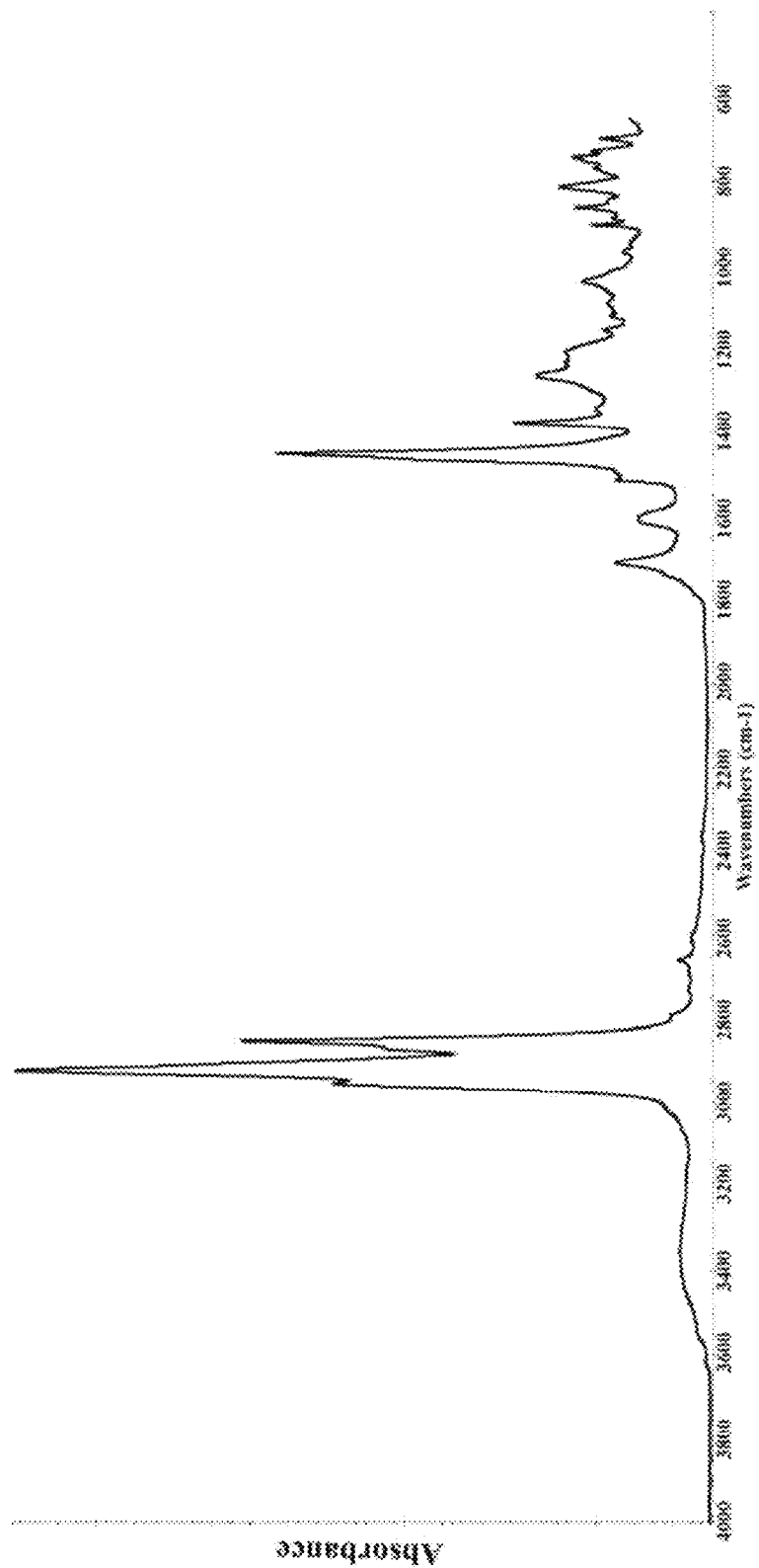
FIG. 30 depicts an FT-IR spectrum of HDO oil using the 30% Ni/RM catalyst from Example 2.
Figure 31:
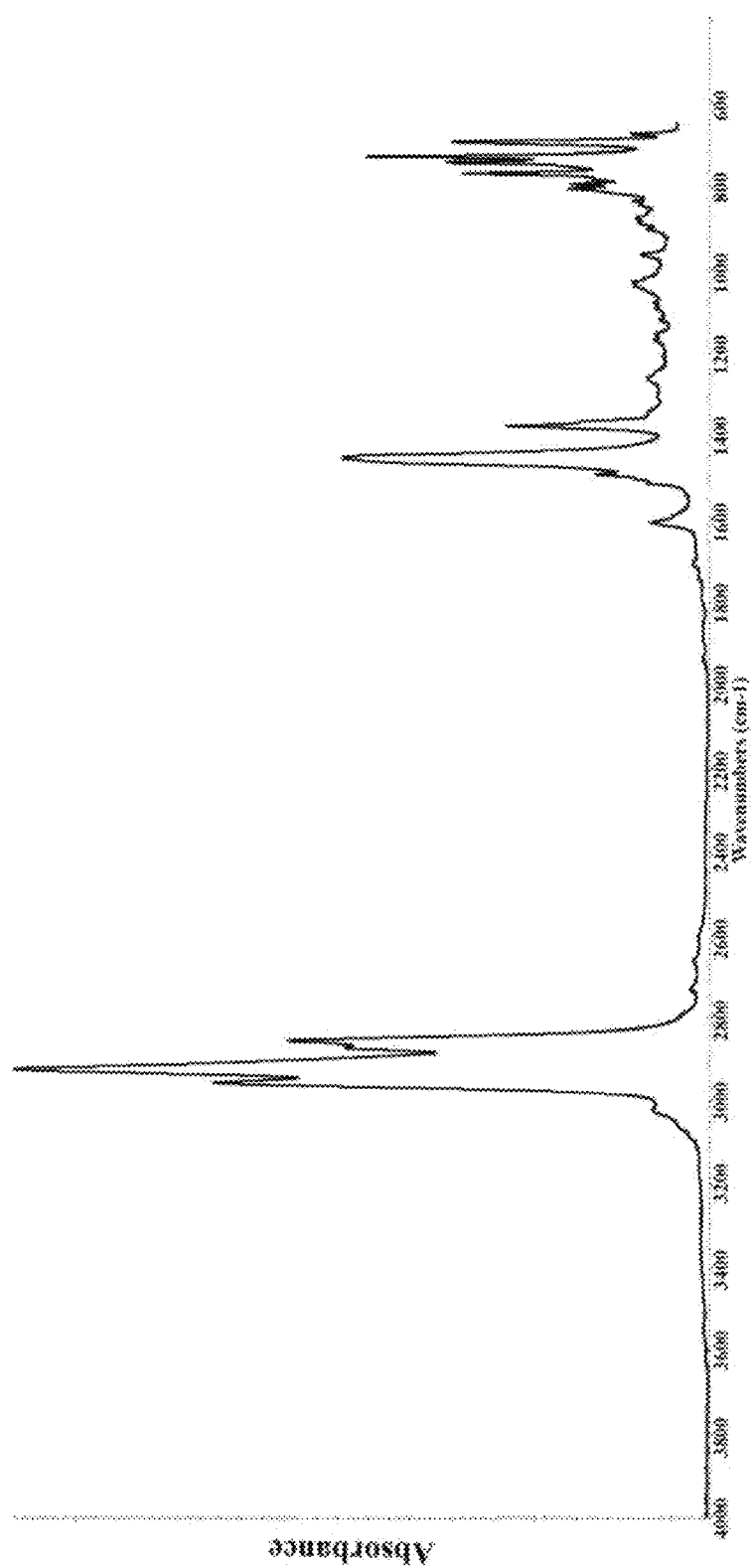
FIG. 31 depicts an FT-IR spectrum of HDO oil using the 40% Ni/RM catalyst from Example 2.
Figure 32:
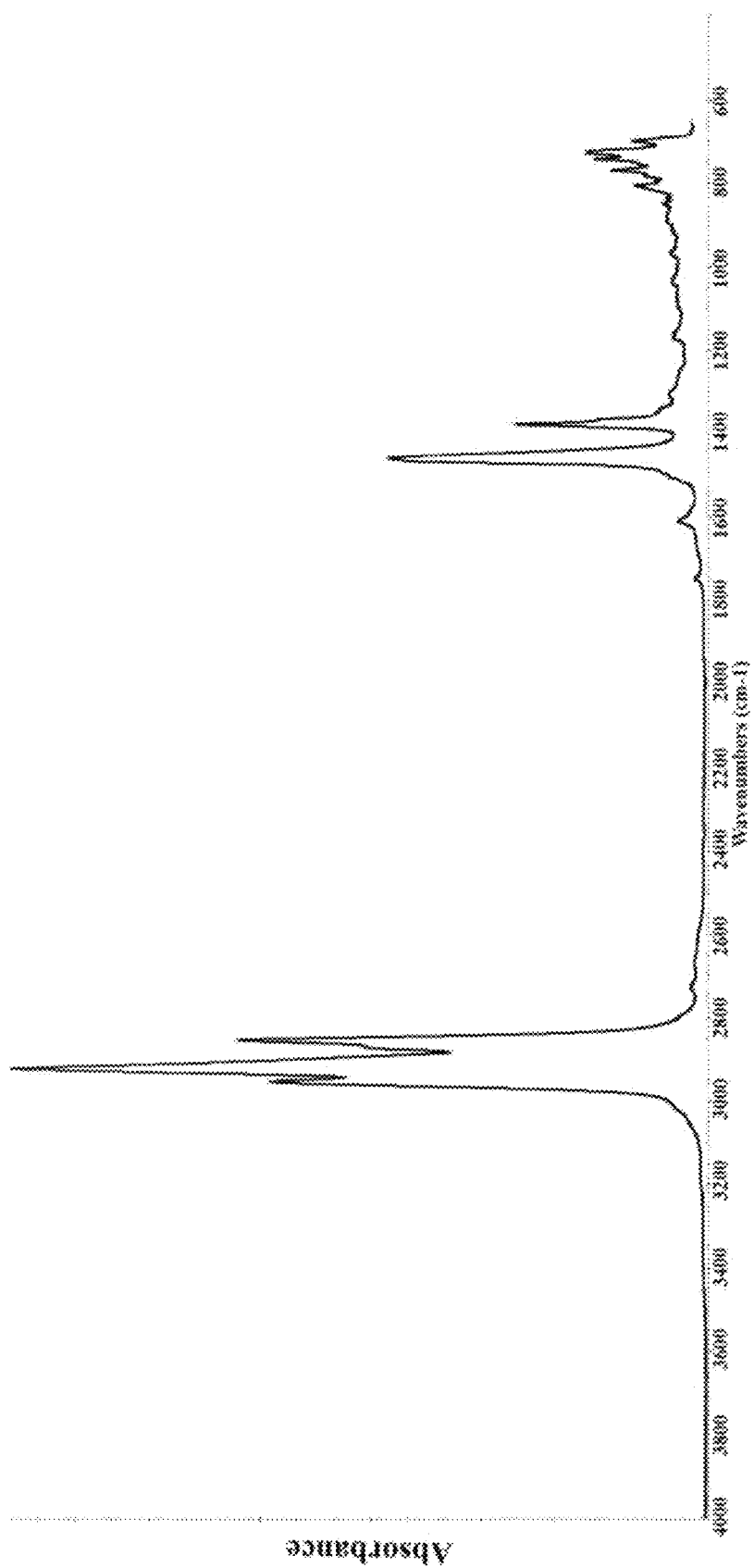
FIG. 32 depicts an FT-IR spectrum of HDO oil using the 50% Ni/RM catalyst from Example 2.
Figure 33:
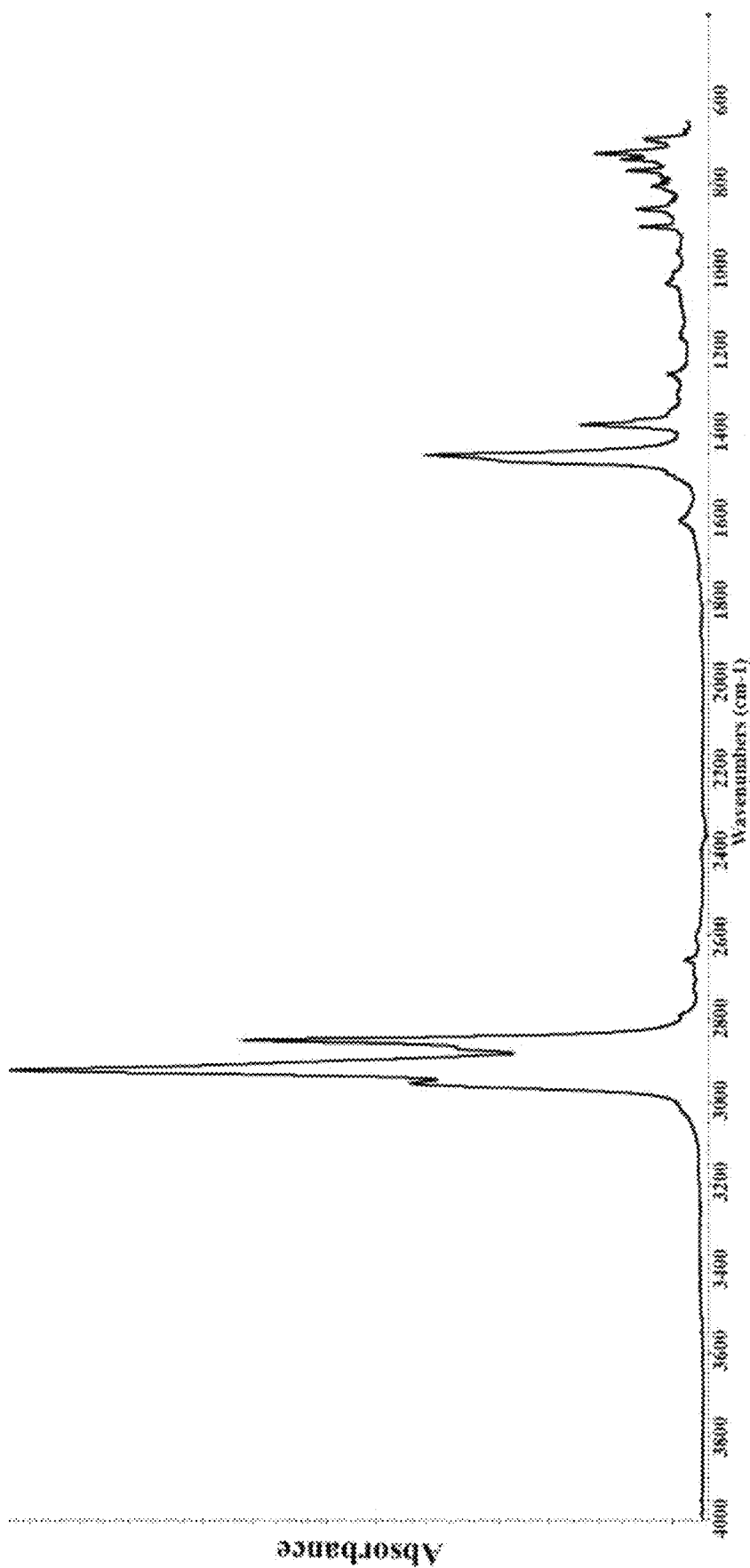
FIG. 33 depicts an FT-IR spectrum of HDO oil using the 65% Ni/RM catalyst from Example 2.

As expected, Ni loading had significant effect on HDO product yields distribution (FIG. 25). HDO experiment using RM (0% Ni loading) produced 48.2% solids (coke) and 43.4% gas and only 5.2% organic liquid. About 60.8% of the original carbon was recovered in the solid residues, 31.2% was converted to gaseous products and only 5.3% was retained in the organic liquid product (Table 4). These results suggested that at 0% Ni loading, cracking and coke formation reactions were dominant compared to HDO reactions; hence, the RM support had very limited activity for HDO reactions and can be considered as an inert support. By increasing Ni loading from 10% to 40%, the organic liquid yield increased from 26.1% to 68.6%, the gas yield decreased from 35.2% to 16.4%, and the coke yield decreased from 34.5% to 4.2% (FIG. 25). These results showed that increasing the Ni content improved HDO reactions vs. coke formation and cracking. Furthermore, the aqueous phase yield increased from 2.2% to 9.1% indicating higher levels of HDO reactions. At Ni loading of 50% and 65% the organic liquid yield was 64.3% and 56.3% respectively and no significant changes were observed in coke yield. However, the gas yield increased to 19.1% and 25.5% for Ni contents of 50% and 65% respectively. Comparing the product yields distribution of the HDO experiments using 40%, 50%, and 65% Ni loading, it was concluded that HDO reactions were completed during the reaction time (30 minutes) using 40% Ni/RM. The increased catalytic activity at 50% Ni, and 65% Ni caused increased hydrocracking generating higher amounts of gas products. The total aqueous liquid yield was 10.7% and 12.2% at Ni loadings of 50% and 65% respectively, which indicated a slight increase compared to 40% Ni/RM. The highest portion of original carbon (84%) retained in the organic liquid product was achieved when 40% Ni/RM was used for HDO experiment (Table 9). At this Ni loading, 9.5% of the initial carbon was converted to gas, and only 5.3% was remained in solid residues.

TABLE 9

Total mass balance and carbon mass balance of HDO products at different nickel contents.

| Ni loading (wt %) | Total mass balance (wt %) | | | | | Carbon balance (wt %) | | | | |
|---|---|---|---|---|---|---|---|---|---|---|
| | Organic | Aqueous | Gas | Coke | SUM | Organic | Aqueous | Gas | Coke | SUM |
| 0 | 5.2 | 1.6 | 43.4 | 48.2 | 98.4 | 5.3 | 1.4 | 31.2 | 60.8 | 98.6 |
| 10 | 26.1 | 2.2 | 35.2 | 34.5 | 98.0 | 27.2 | 1.1 | 26.8 | 43.5 | 98.6 |
| 20 | 35.1 | 4.2 | 30.2 | 28.8 | 98.3 | 38.8 | 0.6 | 22.4 | 36.3 | 98.1 |
| 30 | 51.1 | 6.1 | 25.3 | 15.6 | 98.1 | 58.7 | 0.3 | 19.3 | 19.7 | 98.0 |
| 40 | 68.6 | 9.1 | 16.4 | 4.2 | 98.3 | 84.0 | 0.0 | 9.5 | 5.3 | 98.8 |
| 50 | 64.3 | 10.7 | 19.1 | 4.1 | 98.2 | 78.9 | 0.0 | 14.2 | 5.2 | 98.3 |
| 65 | 56.3 | 12.2 | 25.5 | 4.1 | 98.1 | 69.4 | 0.0 | 23.7 | 5.2 | 98.3 |

Characterization of HDO Products
Physicochemical Properties

Changes in properties of HDO liquid products, and gas products composition at different Ni loadings are shown in Table 10. At 0% Ni, the carbon, hydrogen, and oxygen content of the organic phase were 68.16 wt %, 7.58 wt %, and 23.54 wt % respectively. The elemental composition changed slightly compared to 67.42 wt %, 7.23 wt % and 24.88 wt % of C, H, and O respectively of the original bio-oil (Table 8), and as previously mentioned the gas and coke yields were 43.4% and 48.2% respectively (FIG. 25). Hence RM support had very limited activity for HDO reactions compared to cracking and coke formation, and, thus, can be assumed to be an inert support for HDO reactions. Increasing the Ni content from 10% to 40% significantly increased the hydrogen content from 9.56 wt % to 15.83 wt % while oxygen content was reduced from 19.72 wt % to 1.35 wt %. Hydrogen consumption increased from 0.021 mol/g bio-oil to 0.053 mol/g bio-oil when Ni loading increased from 10% to 40%. The density of the oil was reduced by about 15% (from 0.93 g/cm$^3$ to 0.79 g/cm$_3$) when the Ni loading increased from 10% to 40%. Also the dynamic viscosity decreased from 12.45 cP to 1.37 cP over this Ni loading range. The reduction in density and viscosity could be attributed to hydrocracking of high molecular weight compounds in the bio-oil during HDO [35]. The reduction in acidity can be due to conversion of carboxylic acids to neutral compounds during HDO [36]. At Ni loadings of 50% and 65% the changes in elemental composition were not significant (Table 10); however, the hydrogen consumptions were 0.061 mol/g bio-oil and 0.072 mol/g bio-oil respectively. These results suggest that increased catalytic activity at 50% and 65% Ni loadings increased the rate of hydrocracking rather than HDO reactions as previously mentioned (FIG. 25). Furthermore, no significant changes were observed in viscosity of HDO oil at Ni loadings of 50% and 65% compared to that of 40% Ni/RM.

TABLE 10

$H_2$ consumption, physicochemical properties of the liquid products, and gas product composition at different nickel concentrations using Ni/RM catalyst.

| | | Temperature and reaction time were 400° C., and 30 min. respectively | | | | | |
|---|---|---|---|---|---|---|---|
| Properties | RM | 10% Ni/RM | 20% Ni/RM | 30% Ni/RM | 40% Ni/RM | 50% Ni/RM | 65% Ni/RM |
| $H_2$ consumption (mol/g bio-oil) | 0.002 | 0.021 | 0.035 | 0.046 | 0.053 | 0.061 | 0.072 |
| Aqueous phase | | | | | | | |
| Water content (wt %) | 71.35 | 80.36 | 85.67 | 97.45 | 99.45 | 99.50 | 99.95 |
| pH | 4.11 | 4.35 | 5.47 | 6.36 | 6.91 | 6.93 | 6.93 |
| HDO oil (organic phase) | | | | | | | |
| Elemental analysis (wt %) | | | | | | | |
| N | | 0.45 | 0.38 | 0.33 | 0.32 | 0.31 | 0.30 | 0.30 |
| C | | 68.16 | 70.34 | 74.56 | 77.49 | 82.52 | 82.71 | 83.11 |
| H | | 7.85 | 9.56 | 11.32 | 13.45 | 15.82 | 16.13 | 16.59 |
| O | | 23.54 | 19.72 | 19.37 | 8.74 | 1.35 | 0.86 | 0 |
| HHV (MJ/kg) | | 29.15 | 35.56 | 38.38 | 41.73 | 45.77 | 45.79 | 45.81 |
| pH | | 3.65 | 4.23 | 5.04 | 5.78 | NA | NA | NA |
| Water content (wt %) | | 3.24 | 2.11 | 1.07 | 0.67 | <DL | <DL | <DL |
| Density (g/ml) | | 1.11 | 0.93 | 0.88 | 0.82 | 0.79 | 0.78 | 0.78 |
| Dynamic viscosity (cP) | | 88.54 | 12.45 | 8.56 | 3.67 | 1.37 | 1.31 | 1.31 |
| Gas composition (mole %) | | | | | | | |
| CO | | 12.11 | 6.02 | 5.28 | 4.37 | 3.32 | 2.84 | 2.23 |
| $CO_2$ | | 16.43 | 13.47 | 9.17 | 7.56 | 5.52 | 4.75 | 4.19 |
| $CH_4$ | | 43.77 | 54.15 | 59.75 | 61.36 | 67.34 | 68.26 | 69.76 |
| $C_2H_4$ | | 5.34 | 7.26 | 7.89 | 8.11 | 8.26 | 8.41 | 8.66 |
| $C_3H_8$ | | 10.21 | 9.34 | 8.55 | 7.78 | 7.56 | 7.61 | 7.67 |
| $C_4H_{10}$ | | 7.42 | 6.32 | 5.83 | 5.62 | 5.45 | 5.40 | 5.28 |
| $C_5H_{12}$ | | 4.35 | 3.41 | 3.34 | 3.16 | 2.47 | 2.32 | 2.19 |

In all HDO experiments, the major gas product was methane (Table 10). The concentration of methane increased from 54.15 mol % to 67.34 mol % when the Ni loading increased from 10% to 40%. Increasing the Ni loading decreased the concentration of CO and $CO_2$, which could be explained as methanation of these two gases due to increased catalytic activity [37-39]. Also, the concentration of $C_3$-$C_5$ gases gradually decreased by increasing the Ni content, which could be due to hydrocracking of these gases at higher Ni loadings. Increasing the Ni content from 40% to 50% and 65% increased the concentration of methane from 67.34 mol % to 68.26 mol % and 69.76 mol % respectively, while CO and $CO_2$ decreased to 2.84% and 4.75% respectively at 50% Ni loading and 2.23 mol % and 4.19 mol % respectively at 65% Ni loading.

FT-IR Characterization

Figure 34:
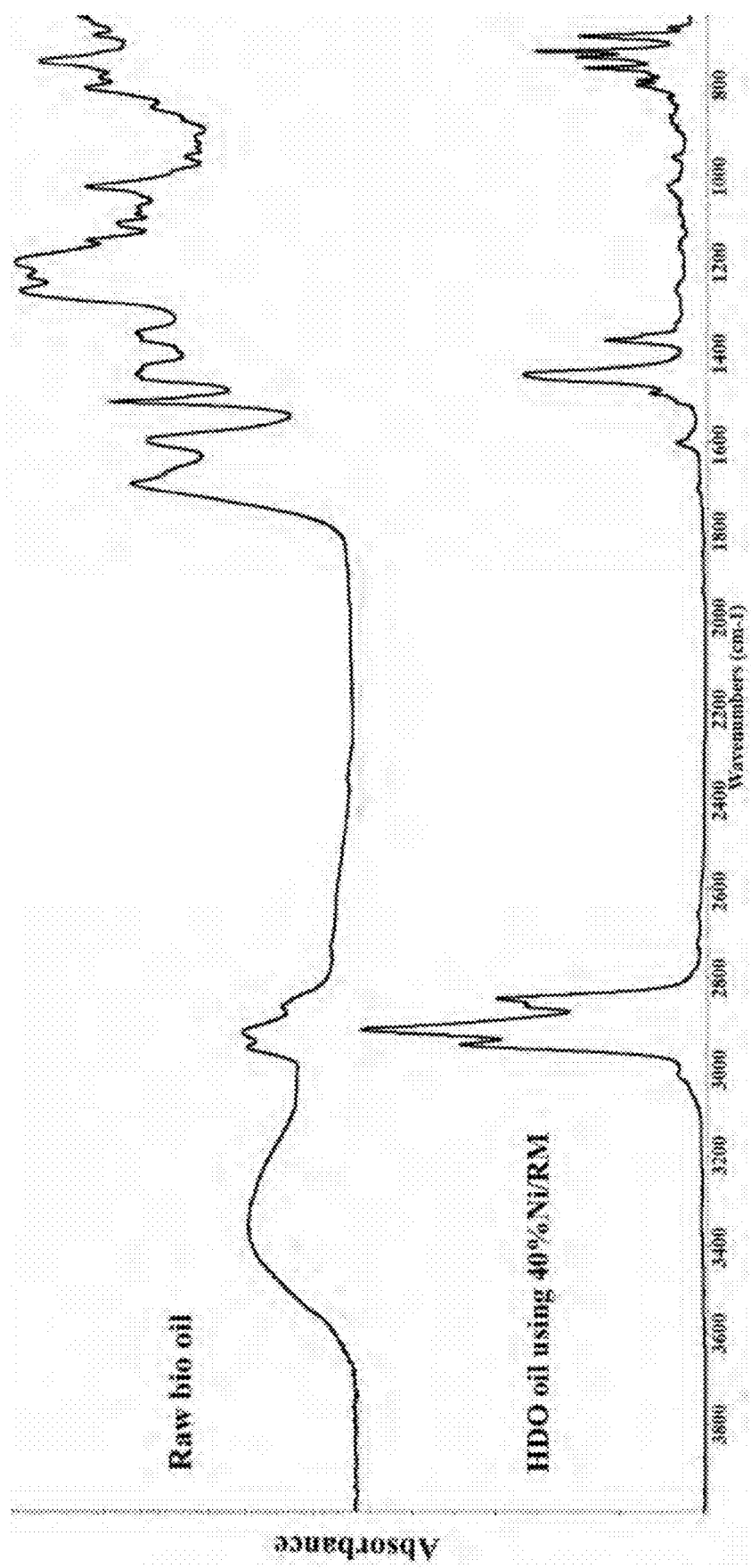
FIG. 34 depicts from Example 2 FT-IR spectra of raw bio-oil and HDO oil using the 40% Ni/RM catalyst.

The FT-IR spectra of the raw bio-oil and HDO oils at different Ni loadings are shown in FIGS. 26 to 33. The absorbance peaks between 3050 and 3650 cm-1 were ascribed to —OH stretching vibration. This result indicated that phenolic compounds and alcohols were produced during catalytic pyrolysis of PJ biomass. These peaks were also ascribed to presence of water in the bio-oil. With the increase in Ni loading, the intensity of these peaks gradually decreased or even disappeared in the HDO oil that could be due to phenolic or alcoholic hydroxyl cleavage, elimination, intramolecular dehydration, or hydrodeoxygenation of —OH groups. Furthermore, during HDO, water could possibly migrate to the aqueous phase. The peaks between 2840 and 3010 cm-1 and the two other bands at 1376 and 1453 cm-1 were caused by C—H stretching and deformation in methyl groups and the methylene groups, respectively. The peaks were intensified after HDO compared to the original bio-oil. The peaks at 1590-1610 cm-1 were attributed to in-ring C—C stretching. These peaks weakened gradually by increasing the Ni loading suggesting that the aromatics possibly underwent cracking, or polymerization to form coke. The peak at 1670 cm-1 was assigned to C=O stretching, gradually weakened with the increase in Ni loading. The appearance of typical carbonyl group C=O stretching vibrations at 1710 cm-1 showed that aldehydes, ketones, or carboxylic acids were significant at 10% Ni loading. At higher Ni loadings the C—O stretching absorption band at 1033 and 1100 cm-1 faded away, which could be described as the deoxygenation of alcohols, phenols, or esters. Moreover, several bands that appeared between 740 and 830 cm-1 could be attributed to C—H out-of-plane bending vibration from aromatics and their derivatives disappeared gradually because of hydrogenation. These results indicated that the oxygenated groups (—OH, C=O, and C—O) were significantly reduced in HDO oil. At 40% Ni loading the peaks between 2840 and 3010 cm-1 and the two other bands at 1376 and 1453 cm$^{-1}$ due to C—H stretching and the aromatic peaks at 1600 cm$^{-1}$, the monosubstituted C—H bend between 730-770 cm$^{-1}$, and o, m, p-distributed C—H bend peaks between 735-840 cm$^{-1}$ increased in intensity. Compared to the FT-IR spectrum of the raw bio-oil, the HDO oil obtained using 40% Ni/RM indicated significant removal of oxygenated groups (FIG. 34). At Ni loadings of 50% and 65% (FIGS. 32 and 33), the aromatic peaks weakened, which suggested increased hydrogenation of aromatics and/or hydrocracking of these compounds at higher catalytic activities compared to that of 40% Ni/RM.

NMR Characterization

Figure 35:
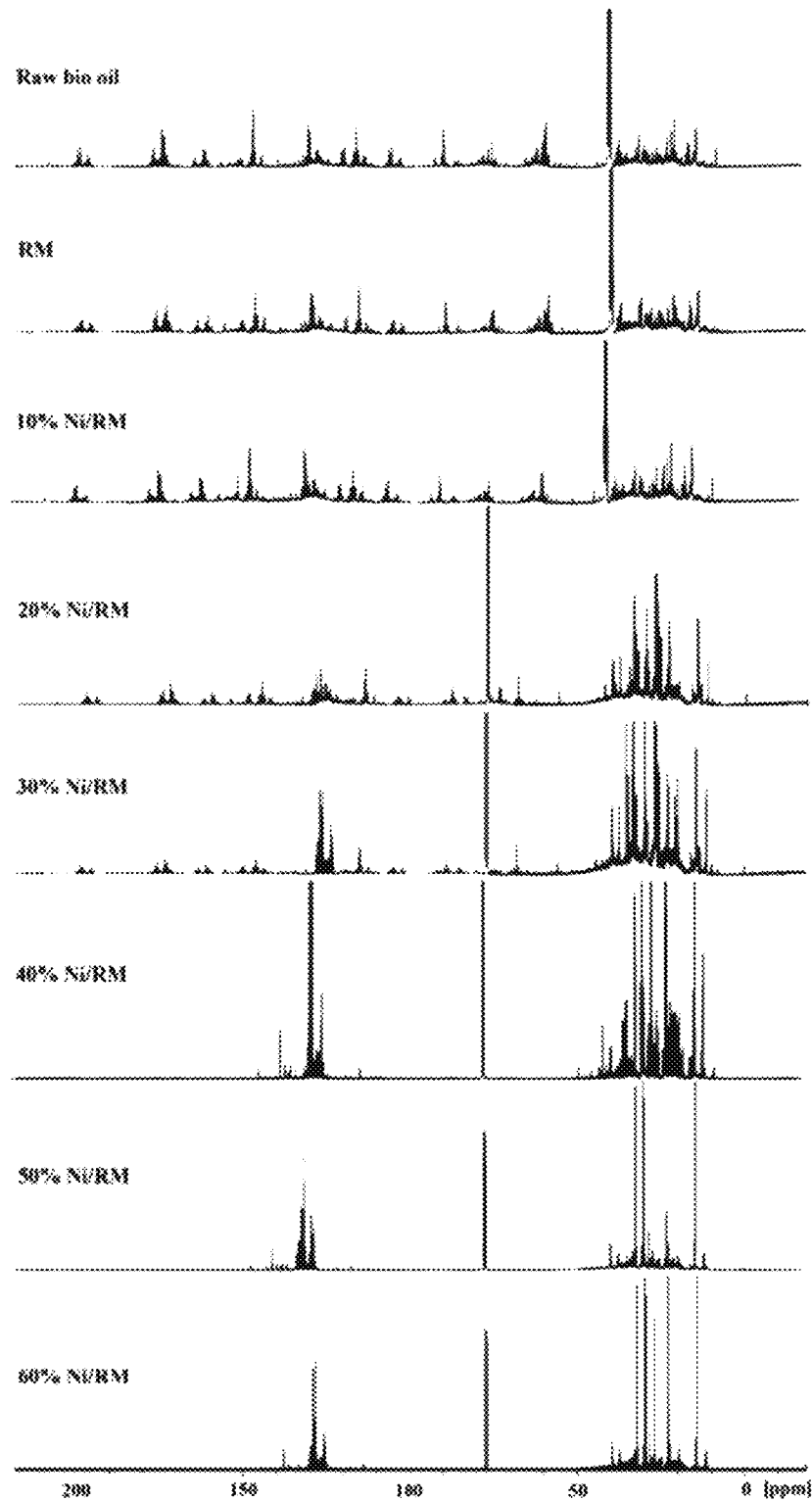
FIG. 35 depicts from Example 2 $^{13}$C NMR spectra of raw bio-oil and HDO oils at different Ni concentrations.

The functional groups present in the crude bio-oil and HDO oils were characterized by semi-quantitative integration of $^{13}$C NMR spectra. The $^{13}$C NMR spectra of the raw bio-oil, and HDO oils at different Ni loadings are shown in FIG. 35. The chemical shifts in the spectrum were assigned to different functional groups [32, 40]. The semi-quantitative analysis of the $^{13}$C NMR functional groups is presented in Table 11. The crude bio-oil had high amounts of carbohydrate degradation products, alcohols, ethers, methoxylated phenols, carboxylic groups, aldehydes, and ketones.

TABLE 11

Functional group distribution of crude bio-oil and HDO oils at different nickel concentrations from $^{13}$C NMR spectral integration.

| Chemical shift region (ppm) | Dominant type of carbon | Percentage of carbon based on $^{13}$C NMR analysis | | | | | | |
|---|---|---|---|---|---|---|---|---|
| | | Feed bio-oil | RM | 10% Ni/RM | 20% Ni/RM | 30% Ni/RM | 40% Ni/RM | 50% Ni/RM | 65% Ni/RM |
| 0-28 | Saturated aliphatic groups | 15.8 | 17.1 | 24.7 | 31.8 | 36.7 | 42.6 | 46.3 | 56.2 |
| 28-55 | Unsaturated aliphatic groups | 9.7 | 10.8 | 13.6 | 14.9 | 16.8 | 17.6 | 23.4 | 27.6 |
| 55-95 | Alcohols, ethers, phenolic methoxys, anhydrosugars | 15.4 | 14.8 | 11.3 | 8.4 | 4.2 | 0 | 0 | 0 |
| 95-165 | Aromatics, Furans | 45.7 | 44.6 | 41.5 | 40.9 | 40.1 | 39.8 | 30.3 | 16.2 |
| 165-180 | Organic (carboxylic) acids, esters | 8.6 | 8.2 | 5.3 | 2.1 | 1.4 | 0 | 0 | 0 |
| 180-215 | Ketones, aldehydes | 4.8 | 4.5 | 3.6 | 1.9 | 0.8 | 0 | 0 | 0 |

The characteristic peaks at the chemical shift of 0-28 ppm were assigned to saturated aliphatic carbon atoms. Clearly saturated aliphatics increased during HDO, which could be due to hydrogenation of unsaturated aliphatics, HDO of alcohols, ethers, carboxylic acids, aldehydes, and ketones. Increasing the Ni loading from 10% to 40% resulted in an increase in saturated aliphatic carbon atoms from 24.7% to 42.6% (Table 11) due to improved hydrogenation/hydrodeoxygenation of unsaturated compounds and oxygenated compounds.

The chemical shifts of 28-55 ppm are generally assigned to the unsaturated carbon atoms that are separated from oxygen atoms by at least two bonds [41]. The chemical shifts of 55-95 ppm are assigned to aliphatic carbon atoms attached to oxygen atoms in alcohols, esters, ethers, and anhydrous carbohydrates. Increasing Ni loading decreased the amount of alcohols, esters, and anhydrous carbohydrates due to increased catalytic activity. At Ni loadings of 40%, 50% and 65% no peaks were observed at chemical shifts between 55 and 95 ppm.

The characteristic peaks at chemical shifts of 95-165 ppm were assigned to aromatic carbon atoms, phenolic compounds, and furans. These carbon atoms decreased with increasing Ni loading due to hydrogenation/deoxygenation of these compounds. With the increase in Ni loading from 40% to 65%, unsaturated aliphatics increased from 17.6% to 27.6% and aromatic compounds decreased from 39.8% to 16.2%. These results could be due to partial hydrogenation of aromatic compounds. Also, saturated aliphatics increased from 42.6% to 56.2% due to increased hydrogenation of unsaturated aliphatics. However, hydrogenation of unsaturated aliphatics was not complete even at 65% Ni loading. Longer reaction times might result in complete hydrogenation of unsaturated aliphatic carbons; however, longer reaction times can cause hydrocracking of organic compound to gases that will reduce the organic liquid yield [42, 36].

The chemical shifts of 165-180 ppm are generally assigned to carboxylic acids and esters. After HDO process, these compounds were hydrodeoxygenated. Increasing the Ni loading from 10% to 30% decreased these carbon atoms from 5.3% to 1.4%. At higher Ni loadings, no characteristic peaks were observed between 165 and 180 ppm (Table 11).

Characteristic chemical shifts of 180-215 ppm were assigned to carbon atoms of carbonyl groups contained in aldehydes and ketones whose content decreased from 4.8% in bio-oil to zero in HDO oil at 40% Ni loading indicating that aldehydes and ketones were completely deoxygenated to hydrocarbons.

Compared to other bio-oils obtained from other feedstock, the catalytic PJ bio-oil used in this study had significantly less reactive groups of aldehydes, ketones, phenolics, and carboxylic acid fractions that are responsible for instability of bio-oil [49, 67]. This could explain the accomplishment of HDO process in a single step.

No catalytic activity was seen in the case of blank experiments, and the bio-oil polymerized (solidified) due to the presence of highly reactive compounds in bio-oil such as sugar derivatives and phenolic compounds [44]. The reactor was not catalytically active and did not influence the experiment.

Catalyst Deactivation and Regenerability

Figure 36:
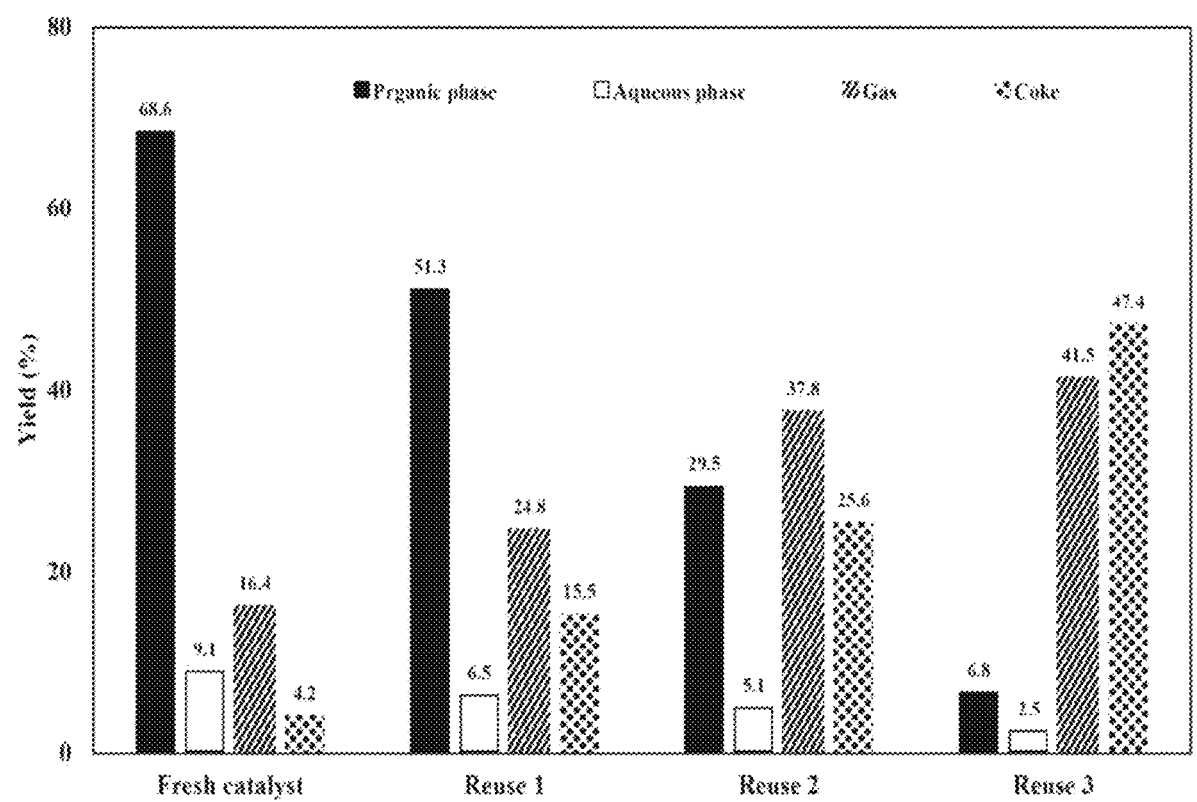
FIG. 36 depicts from Example 2 product yields distribution of HDO experiments using spent 40% Ni/RM catalyst.

The 40% Ni/RM was used to test the catalyst deactivation and recyclability. The spent catalyst was used in the HDO experiment without any pre-treatments. After the first run, only 4.2% coke formed on the catalyst during HDO (FIG. 25). Thus, coke formation may not be the main reason for catalyst deactivation [13]. As discussed above, oxidation of active Ni sites as well as formation of trevorite ($Fe_2NiO_4$) could be other reasons for catalyst deactivation. As illustrated in FIG. 36 the organic liquid yield decreased from 68.6% to 6.8% after three consecutive batches, while the gas yield increased from 16.4% to 41.5% and the coke yield increased from 4.2% to 47.4%. The properties of HDO oil obtained from this set of experiments are summarized in Table 12. The physicochemical properties of the HDO oil after the third run were about the same as those of the 0% Ni/RM HDO experiment (Table 10). These results suggested that the catalyst deactivated almost completely after three runs.

TABLE 12

$H_2$ consumption, physicochemical properties of the liquid products, and gas product composition using spent 40% Ni/RM catalyst.

| Properties | Fresh catalyst | Reuse # 1 | Reuse # 2 | Reuse # 3 |
|---|---|---|---|---|
| $H_2$ consumption (mol/g bio-oil) | 0.053 | 0.037 | 0.016 | 0.004 |
| Aqueous phase | | | | |
| Water content (wt %) | 99.45 | 90.55 | 84.15 | 72.45 |
| pH | 6.91 | 5.63 | 5.11 | 4.32 |
| HDO oil (organic phase) | | | | |
| Elemental analysis (wt %) | | | | |
| N | 0.31 | 0.36 | 0.41 | 0.43 |
| C | 82.52 | 79.45 | 70.18 | 68.83 |
| H | 15.82 | 12.48 | 9.42 | 8.12 |
| O | 1.35 | 7.71 | 19.99 | 22.62 |
| HHV (MJ/kg) | 45.77 | 42.35 | 35.61 | 29.46 |
| pH | NA | 5.16 | 4.37 | 4.05 |
| Water content (wt %) | <DL | 1.56 | 2.63 | 3.11 |
| Density (g/ml) | 0.79 | 0.81 | 0.94 | 1.09 |
| Dynamic viscosity (cP) | 1.37 | 33.61 | 57.45 | 87.42 |
| Gas composition (mole %) | | | | |
| CO | 3.32 | 5.45 | 8.65 | 11.34 |
| $CO_2$ | 5.52 | 6.75 | 12.56 | 15.12 |
| $CH_4$ | 67.34 | 62.75 | 53.38 | 46.68 |
| $C_2H_4$ | 8.26 | 7.43 | 6.71 | 5.51 |
| $C_3H_8$ | 7.56 | 7.88 | 8.56 | 9.28 |
| $C_4H_{10}$ | 5.45 | 5.78 | 6.56 | 7.02 |
| $C_5H_{12}$ | 2.47 | 2.76 | 3.15 | 3.81 |

Figure 37:
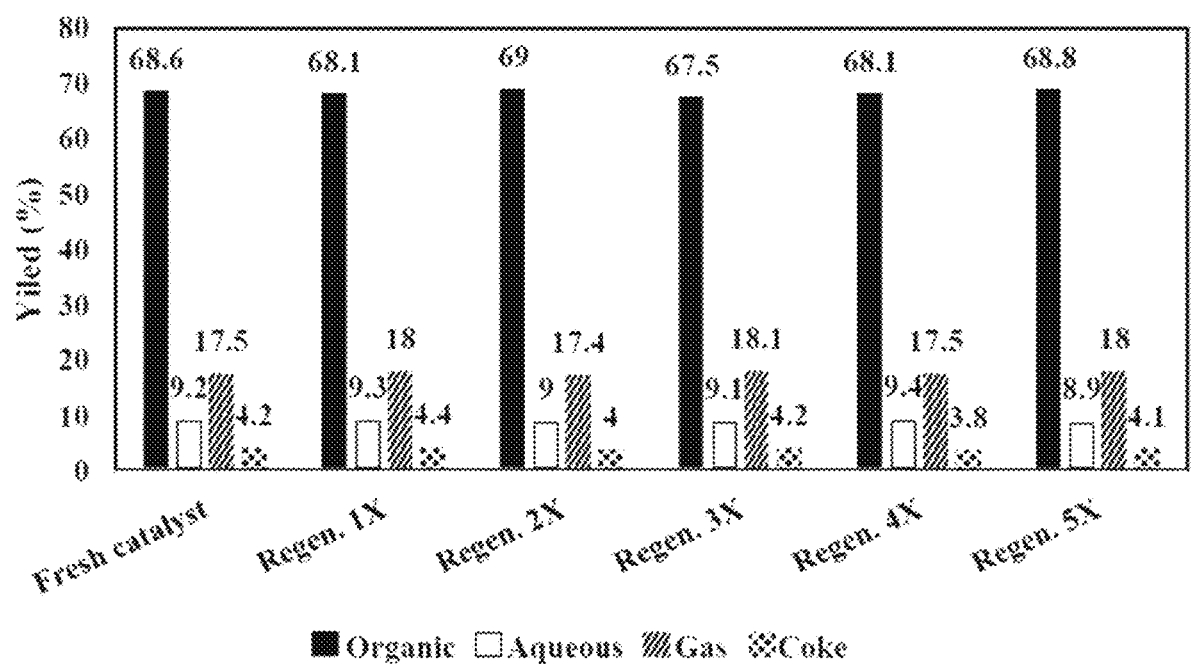
FIG. 37 depicts from Example 2 products yield distribution using regenerated 40% Ni/RM catalyst.

The spent catalyst was placed in the muffle furnace to burn off the deposited coke at 400° C. for four hours followed by reduction as described above. The regenerated/activated catalyst was then used in HDO experiments and the cycle was repeated five times. The product yields distribution using regenerated catalyst was almost identical as that of fresh 40% Ni/RM (FIG. 37). The physicochemical properties of the HDO oil obtained by using the regenerated catalysts were also consistent and about the same as those of the fresh catalyst (Table 13). These results indicated that the catalyst regained its activity after the regeneration/activation process. The regeneration of the commercial Ni/$SiO_2$—$Al_2O_3$ was not possible following the same procedure, and the catalyst did not indicate HDO activity after reduction. Additionally, if exposed to air, the reduced commercial catalyst catches fire due to spontaneous oxidation.

TABLE 13

Properties of HDO oil using regenerated 40% Ni/RM catalyst.

| | | Catalyst regeneration # | | | | |
|---|---|---|---|---|---|---|
| Properties | Fresh | Regen. 1X | Regen. 2X | Regen. 3X | Regen. 4X | Regen. 5X |
| $H_2$ consumption (mol/g bio-oil) | 0.053 | 0.050 | 0.055 | 0.051 | 0.056 | 0.051 |
| Elemental analysis (wt %) | | | | | | |
| N | 0.31 | 0.32 | 0.30 | 0.29 | 0.33 | 0.32 |
| C | 82.52 | 82.36 | 82.54 | 82.67 | 82.41 | 82.55 |
| H | 15.82 | 15.56 | 15.78 | 15.46 | 15.72 | 15.35 |
| O | 1.35 | 1.76 | 1.38 | 1.58 | 1.54 | 1.78 |
| HHV (MJ/kg) | 45.77 | 45.01 | 45.01 | 45.12 | 45.05 | 45.02 |
| Dynamic viscosity (cP) | 1.37 | 1.37 | 1.41 | 1.35 | 1.36 | 1.39 |

Comparison of Catalytic Activity of Ni/RM with Commercial Ni/$SiO_2$—$Al_2O_3$

Figure 38:
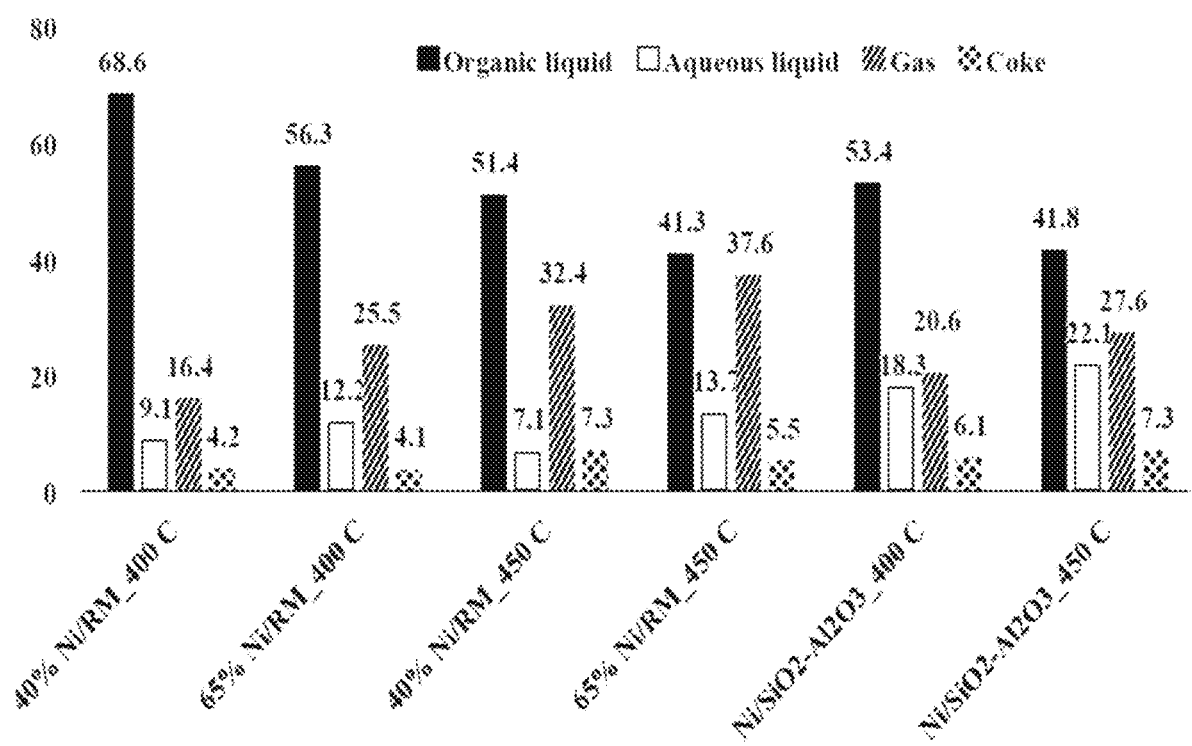
FIG. 38 depicts from Example 2 products yield distribution using 40% Ni/RM and commercial Ni/SiO$_2$—Al$_2$O$_3$ catalysts.

For comparison, commercial (~65%)Ni/$SiO_2$—$Al_2O_3$ (as received) was used in HDO experiments at reaction temperatures of 400° C. and 450° C. Product yields distribution of HDO experiments using 40% Ni/RM (400° C. and 450° C.), 65% Ni/RM (400° C. and 450° C.), and commercial Ni/$SiO_2$—$Al_2O_3$ (400° C. and 450° C.) is shown in FIG. 38. The HDO oil properties obtained by using 40% Ni/RM at 400° C. were similar to those of commercial Ni/$SiO_2$—$Al_2O_3$ at 450° C. (Table 14). However, the organic liquid yield was much higher in the case of 40% Ni/RM (68.6%) than commercial Ni/$SiO_2$—$Al_2O_3$ (41.8%). The aqueous liquid yields in the case of 40% Ni/RM and commercial Ni/$SiO_2$—$Al_2O_3$ were 9.1% and 21.1% respectively (FIG. 38), which could be due to complete methanation of CO and $CO_2$ over commercial Ni/$SiO_2$—$Al_2O_3$(Table 14). The commercial Ni/$SiO_2$—$Al_2O_3$ produced more gas (27.6%) compared to 40% Ni/RM (16.4%), which could be due to higher catalytic activity of commercial Ni/$SiO_2$—$Al_2O_3$ for hydrocracking and/or higher reaction temperature. Overall, the 40% Ni/RM catalyst produced higher organic liquid yield than the commercial catalyst, and HDO was performed at a lower temperature (400° C.) than the commercial catalyst (450° C.) to obtain similar oil properties. Also, a lower reaction temperature was beneficial in preventing hydrocracking and coke formation (FIG. 38). Hence, the prepared 40% Ni/RM could be an alternative to the commercial Ni/$SiO_2$—$Al_2O_3$ catalyst and could be potentially less expensive than the commercial catalyst.

TABLE 14

$H_2$ consumption, physicochemical properties of the liquid products, and gas product composition using commercial $Ni/SiO_2$—$Al_2O_3$ catalyst.

Reaction time was 30 min.

| Properties | 40% Ni/RM 400° C. | 65% Ni/RM 400° C. | 40% Ni/RM 450° C. | 65% Ni/RM 450° C. | $Ni/SiO_2$—$Al_2O_3$ 400° C. | $Ni/SiO_2$—$Al_2O_3$ 450° C. |
|---|---|---|---|---|---|---|
| $H_2$ consumption (mol/g bio-oil) | 0.053 | 0.072 | 0.056 | 0.083 | 0.061 | 0.095 |
| Aqueous phase | | | | | | |
| Water content (wt %) | 99.45 | 99.95 | 99.15 | 99.40 | 99.35 | 99.55 |
| pH | 6.91 | 6.93 | 6.94 | 6.96 | 6.87 | 6.89 |
| HDO oil (organic phase) Elemental analysis (wt %) | | | | | | |
| N | 0.31 | 0.30 | 0.26 | 0.17 | 0.21 | 0.13 |
| C | 82.52 | 83.11 | 83.13 | 83.18 | 79.81 | 82.94 |
| H | 15.82 | 16.59 | 16.61 | 16.65 | 11.65 | 15.66 |
| O | 1.35 | 0 | 0 | 0 | 8.33 | 1.27 |
| HHV (MJ/kg) | 45.77 | 45.81 | 45.83 | 45.85 | 42.58 | 45.16 |
| pH | NA | NA | NA | NA | NA | NA |
| Water content (wt %) | <DL | <DL | <DL | <DL | <DL | <DL |
| Density (g/ml) | 0.79 | 0.78 | 0.78 | 0.78 | 0.91 | 0.81 |
| Dynamic viscosity (cP) | 1.37 | 1.31 | 1.30 | 1.30 | 3.43 | 1.38 |
| Gas composition (mole %) | | | | | | |
| CO | 3.32 | 2.23 | 3.11 | 2.05 | 0 | 0 |
| $CO_2$ | 5.52 | 4.19 | 4.25 | 3.17 | 4.12 | 0 |
| $CH_4$ | 67.34 | 69.76 | 68.56 | 71.34 | 78.34 | 90.61 |
| $C_2H_4$ | 8.26 | 8.66 | 8.47 | 9.14 | 7.34 | 4.23 |
| $C_3H_8$ | 7.56 | 7.67 | 7.71 | 7.83 | 5.24 | 2.14 |
| $C_4H_{10}$ | 5.45 | 5.28 | 5.33 | 4.15 | 3.14 | 1.87 |
| $C_5H_{12}$ | 2.47 | 2.19 | 2.31 | 1.85 | 1.34 | 0.76 |

Example 3—Charless Catalytic Pyrolysis of Lignocellulosic Biomass into Liquid and Gaseous Products Materials and Methods The materials for catalyst preparation were zirconium nitrate (Sigma-Aldrich), yttrium nitrate (Alfa Aesar), yttrium stabilized zirconium oxide (Alfa Aesar), sodium hydroxide, urea, and ammonium hydroxide.

The biomass feedstocks studied were rice straw, corn stover, sugarcane bagasse (agricultural residues), pine wood (softwood), pinyon juniper (forest residue), and poplar wood (hardwood). All the biomass samples were ground in a cryogenic grinder, 6750 freeze/mill (SpexCertiPrep, Metuchen, N.J.) to a fine powder.

Catalyst Preparation

Red mud-supported zirconium catalyst with a metal loading of 12% was prepared as follows. Red mud (RM) (2 g) was dispersed in deionized water (50 mL) at room temperature and mechanically stirred at 400 rpm. Zirconyl nitrate (0.634 g) was added to RM dispersion. The resulting mixture was kept stirring at 85° C. for six hours. After drying by evaporation, the sample was calcinated at 550° C. (with ramp heat 15° C./min.) for three hours. RM-supported yttria stabilized zirconia with a metal loading of 12% was prepared in a similar manner.

Thermogravimetric Catalytic Pyrolysis of Lignocellulosic Biomass Feedstocks

Cryogenically finely ground rice straw was mixed with finely ground catalyst in a ratio of 1:10 (w/w). The total catalyst weight was 10 mg and biomass was 1 mg. The mixture was thoroughly mixed with a spatula and then loaded into the thermogravimetric analyzer platinum pan. A TA Q500 thermogravimetric analyzer (TA Instruments, New Castle, Del., USA) was used for the pyrolysis. High purity nitrogen was used for the pyrolysis and the gas flow rate was 45 ml/min. The heating rate was 10° C./min. and the final pyrolysis temperature was 600° C.

To check the activity of the prepared catalyst, after the pyrolysis was completed at 600° C., the pyrolysis pan and contents were cooled to room temperature and the final temperature was recorded. Since all the biomass had been consumed and there was no char in the pan, a fresh biomass was added to the used catalyst and a new pyrolysis conducted. This process was repeated about five times to evaluate the catalyst activity as well as the stability of the catalyst. All the other biomass was taken though a similar pyrolysis process.

To evaluate the concept of charless/cokeless pyrolysis, after the pyrolysis under nitrogen atmosphere up to 600° C., the reactor was cooled to room temperature and the nitrogen gas was replaced with air, and the combustion of the residue was conducted at 10° C./min. up to 600° C.

Another pyrolysis was also conducted at the same heating rate, but the reaction was stopped at 410° C. and the unit was cooled to room temperature. The nitrogen gas was replaced with air and the combustion reaction conducted to 600° C.

The pyrolysis catalysts were analyzed with a scanning electron microscope (SEM) before and after the TGA experiments. The Brunauer-Emmett-Teller (BET)-specific surface areas of the catalysts were also measured after the TGA catalytic pyrolysis of the biomass. Some of the catalysts were also analyzed with X-diffraction spectroscopy.

Fixed Bed Tubular Catalytic Pyrolysis of Lignocellulosic Biomass Feedstocks

The two catalysts prepared as described above (red mud/yttrium stabilized zirconium oxide) were scaled up to 20 g for the tubular fixed bed pyrolysis studies. The tubular reactor (STF 1200 Tube Furnace, Across International, Livingston, N.J.) was a quartz tube of diameter of 50 cm and 70 cm long. The split tube furnace was heated with a one-zone electric heater and the heating zone was 20 cm long. 10 g of catalyst and 2 g of pine wood biomass were thoroughly mixed in two the alumina crucibles to give a total of 20 g catalyst and 4 g of pine wood. The outlet of the tubular reactor was connected to three bubbling gas tube condensers immersed in dry-ice and liquid nitrogen cooling baths (see diagram). The reactor was heated at various rates to 600° C., and nitrogen was passed through the quartz tube reactor at 45 ml/min. The non-condensable gases and pyrolysis vapors were passed through the condensers, and samples of gases were collected in Tedlar gas bags for analysis in microGC 490 (Agilent Technologies, Santa Barbara, Calif.). The pyrolysis products were quantified and the oils were analyzed using FT-IR spectrometry. Total mass balance for the process was determined. The catalysts were examined visually as well as using XRD and SEM to detect the presence of any char/coke on their surfaces. The BET-specific surface areas of the catalysts were also measured after the pyrolysis studies. The pyrolysis studies were repeated several times to assess any deactivation of the catalysts. The pyrolysis heating rates were also changed to various rates to determine the effect on the catalyst activity and composition of gases and liquids.

Results and Discussions

Figure 39:
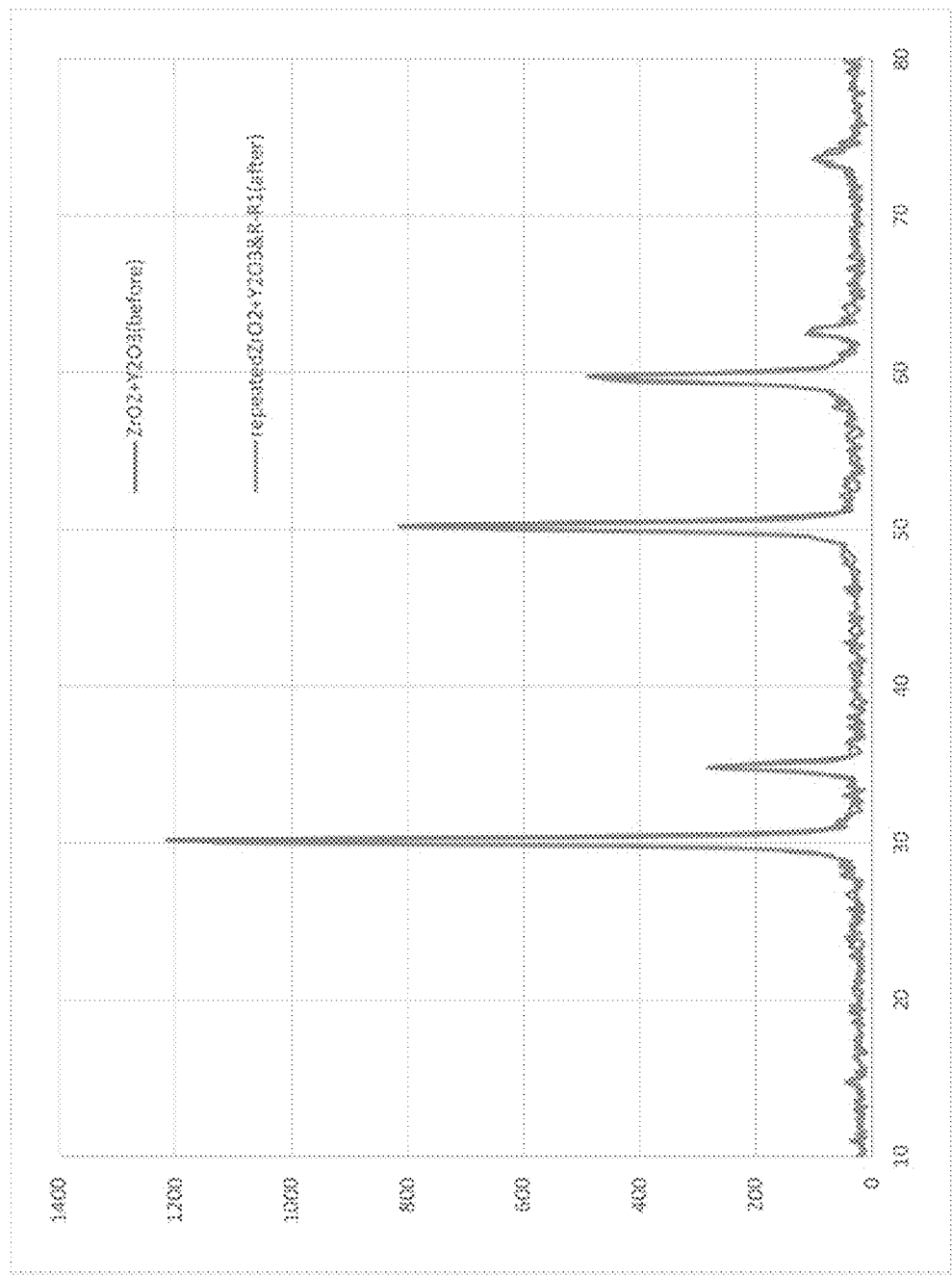
FIG. 39 depicts XRD of yttria stabilized zirconia (YSZ) (sample obtained from Sigma-Aldrich, St. Louis, Mo., USA) from Example 3.
Figure 40:
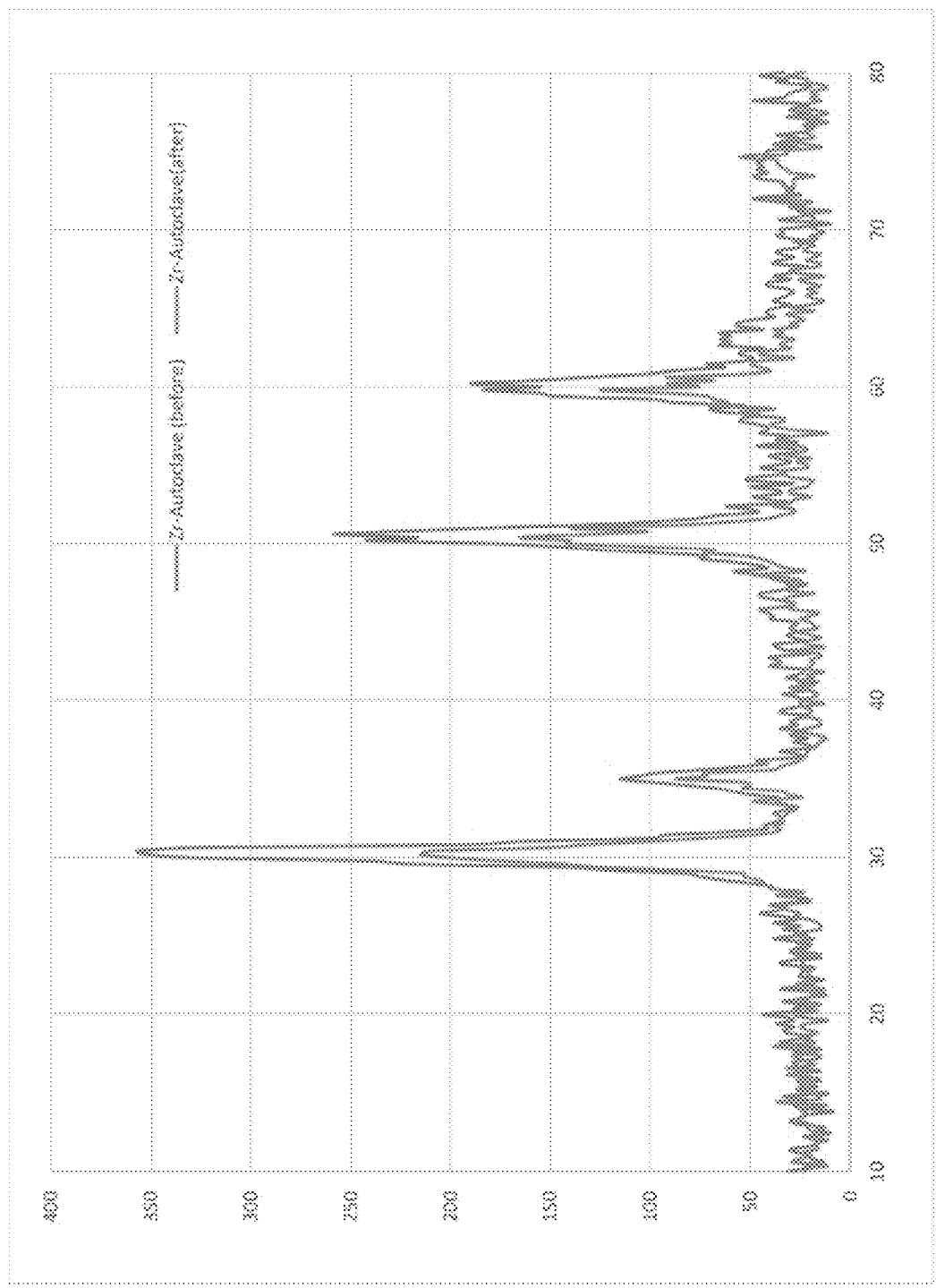
FIG. 40 depicts XRD of NaOH stabilized tetragonal zirconia prepared from zirconyl nitrate before and after TGA pyrolysis from Example 3.
Figure 41:
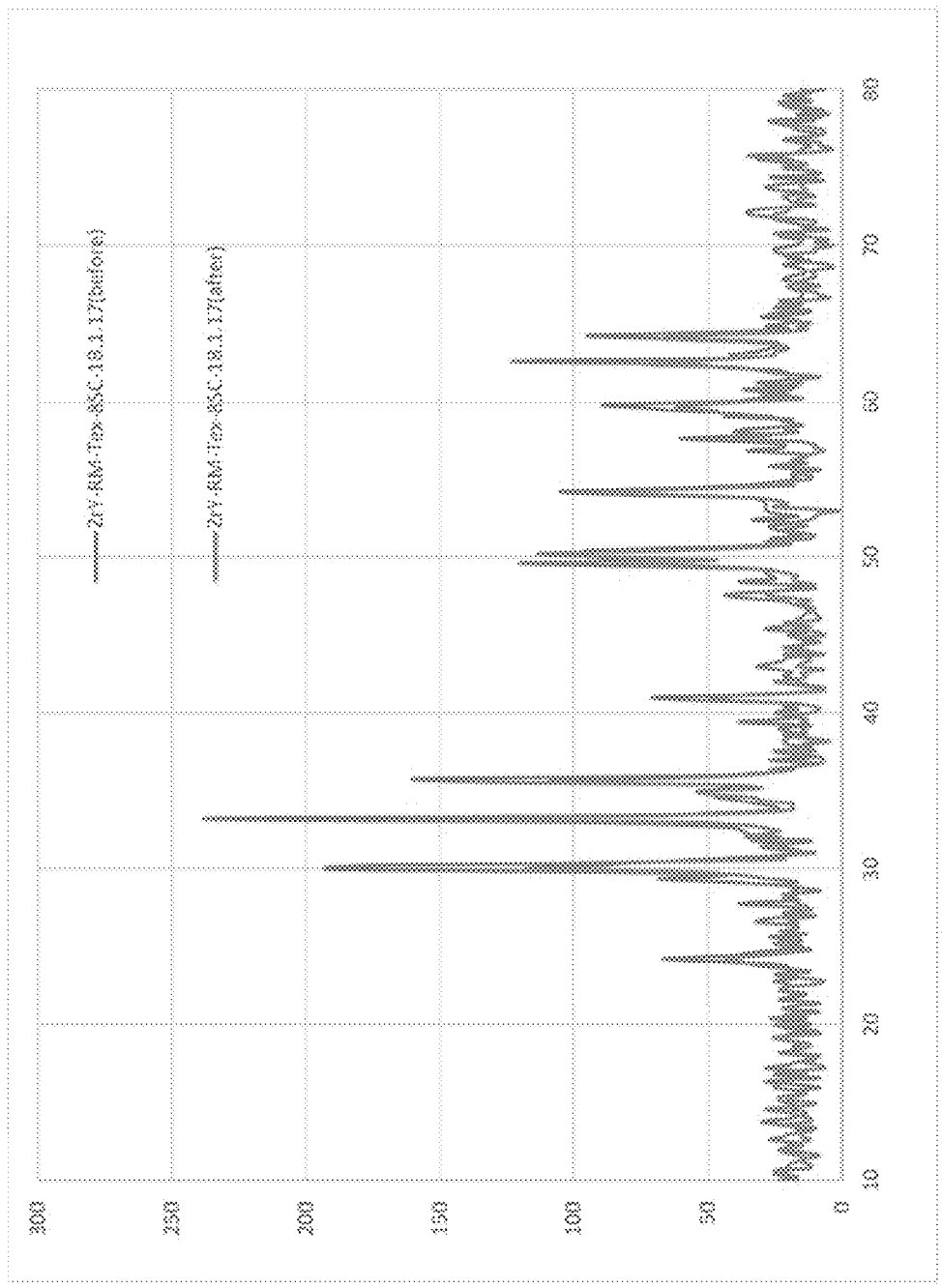
FIG. 41 depicts XRD of red mud supported YSZ spectra of catalyst before and after TGA pyrolysis with rice straw from Example 3.

The BET surface areas of the catalysts prepared from red mud and various zirconium oxide combinations were very small. These results were similar to pure red mud catalysts which had surface areas of about 30 m²/g. These catalysts were distinctly different from red mud modified with colloidal silica and alumina that had relatively larger surface areas than both the zirconium modified and pure red mud. The XRD spectra of these catalysts showed the distinct spectra of both red mud and zirconium oxide. The zirconium oxide existed in either amorphous or crystalline forms. The crystalline forms were either monoclinic or tetragonal zirconia. The XRD spectrum of pure yttria stabilized zirconia is shown in FIG. 39. The distinct tetragonal 2-theta peaks at 30.2 and 50.2 are clearly shown and there are no monoclinic peaks. A stable tetragonal zirconia was also prepared from zirconyl nitrate ($ZrO(NO_3)_2$) using sodium hydroxide as a stabilizing agent. The XRD of the sodium hydroxide stabilized zirconia is shown in FIG. 40, and its spectrum is in complete agreement with the yttria stabilized zirconia obtained from Sigma-Aldrich (FIG. 39). The red mud-supported yttria stabilized zirconia (RM/YSZ) showed strong peaks for both tetragonal zirconia and ferric oxide (magnetite) as shown in FIG. 41.

Example 4—Viscobreaking of Waxy Crudes (Yellow and Black) for Pipeline Transportation In this example, the red mud catalyst was investigated to process the waxy crudes to reduce the viscosity of the waxes and improve the pour point so that they could be pumped and piped from the oil fields to refineries.

Experimental Procedure

The following experimental procedure was used:
1) Weigh 20 g of material (yellow wax, black wax, or used lube oil) and add to 300 mL autoclave reactor.
2) Add 2 g (or 6 g) of red mud catalyst to the waxy crude.
3) Close the reactor and flush with nitrogen.
4) Check for leaks using soap solution.
5) Heat the reactor to 400-420° C. and hold it at this temperature for 15 minutes.
6) Record the pressure rise with time.
7) After 15 minutes, allow the reactor to cool to room temperature.
8) Record the gas pressure and take samples of gas for analysis.
9) Open the reactor and determine the mass of product in the reactor.
10) Centrifuge the red mud product mixture at 4000 rpm for 30 minutes.
11) Decant the product.
12) Measure the viscosity and density of the liquid product.
13) Determine the pour point of the liquid using ASTM D 97.

Steps 1-11 were repeated with the catalyst.

Conversion of Yellow Waxy Crude

The result of the liquefaction of the yellow waxy crude, which does not solidify at room temperature, is shown in Tables 23 and 24. As can be seen in Table 15, at a catalyst loading of 10 wt %, both residence time and temperature influenced the yields of various fractions. The highest yield of liquid product (86.35 wt %) was attained at 420° C. and 15 minutes residence time. Comparing the yields of Run #1 and #3, it is clear that the reaction temperature has a major influence on the production of liquid. Liquid yield increased by 26.3% for 20° C. increase in temperature. In contrast 15 minutes increase in reaction time only produced 11.3% increase in the yield of liquids. Thus, liquid yields can be increased by increasing the reaction temperature. The lower liquid yields could also be due to retention of some of the liquid in the catalyst which was not recovered.

TABLE 15

Product yields from the red mud catalytic treatment of yellow wax at various temperatures.

| Run # | Reaction temp (° C.) | Reaction time (min) | Catalyst loading (wt %) | Yellow wax product yields | | |
|---|---|---|---|---|---|---|
| | | | | Liquid (wt %) | Unreacted wax (wt %) | Gas (wt %) |
| 1 | 400 | 15 | 10 | 68.35 | 31.16 | <0.025 |
| 2 | 400 | 30 | 10 | 76.05 | 23.90 | <0.025 |
| 3 | 420 | 15 | 10 | 86.35 | 13.55 | 0.01 |
| 4 | 420 | 15 | 30 | 90 | nd | 0.01 |

TABLE 16

Properties of products from yellow and black waxy crude red mud treatment.

| Run # | Reaction temp (° C.) | Reaction time (min) | Catalyst loading (wt %) | Pour point (° C.) | $\mu$ (mPa · s) | $\rho$ (g/cm$^3$) |
|---|---|---|---|---|---|---|
| 1 | 400 | 15 | 10 | 11 | 5.33 | 0.80 |
| 2 | 400 | 30 | 10 | 9 | 3.35 | 0.79 |
| 3 | 420 | 15 | 10 | −5 | 2.05 | 0.77 |
| 4 | 420 | 15 | 30 | −5 | 1.25 | 0.68 |
| 5 | 420 | 30 | 0 | 2 | 1.85 | 0.78 |
| 6 | 420 | 15 | 30 | −17* | 2.61 | 0.81 |

The pour point and the viscosities of the products also varied with both temperature and residence. The change in temperature from 400 to 420° C. decreased the pour point by 16° C. In comparison to a thermal process, for heat treating at 420° C. for 30 minutes, the pour point of the liquid product was 2° C. (Table 16). Thus, the catalyst improved the pour point by over 7° C. The catalytic process therefore improves the properties of the oil, and there was a savings in energy input.

When the quantity of the catalyst was changed, the major difference was in the product yield, because there was no detectable amount of heavy wax compared to using 10 wt % catalyst where about 13.5 wt % unreacted wax was recovered for the same amount of reaction time. The lower liquid yield reported for experiment #4 was due to the retention of some of the product in the catalyst. The product retention in the catalyst was verified by reusing the same catalyst for consecutive processing. During the initial run using 30 wt % catalyst, the liquid collected after decantation was 12.5 g, but when the same catalyst was reused in the next run, the liquid recovered after decantation was 17.5 g. The apparent difference was due to the saturation of the catalyst during the initial run and therefore more liquid was recovered.

It is also interesting to note that although the yields and viscosities of products using 10 wt % and 30 wt % catalyst were different, the pour point of the products were similar (−5° C.). Thus, it appears the reaction temperature plays a very important role in reducing the pour point of the material, whereas the catalyst promotes the reaction and influences the yield and viscosities. The higher the catalyst content the better the yield and lower the viscosity. Thus, these two parameters can be optimized to improve yield, viscosity and pour point of the product.

The thermogravimetric analysis (TGA) of the raw and upgraded yellow waxy crude oil in nitrogen atmosphere showed interesting thermograms. The raw yellow waxy crude oil showed two major weight loss peaks at 250° C. and 425° C.

Figure 42:
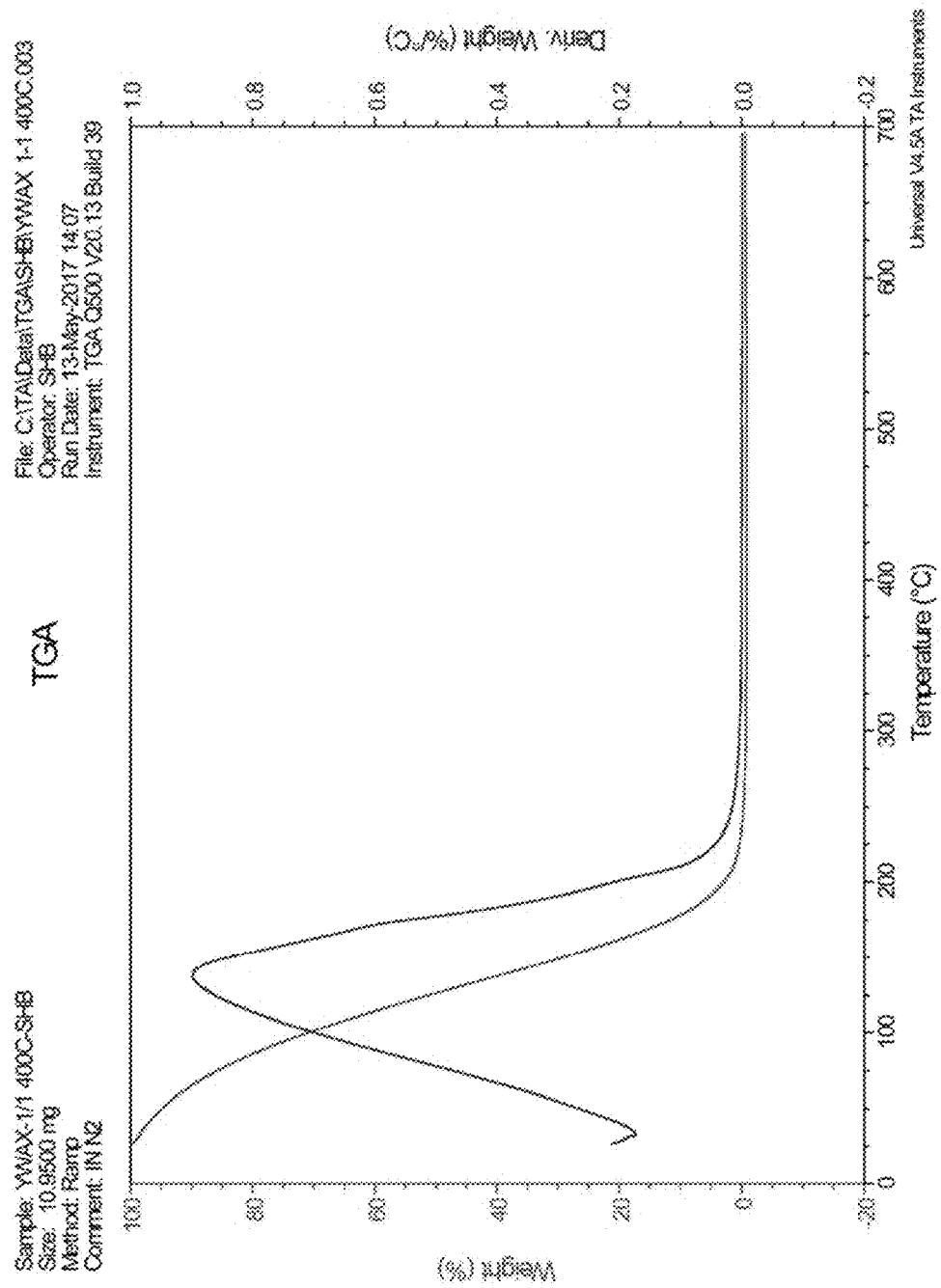
FIG. 42 depicts from Example 4 thermogravimetric analysis (TGA) and derivative TGA of upgraded yellow waxy crude oil at 400° C. using red mud catalyst.

These peaks suggest that there are two major compounds in the raw crude oil representing low and high molecular weight compounds of aliphatic origin (see FT-IR in FIG. 42). Long-chain aliphatic hydrocarbons are the major constituents of waxes. The higher molecular weight compounds had the maximum degradation at 420° C., whereas the lower molecular weight compounds had the maximum degradation at 250° C.

Figure 43:
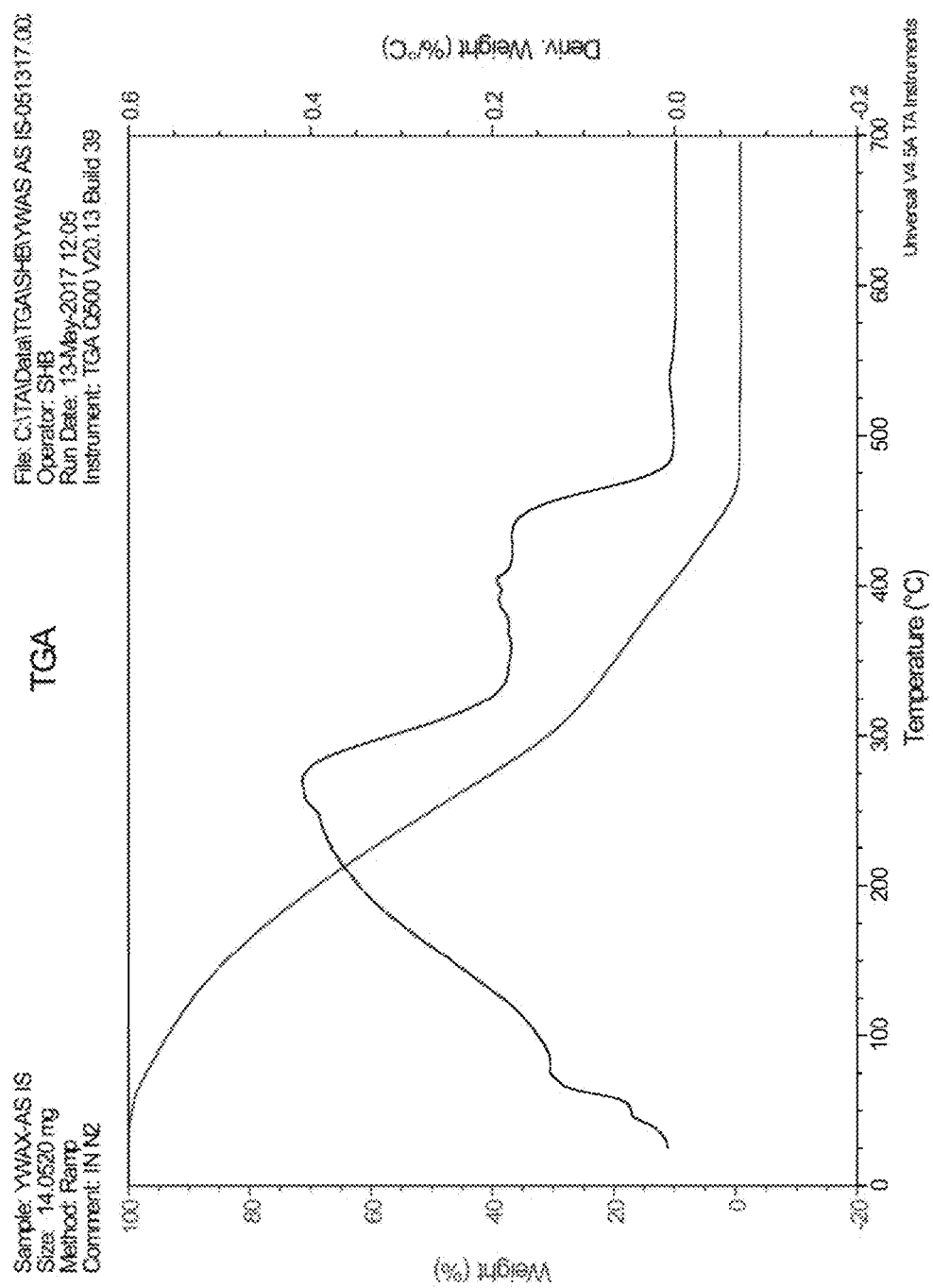
FIG. 43 depicts from Example 4 TGA and derivative TGA of raw yellow waxy crude oil.

In contrast, the thermogram of the upgraded (400° C., on red mud) yellow waxy crude oil had only one peak with a maximum degradation at 150° C. (FIG. 43). Clearly the TGA data suggests the red mud was effective in cracking both the lower and higher molecular weight compounds to much smaller molecular weight compounds with lower decomposition temperature. It is also interesting to note that there were no residues for the decomposition of both compounds.

Conversion of Black Waxy Crude

The black waxy crude was also investigated to assess the effect of the catalyst, reaction temperature, and residence time on the pour point, and viscosity of the product. Run #6 (Table 16) shows the properties of the products of the black waxy crude after treatment at 420° C. for 15 minutes using a 30 wt % catalyst. Comparing Run #4 and Run #6, the treatment had a stronger effect on the black waxy crude than the yellow waxy crude. For the black waxy crude, the pour point was more than three times lower than that of the yellow waxy crude for similar treatment parameters. It is also interesting to note that although the treated black waxy crude pour point (−17° C.) was very low, its viscosity was higher than that of the yellow waxy crude, which had a pour point of −5° C. There appeared to be very little correlation between the viscosity and pour point of the treated waxy crudes.

Conversion of Used Lubricant Oil

Unlike the yellow and black wax crudes, the used lubricant oil (ULO) was liquid at room temperature and had a pour point of −25° C. The conversion products of the ULO are shown in Table 17. At 420° C. and 15 minutes residence time, there was a drastic change in the physical properties of the ULO. During the reaction, when the reactor temperature reached the set point of 420° C., there was a drop in the temperature to 413° C., and the temperature stayed there for about three minutes before rising back to 420° C. and then stayed at 420° C. for the rest of the reaction. This drop in temperature was attributed to endothermic reaction probably due to the cracking of some the chemical bonds. Simultaneous with the drop in reaction temperature, the reaction pressure increased over the same period to 380 psi. The rapid increase in pressure also suggests that there was a catalytic chemical reaction producing gases. In contrast to the reaction without the catalyst, the increase in pressure was only 180° C.

TABLE 17

Properties of raw and upgraded used lube. oils at various temperatures.

| Feedstock | Reaction Temp (° C.) | Cat Loading (wt %) | Reaction Time (min) | Viscosity @ 40° C. (μmPa · s) | Viscosity @40° C. η(mm²/s) | Density ρ (g/cm³) | Pour Point (° C.) |
|---|---|---|---|---|---|---|---|
| Raw used lube. oil | 0 | 0 | 0 | 37.50 | 44.12 | 0.85 | −25 |
| Used lube. oil | 420 | 0 | 15 | 8.47 | 10.19 | 0.81 | −28 |
| Used lube. oil | 420 | 30 | 15 | 1.71 | 2.19 | 0.78 | −41 |
| Used lube. oil | 420 | 30 | 15 | 1.73 | 2.25 | 0.77 | −41 |
| Used lube. oil | 400 | 30 | 15 | 3.41 | 4.23 | 0.80 | −31 |
| Used lube. oil | 350 | 30 | 15 | 13.23 | 15.94 | 0.83 | −25 |
| Used lube. oil | 350 | 30 | 30 | 10.07 | 12.16 | 0.83 | −24 |
| Used lube. oil | 350 | 30** | 15 | 14.65 | 16.23 | 0.83 | −24 |
| Used lube. oil | 390 | 20* | | 3.45 | | | −25 |
| Used lube. oil | 300 | 20* | | | | | −25 |

The dynamic viscosity of the ULO was extremely low after the reaction at 420° C. The viscosity decreased from 37.50 mPa·s for the raw oil to 1.71 mPa·s for the product. The repeated experiment confirmed the results. A more drastic change in physical property was observed for the pour point which changed from −25° C. for the raw oil to −41° C. for the product at 420° C. and 15 minutes residence time (Table 17).

The reactions at lower temperatures and different residence times showed different results. The reaction at 350° C., 15 minutes residence time showed a viscosity decrease from 37.50 mPa·s to 13.23 mPa·s. When the residence time was increased to 30 minutes for the same reaction temperature the viscosity only decreased to 10.07 mPa·s. Interestingly, the pour point of the product was the same as the raw ULO for the reaction temperature at 350° C., independent of the residence time. During the run, an exotherm was observed when the reaction temperature reached 350° C. Although the reactor heater was automatically turned off by the controller, the reaction temperature continued to increase up to 378° C. before stopping and decreasing back to 350° C. for the rest of the run. This exothermic reaction was attributed to the reduction of viscosity of the oil but no breakage in the chemical bonds of the oil components. This was in contrast to reaction at 420° C., which was endothermic producing a rapid rise in pressure. Since the pour point of the product at 350° C. was the same as the raw material, this suggests that there was no cracking of the chemical bonds.

There seems to be two major reactions during the upgrading of the ULO; at 350° C., there was an exothermic reaction, which contributed to the reduction in viscosity of the oil, but at 420° C., there was a secondary endothermic reaction that contributed to the breakage of chemical bonds and lowering of the pour point and further reduction in the viscosity of the oil.

Catalyst Deactivation

All the above reactions were conducted in a batch reactor and did not provide enough information about the reactivity of the catalyst. For the catalyst to oil ratio of 1:3, the catalyst was reused after each run without regeneration to assess the deactivation of the catalyst. In this process, after reaction at 420° C. for 15 minutes residence time, the product was centrifuged at 4000 rpm for 30 minutes, and the product decanted. After each decantation, the catalyst was reloaded into the reactor without regeneration and fresh oil as added to the catalyst. This experiment was repeated four times. The catalyst recycle data is shown in Table 18. It is clear from Table 18 that there was some slight deactivation of the catalyst after four runs. This suggests that the catalyst could be used for longer periods before regeneration.

TABLE 18

Effect of catalyst recycle on properties of the upgraded ULO.

| Catalyst state | Product density (g/cm³) | Product viscosity (mPa · s) | Reaction pressure (psi) |
|---|---|---|---|
| Fresh | 0.75 | 1.74 | |
| 1X recycle | 0.77 | 2.09 | |
| 2X recycle | 0.78 | 2.33 | |
| 3X recycle | 0.79 | 2.61 | |
| ULO | 0.85 | 37.50 | |

FT-IR Results

Figure 44:
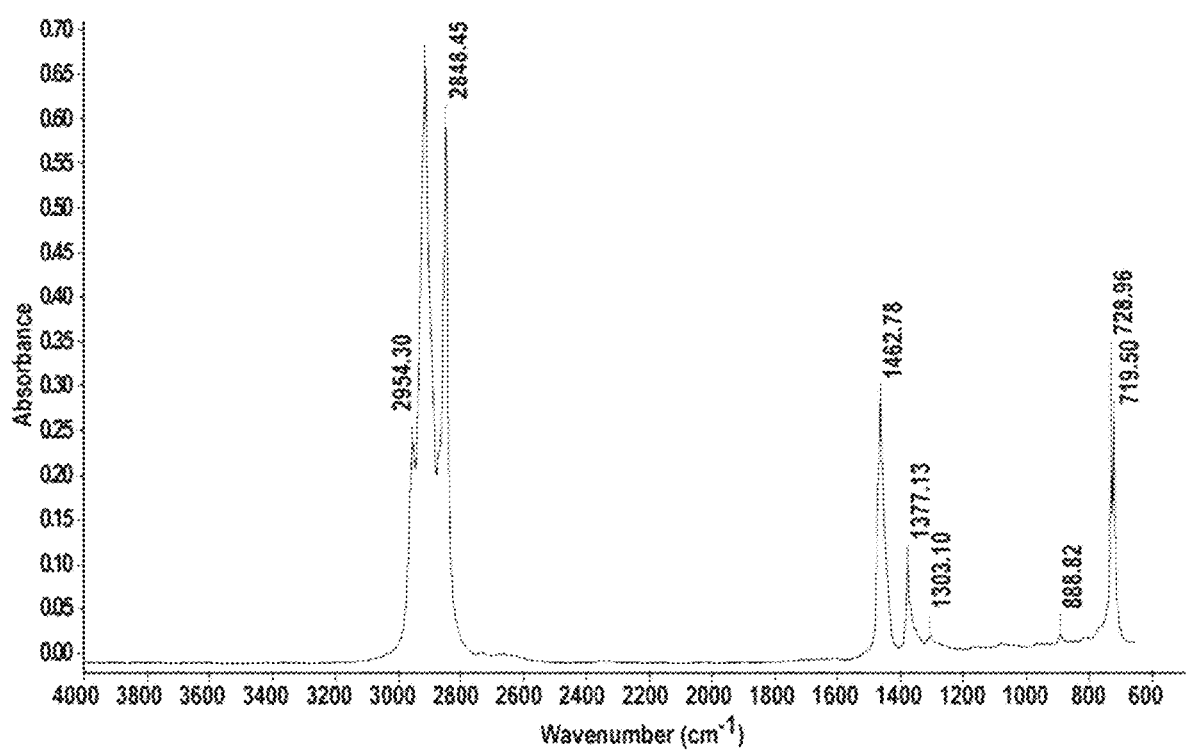
FIG. 44 depicts FT-IR spectrum of raw yellow wax (feed) from Example 4.
Figure 45:
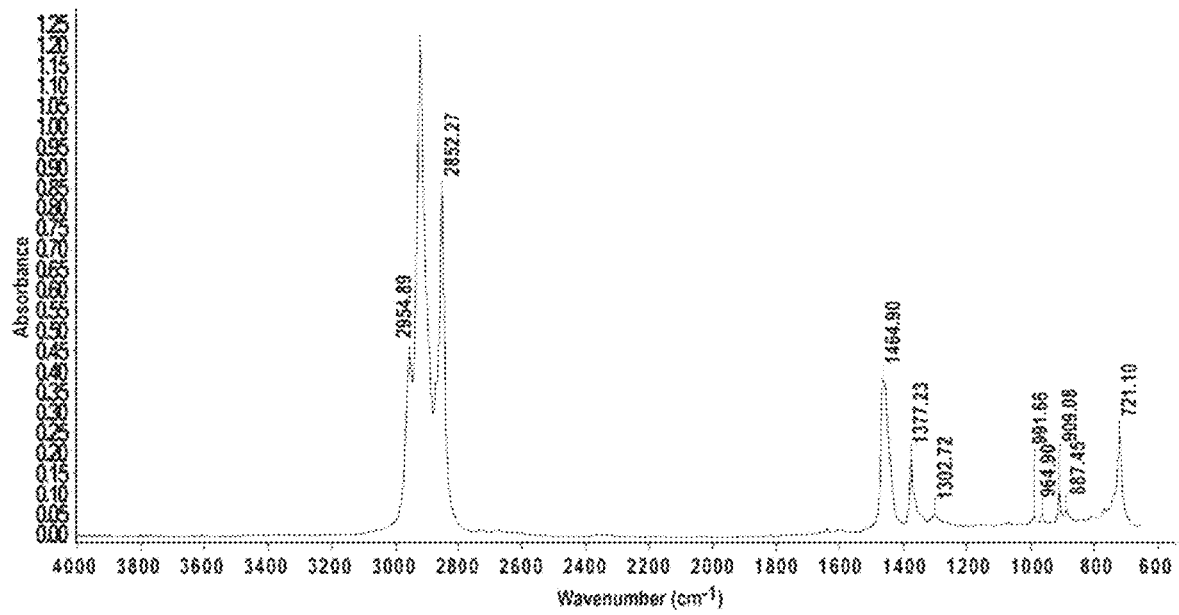
FIG. 45 depicts from Example 4 red mud upgraded yellow wax product at 400° C. and 15 minutes residence time.
Figure 46:
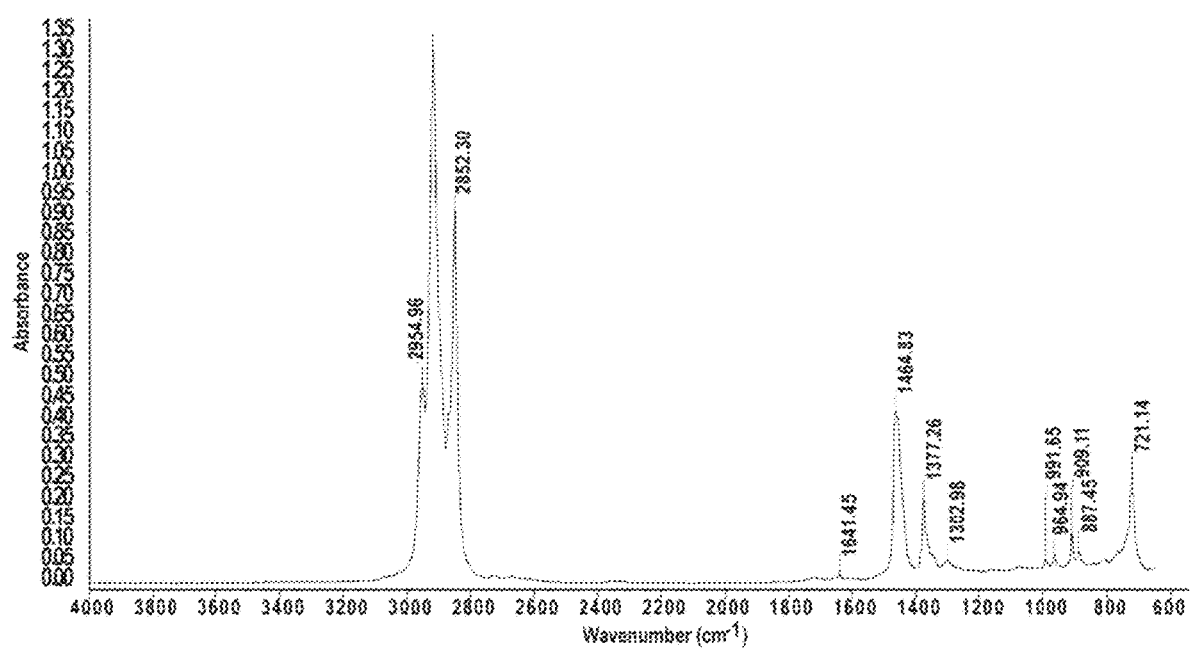
FIG. 46 depicts from Example 4 red mud upgraded yellow wax product at 400° C. and residence time of 30 minutes.
Figure 47:
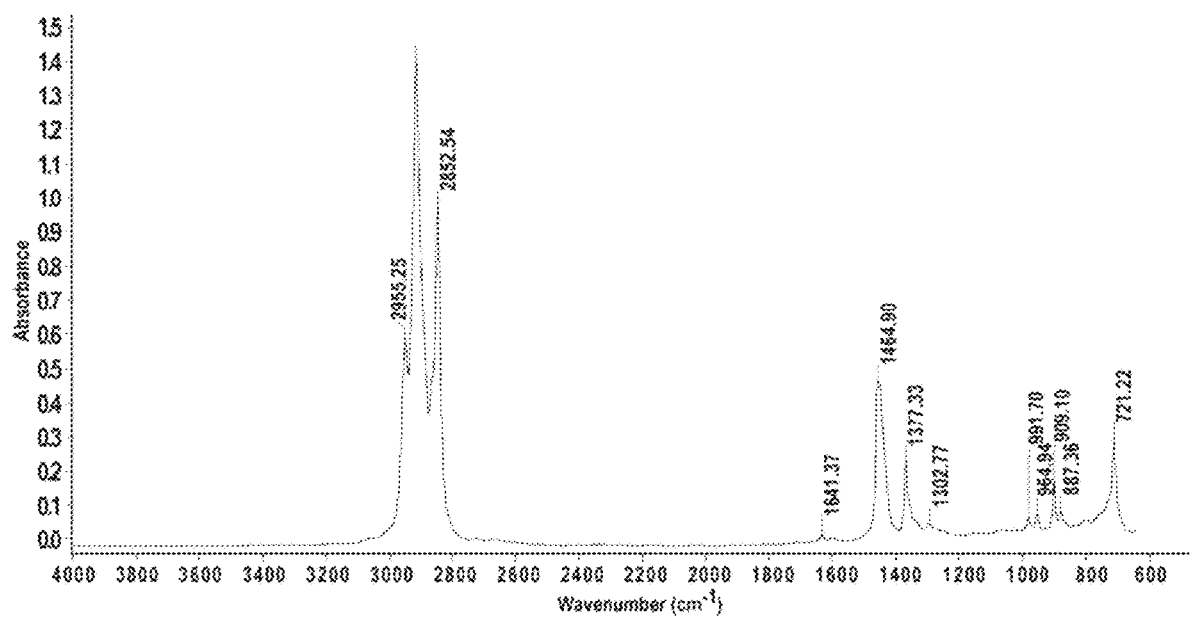
FIG. 47 depicts from Example 4 red mud upgraded yellow wax product at 420° C. and residence time of 15 minutes.
Figure 48:
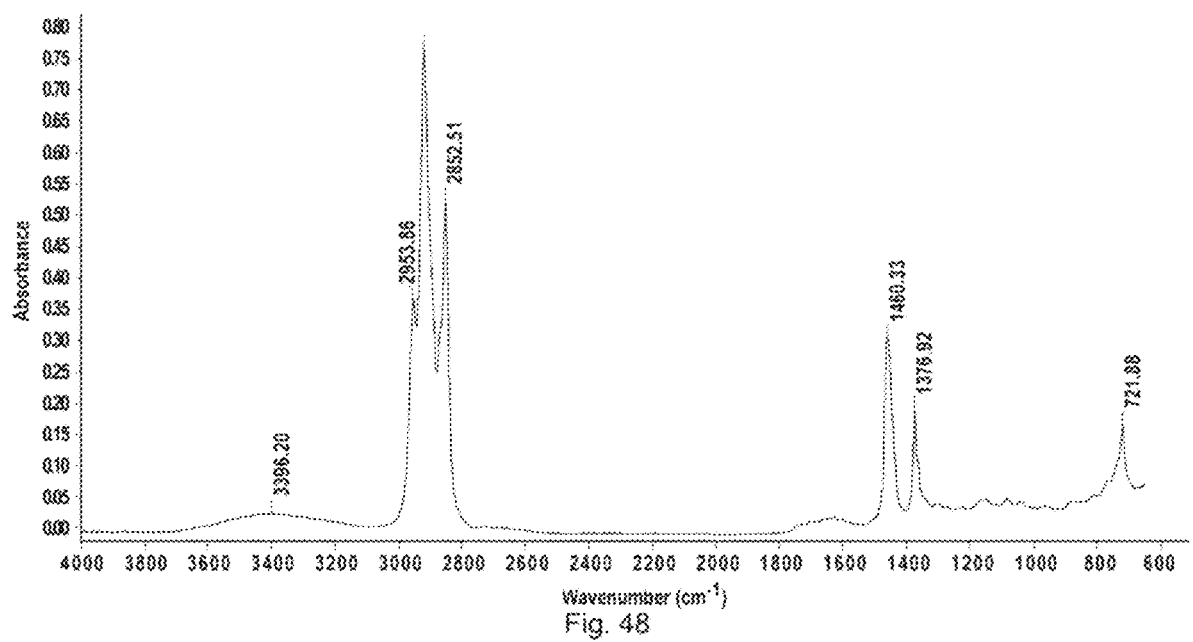
FIG. 48 depicts from Example 4 FT-IR spectrum of raw used lube. oil.
Figure 49:
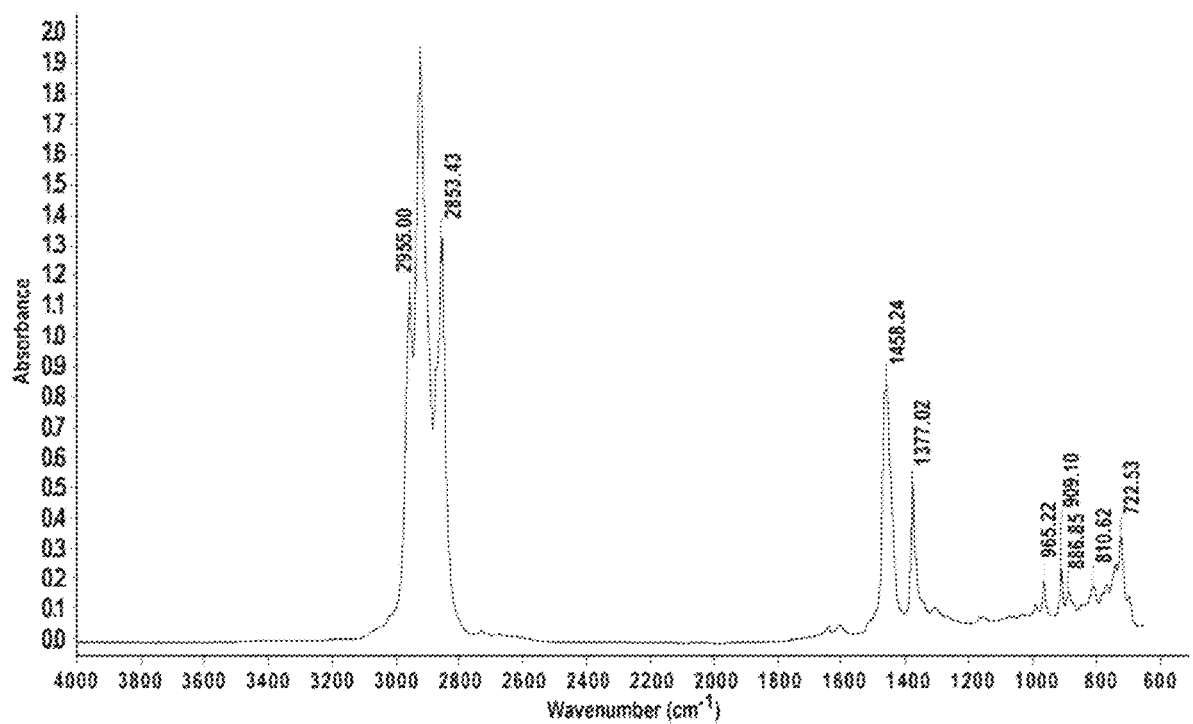
FIG. 49. depicts from Example 4 red mud upgraded used lube. oil product at 420° C., 15 minutes residence time.
Figure 50:
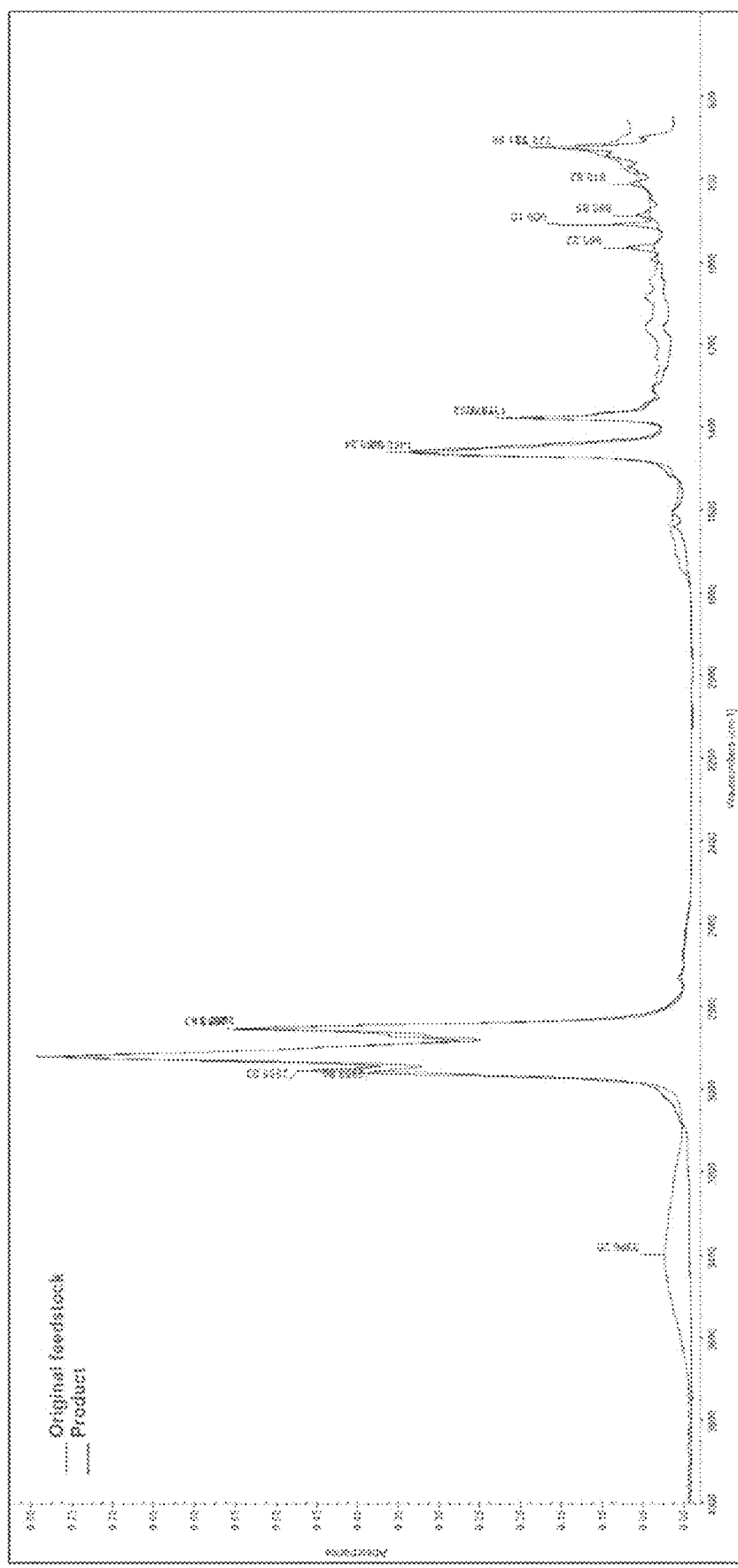
FIG. 50 depicts from Example 4 red mud upgraded product and raw material spectra.

FT-IR spectra results are shown for raw yellow waxy crude (FIG. 44), red mud-upgraded yellow wax product reacted at 400° C. at 15 minutes reaction time (FIG. 45), red mud-upgraded yellow wax product reacted at 400° C. at 30 minutes residence time (FIG. 46), red mud-upgraded yellow wax product reacted at 420° C. at 15 minutes residence time (FIG. 47), raw used lubricant oil sample (FIG. 48), and red mud-upgraded ULO product reacted at 420° C. at 15 minutes residence time (FIG. 49). FIG. 50 shows the spectra for the raw used lubricant sample and the upgraded ULO.

Example 5—Red Mud Catalytic Pyrolysis of Tire Crumbs

The tire crumb (TC) samples were supplied by Milestone Resources LLC (Miami Beach, Fla., USA) through its subsidiaries in Puerto Rico. The crumbs "as received" were about 4 mm in size, and they were ground in a Wiley mill (model 4) to pass a 2-mm mesh. The ground samples were characterized for moisture and ultimate composition.

Red mud used for the catalytic pyrolysis studies was basic and easily crumbed into fine powder. To improve the properties of the red mud, samples were converted into attrition-resistant material. In this process the red mud was first dried and a mixture of 50 wt % red mud and 50 wt % colloidal alumina suspension in water was mixed. The mixture was stirred vigorously for about one hour and then dried at 105° C. overnight. The dried material was then ground and sieved into suitable particle size (>180 μm<450 μm) and then calcined at 650° C. to a hard material. In this preparation the colloidal alumina was used as a binder. This material was tested for attrition resistance by fluidizing 100 g material with air at 25 l/min. for 72 hours and then measuring the amount of fines produced below 180 µm. The material was stored in polyethylene bags at room temperature until the time of pyrolysis.

The pyrolysis experiments were conducted in 2-inch and 4-inch bubbling fluidized bed reactors. For the pyrolysis in the 2-inch fluidized bed reactor, the reactor consisted of a 2-inch stainless steel reactor equipped with porous metal gas distributor. The reactor was connected to a Brabender twin screw feeder through a gas-cooled side arm as shown in the schematic diagram below. The outlet of the reactor was connected to a hot gas filter and two ethylene glycol-cooled condensers. The effluent from the condensers was passed through an electrostatic precipitator and then finally through a coalescing filter. For each pyrolysis reaction, the fluid bed reactor was filled with 100 g of calcined attrition-resistant red mud catalyst and heated to 450° C. The particle size of the catalyst was 180-425 µm, and it was fluidized with nitrogen gas flowing at 15 L/min. The TC was fed at 50 g/h through a jacketed air-cooled tube feeder into the fluidized bed reactor where pyrolysis took place. The pyrolysis vapors and char particles were passed through a 100 µm hot gas filter where the char particles were separated from the vapors. The char-free vapors were then passed through two ethyleneglycol-cooled condensers and then through an electrostatic precipitator and finally through a coalescing filter. The non-condensable gases were released into a fume hood. A slip stream of the non-condensable gases was injected into an SRI gas chromatograph for gas analysis. Material balance was determined by weighing the reactor, hot gas filter and all other pieces of equipment before and after each experiment. All runs were conducted in triplicates.

The pyrolysis oils were characterized for pH, viscosity, density, Karl Fischer moisture, ultimate composition, and TGA-simulated distillation. The pH of the oil was measured with a Mettler Toledo pH meter and probe (Mettler-Toledo GmbH, Switzerland) after calibration of the instrument. The pH data was obtained after five to 10 minutes stabilization of the mechanically stirred oil. The viscosity and density were measured at 40° C. using the SVM 3000 Stabinger viscometer. Calibrations were done prior to measurements with distilled water free from bubbles. A Metrohm 701KF Titrino (Metrohm Instruments, Riverview, Fla., USA) and a 703 titration stand setup were used for the volumetric Karl Fischer titration. Hydranal® composite 5 reagent was used. Fifty ml of methanol were placed in the titration vessel and conditioned. About 60-100 mg of the oil sample was loaded into a hypodermic plastic syringe and weighed. The sample was injected into the titration solvent and the syringe was weighed again. The water content was titrated volumetrically and the resulting mass was recorded.

The ultimate compositions of the TC pyrolysis oils were determined using Thermo Fisher Flash 2000 CHNS/O organic elemental analyzer (Thermo Fisher Scientific., Inc., Waltham, Mass., USA). About 10 mg of the sample was used for each analysis. The volatile matter, fixed carbon, and thermogravimetric simulated distillation analysis were determined using the TA Q500 thermogravimetric analyzer (TA Instruments, New Castle, Del., USA).

The TC pyrolysis oils were hydrotreated in a 300 mL Parr high pressure reactor (Parr Instrument Company, Moline, Ill., USA) using a nickel on silica alumina catalyst. The nickel on silica alumina catalyst was purchased from Sigma-Aldrich (St. Louis, Mo., USA). Thus, 10 g of TC pyrolysis oil was loaded into the Parr reactor and the 15 wt % catalyst (1.5 g) was added to the oil. The reactor was first flushed with nitrogen and then hydrogen to get rid of the air. The reactor was then pressurized with ultra-pure hydrogen to an initial cold pressure of 500 psi. The reactor was heated to the reaction temperature of 400° C. and then maintained at this temperature for 30 minutes. The reaction product was then cooled to room temperature, and gas samples were taken and the reactor opened and the liquid products collected and analyzed. The slurry product was centrifuged at 4000 rpm in Eppendorf 5702R centrifuge (Eppendorf North America, Hauppauge, N.Y., USA) for 30 minutes. The hydrogenated oil was decanted and analyzed for viscosity, density, and ultimate composition.

The tire pyrolysis char (TC char) samples from the reactor and the hot gas filter were separated from the red mud using a magnetic separator because the red mud after pyrolysis becomes magnetic. The non-magnetic char was then separated into two fractions by sieving. The fine chars <100 µm were analyzed for elemental composition. The samples were then evaluated for their potential as nutrient for plant growth or soil amendment to improve soil properties using the Mehlich-1 method. The Mehlich-1 (M1) extraction method was developed by Mehlich in 1953 to primarily determine the relative bioavailability of ortho-phosphate (PO4-P) in soils with acid to neutral pH and with low cation-exchange capacity (CEC) (<10 meq/100 g). The M1 extracting reagent comprises a mixture of 0.05 N HCl and 0.025 N $H_2SO_4$ and is also referred to as the "dilute double acid" solution. Phosphorus content is determined spectrophotometrically at 882 nm at an acidity of 0.20 M $H_2SO_4$ by reacting with ammonium molybdate using ascorbic acid as a reductant in the presence of antimony (Murphy and Riley, 1962). The method is unsuitable for alkaline calcareous soils and those with high CEC. The method is correlated to crop response to fertilizer phosphorus. The method has a phosphorus detection limit of about 1.0 kg P $ha^{-1}$ (on a dry soil basis) and is generally reproducible within ±8%. Phosphorus and cations may also be determined by ICP-AES instrumentation. This method has since been adapted for simultaneous determination of extractable potassium, calcium, magnesium, sodium, and zinc.

In these studies, two types of soils were treated, Bojac sandy loam from Suffolk, Va. and Braddock loam from Kentland, Va. were mixed with <100 µm TC chars in the ratio of 90% soil to 10% TC char. The soils were incubated at room temperature and moisture at 70% field capacity for one week. After one week the samples were dried and extracted using the M1 procedure. A routine fertility inductively coupled plasma (ICP) spectroscopy was used to analyze the samples. Samples with TC chars were compared with those without chars and all samples were run in triplicate.

Figure 51:
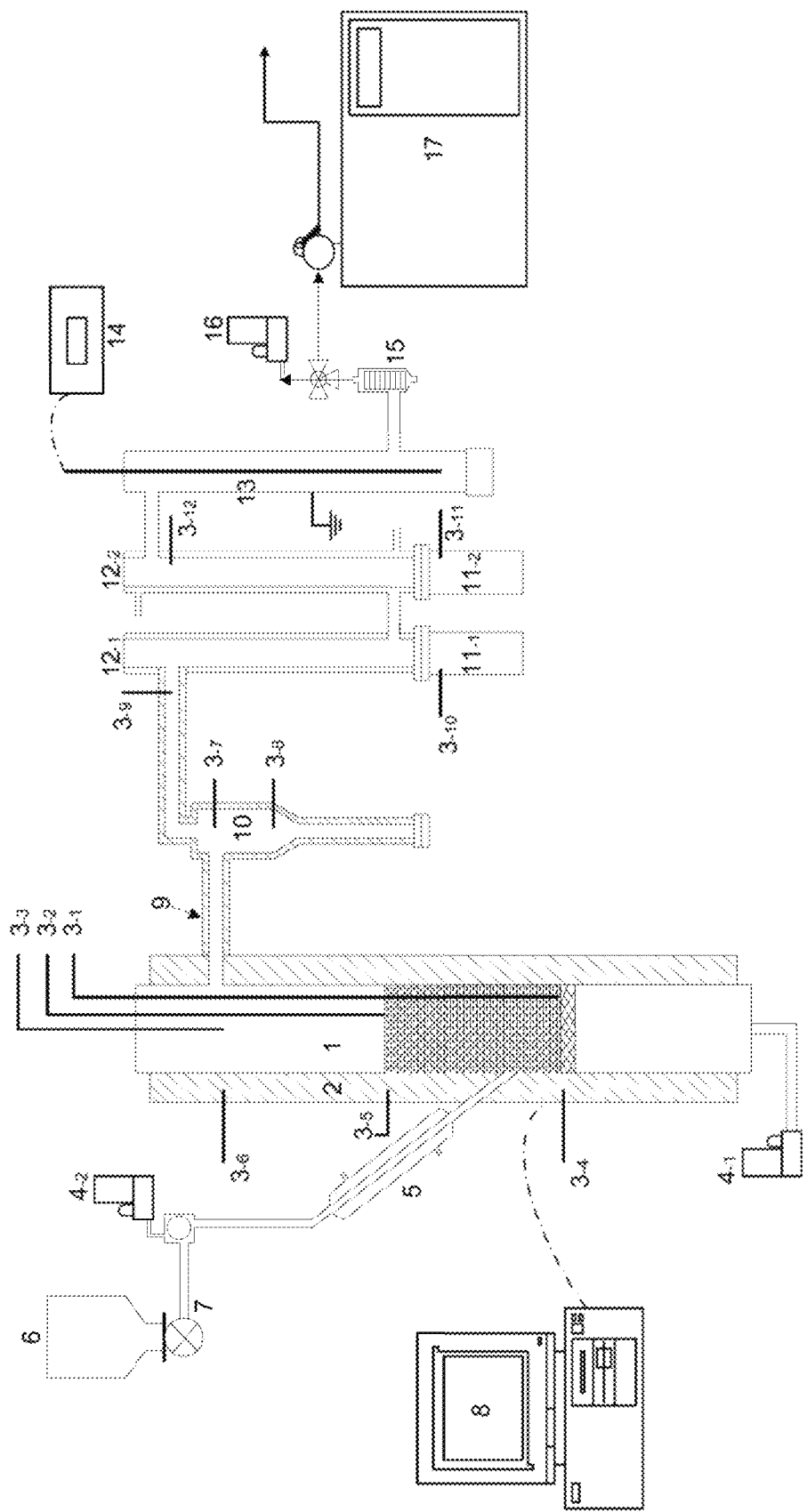
FIG. 51 illustrates the fluidized bed reactor utilized in Example 5.

The large TC char particles (≤800 µm) were used for activated carbon studies. The TC char particles were first analyzed for ash content and elemental composition. The steam activation of the TC char samples was carried out in a 2-inch fluidized bed reactor as shown in FIG. 51. As illustrated, the components of the fluidized bed reactor include:

1. Fluidized Bed Reactor
2. Furnace
3. Thermocouple
4. Mass Flow Controller
5. Heat Exchanger
6. Hopper
7. Sample Feeder
8. Computer
9. Heating Tape
10. Hot Filter -continued 11. Reservoir
12. Condenser
13. Electrostatic Precipitator
14. AC Power Supply
15. Filter
16. Mass Flow meter
17. Gas Chromatograph About 50 g of characterized TC char was loaded into the reactor and saturated steam passed through a fritted metal support into the TC char. The steam to char ratio was maintained at 6:1. The activation was carried out at 850° C. for two hours. The activated material was cooled to room temperature and the burn-off material was determined. The ash content of the activated material was determined and then the Brunauer-Emmett-Teller (BET) method was used to measure the surface areas of the activated TC char using Quantachrome BET surface analyzer (Quantachrome Instruments, Boynton Beach, Fla., USA).

Characterization of the Tire Crumbs

The ultimate analysis of the TC is shown in Table 19. The sulfur and carbon contents of the TC were relatively high, but the ash content was relatively low probably because of the processing which must have resulted in some inorganic material losses. The ground material was free flowing and easy to feed into the reactor without melting in the feed tube entrance to the hot reaction zone.

TABLE 19

Semi-quantitative compositional analysis of attrition-resistant red mud catalyst using X-ray florescence analysis.
SAMPLE NUMBER: G116/16-1
SAMPLE IDENTIFICATION: FRESH

| Element | wt. % | Element | wt. % | Element | wt. % |
|---|---|---|---|---|---|
| Silver | <0.003 | Hafnium | <0.005 | Rhodium | <0.002 |
| Aluminum | 23 | Mercury | <0.002 | Ruthenium | <0.002 |
| Arsenic | 0.002 | Holmium | <0.003 | Sulfur | 0.05 |
| Gold | <0.002 | Iodine | <0.008 | Antimony | <0.004 |
| Barium | <0.01 | Indium | <0.003 | Scandium | <0.002 |
| Bismuth | <0.002 | Iridium | <0.003 | Selenium | <0.001 |
| Bromine | <0.0008 | Potassium | 0.009 | Sillicon | 3 |
| Calcium | 0.8 | Lanthanum | <0.005 | Samarium | <0.005 |
| Cadmium | <0.003 | Magnesium | <0.009 | Tin | <0.004 |
| Cerium | <0.009 | Maganese | <0.001 | Strontium | <0.0006 |
| Chlorine | 0.1 | Molybdenum | <0.001 | Tantalum | <0.003 |
| Cobalt | <0.002 | Sodium | 3 | Terbium | <0.006 |
| Chromium | 0.02 | Niobium | <0.0007 | Tellurium | <.007 |
| Cesium | <.01 | Neodymium | <0.006 | Thorium | <.002 |
| Copper | 0.003 | Nickel | <0.001 | Titanium | 2 |
| Dysprosium | <0.008 | Phosphorus | 0.006 | Thallium | <0.002 |
| Erbium | <0.002 | Lead | <0.002 | Uranium | <0.002 |
| Europium | <0.007 | Palladium | <0.003 | Vanadium | <0.003 |
| Iron | 11 | Praseodymium | <0.005 | Tungsten | <0.003 |
| Gallium | 0.006 | Platinum | <0.002 | Yttrium | 0.005 |
| Gadolinium | <0.004 | Rubidium | <0.002 | Ytteribum | <0.004 |
| Germanium | <0.0007 | Rhenium | <0.004 | Zinc | 0.005 |
| | | | | Zirconium | 0.3 |

Figure 52:
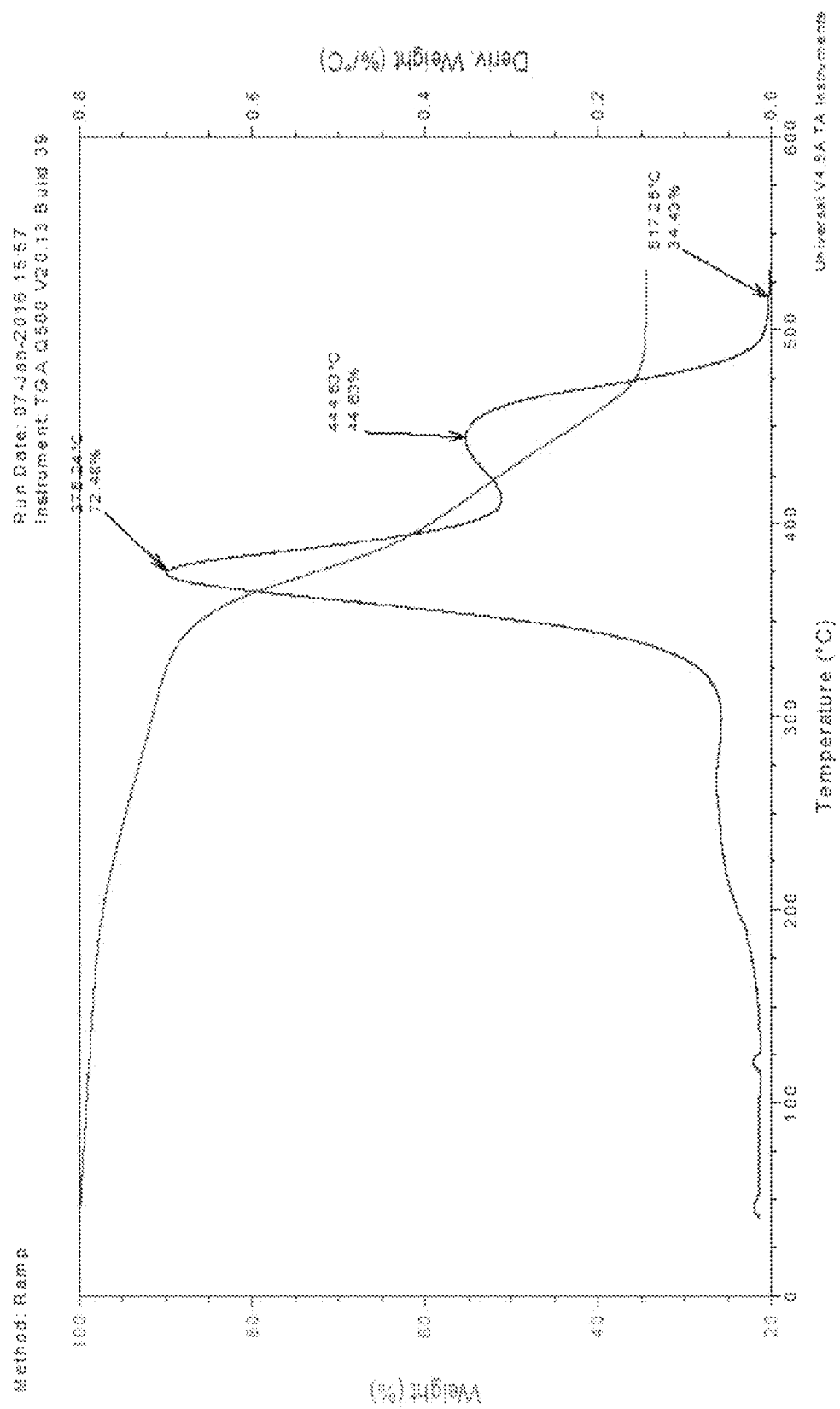
FIG. 52 depicts thermogram of New Jersey tire crumbs pyrolyzed under nitrogen atmosphere for Example 5.

The thermogravimetric analysis (TGA) of the TC showed one minor and two major decomposition temperatures (FIG. 52). The broad minor weight loss peak between 200 and 300° C. was attributed to the devulcanization of the rubber. The major weight loss at 375° C. was attributed to the textile component of the tire, which is commonly nylon fiber. Nylon decomposes at 310-380° C. The major decomposition peak at 444° C. was attributed to the butadiene rubber, which decomposes between 400 and 500° C. The pyrolysis residue from the TGA was relatively high (34.4 wt %) because of the high carbon black, zinc oxide and additives content of the TC. From the TGA, it is clear that the TC can be pyrolyzed between 400 and 500° C., where most of the degradation occurred.

Characterization of the Attrition-Resistant Red Mud (ARRM) Catalyst

Figure 53:
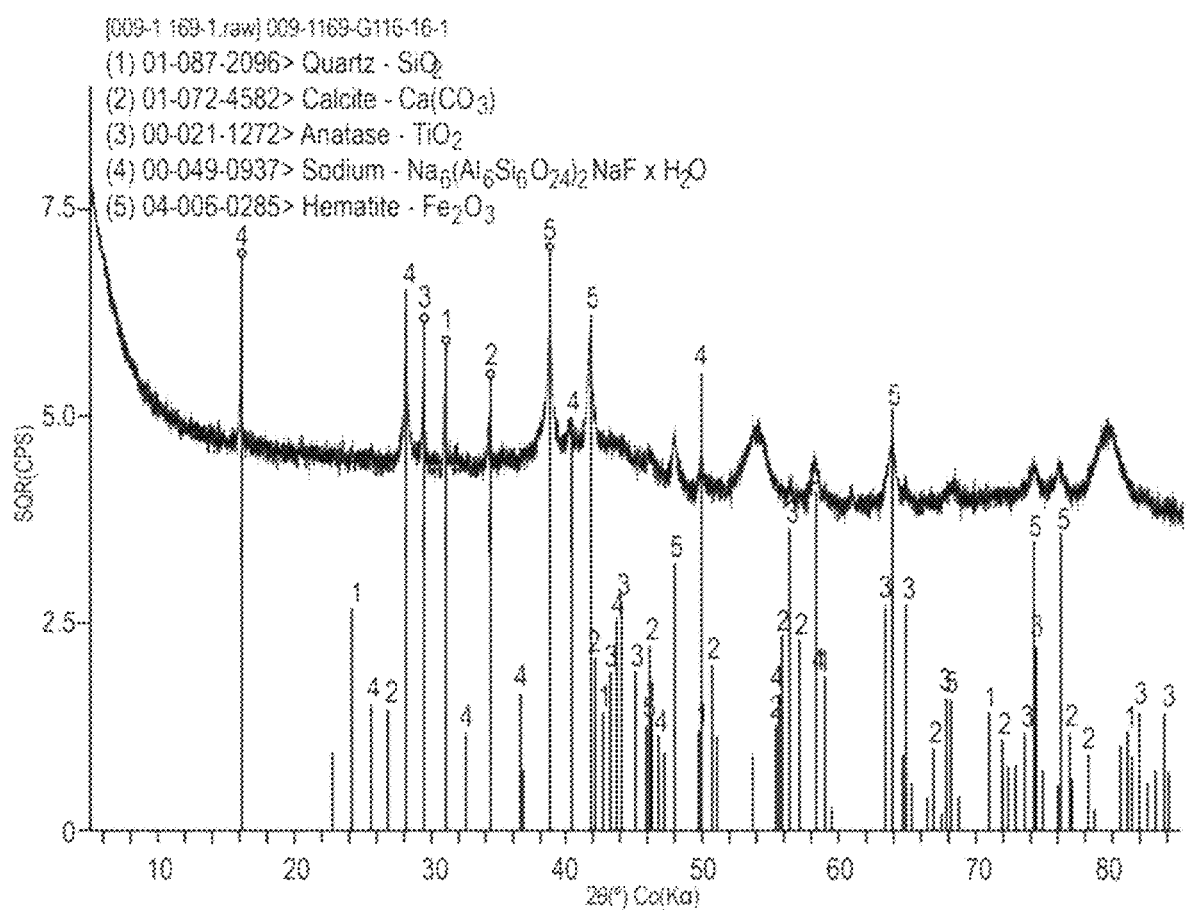
FIG. 53 depicts from Example 5 X-ray diffraction of attrition-resistant red mud catalyst.

The attrition test showed that after 72 hours fluidization using air at 25 l/min., there was only 1.55% loss of material as fines below 180 μm. This clearly showed that the material could be used as a suitable fluidization catalyst without loss of material. The BET surface area of the ARRM was 120 $m^2/g$, which was much higher than the 30-60 $m^2/g$ for the original red mud material. The large increase in the surface area of the ARRM was attributed to the colloidal alumina, which had 0.05 μm particle size and constituted about 50 wt % of the ARRM. The composition of the ARRM catalyst is shown in Table 19 and FIG. 53.

This material had a higher amount of aluminum compared to the original red mud because of the colloidal alumina used as a binder. The attrition resistance measurement was carried out in the fluidized bed reactor at room temperature for 24 hours and the fines generated were measured. The amount of fines generated was 1.55 wt %. Pyrolysis experiments conducted using this material showed that after 24 regenerations, the loss of material was less than 10 wt %. Thus, the ARRM needed very little makeup catalyst.

Figure 54:
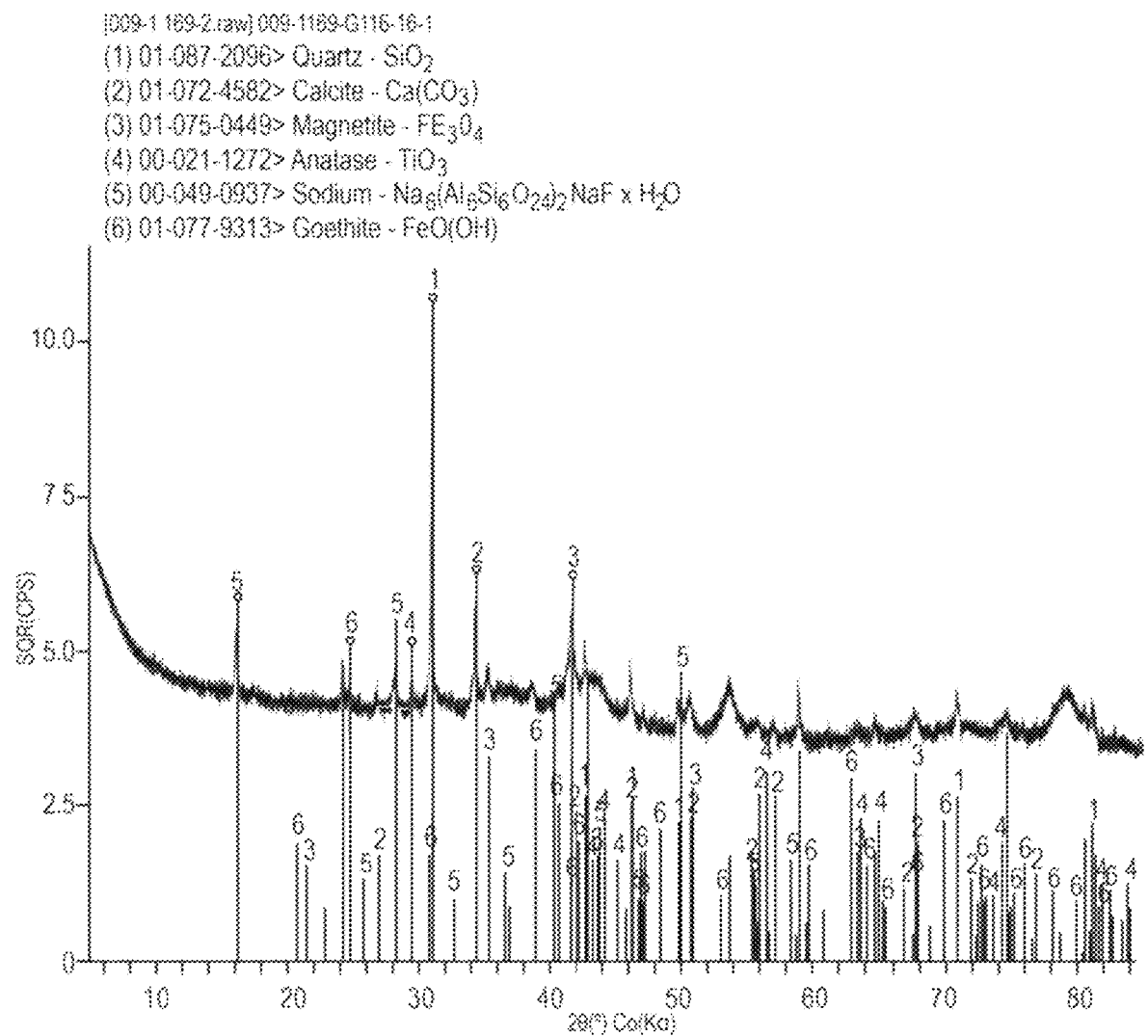
FIG. 54 depicts from Example 5 XRF spectrum of regenerated attrition-resistant red mud catalyst.

The composition of the ARRM catalyst after pyrolysis and regeneration is shown in Table 20 and FIG. 54. The analysis showed relative increases in the sulfur, zinc, potassium, and calcium contents while the iron content was unchanged, but there was a decrease in the aluminum content. The decrease in the aluminum content was probably due to the attrition and loss of some colloidal alumina over time of usage. On the other hand, the increase in the sulfur and zinc contents, which were 400% and $4\times10^4$% respectively, was due to the adsorption of these compounds from the tire crumbs onto the catalyst surface during the pyrolysis process. The elemental mass balance on sulfur showed that about 49% of the original sulfur in the TC was retained by the ARRM. Potassium and calcium contents of the ARRM also increased probably because this catalyst was also used in the pyrolysis of biomass, which contains both calcium and potassium. In the case of calcium the increase was about 650%, whereas for potassium the increase was $2\times10^4$%. The adsorption of these elements on the ARRM could be during the pyrolysis process or the regeneration process. During the regeneration, the char carbon is burnt off and exposes the ash, which could then be adsorbed onto the catalysts. The activity of the catalyst was not influenced by the adsorption of these elements onto the ARRM.

TABLE 20

Qualitative/Semi-Quantitative X-Ray Fluorescence Scan
SAMPLE NUMBER: G116/16-2
SAMPLE IDENTIFICATION: USED

| Element | wt. % | Element | wt. % | Element | wt. % |
|---|---|---|---|---|---|
| Silver | <0.003 | Hafnium | <0.005 | Rhodium | <0.003 |
| Aluminum | 14 | Mercury | <0.003 | Ruthenium | <0.003 |
| Arsenic | <0.002 | Holmium | <0.004 | Sulfur | 0.2 |
| Gold | <0.004 | Iodine | <0.01 | Antimony | <0.005 |
| Barium | <0.01 | Indium | <0.004 | Scandium | <0.002 |
| Bismuth | <0.002 | Iridium | <0.004 | Selenium | <0.001 |
| Bromine | 0.01 | Potassium | 2 | Sillicon | 5 |
| Calcium | 6 | Lanthanum | <0.007 | Samarium | <0.006 |
| Cadmium | <0.003 | Magnesium | 0.6 | Tin | <0.004 |
| Cerium | <0.01 | Maganese | 0.07 | Strontium | 0.02 |

TABLE 20-continued

Qualitative/Semi-Quantitative X-Ray Fluorescence Scan
SAMPLE NUMBER: G116/16-2
SAMPLE IDENTIFICATION: USED

| Element | wt. % | Element | wt. % | Element | wt. % |
|---|---|---|---|---|---|
| Chlorine | 0.1 | Molybdenum | <0.001 | Tantalum | <0.004 |
| Cobalt | <0.003 | Sodium | 0.8 | Terbium | <0.01 |
| Chromium | 0.03 | Niobium | <0.0008 | Tellurium | <.008 |
| Cesium | <0.01 | Neodymium | <0.008 | Thorium | <.003 |
| Copper | 0.04 | Nickel | 0.004 | Titanium | 1 |
| Dysprosium | <0.01 | Phosphorus | 0.4 | Thallium | <0.003 |
| Erbium | <0.003 | Lead | 0.04 | Uranium | <0.002 |
| Europium | <0.009 | Palladium | <0.003 | Vanadium | <0.004 |
| Iron | 11 | Praseodymium | <0.006 | Tungsten | <0.005 |
| Gallium | 0.003 | Platinum | <0.003 | Yttrium | 0.001 |
| Gadolinium | <0.005 | Rubidium | <0.003 | Ytterbium | <0.006 |
| Germanium | <0.0009 | Rhenium | <0.05 | Zinc | 2 |
|  |  |  |  | Zirconium | 0.2 |

Tire Crumb Pyrolysis Products and Liquid Product Properties

The pyrolysis of the TC was relatively easy because it was easily fed into the fluidized bed reactor. There was very little blockage of the feeding tube because there appeared to be no melting at the interface of the catalysts and TC. During the pyrolysis process, the vapor products were condensed using an electrostatic precipitator (ESP) and ethylene glycol-cooled condensers. The ESP was not effective in condensing the hydrocarbon products, apparently because it contained no moisture and the gases and vapors were not easily ionized and therefore difficult to condense using this method. The most effective method for condensing the vapors was using a coalescing filter in series with the condensers instead of the ESP.

The TC pyrolysis products and properties are shown in Table 21 and Table 22. The oil yield of 40 wt % is lower than that obtained for most woody and herbaceous biomass feedstocks. The oil had a strong smell of burnt tire and had neutral pH, and the density was 0.91 g/cm$^3$. However, unlike biomass pyrolysis oils that contain high oxygen content as well as high moisture content, both oxygen and water contents of the TC pyrolysis oils were very low. There was hardly any water in the oil and the oxygen content was less than 1 wt % (Table 22). The viscosity of the liquid product was relatively lower than that obtained for woody biomass pyrolysis products.

TABLE 21

Pyrolysis products distribution and properties of liquid products.

| Products | TC Pyrolysis Yield (wt %) | TC pyrolysis oil hydrogenation yield (wt %) |
|---|---|---|
| Liquid | 39.9 | 84.5 (9.5% water, 75% organic) |
| Char | 38.7 | 5.4 |
| Gas | 18.0 | 10.3 |
| Hydrogen consumption | na | 0.022 g/g oil |
| Liquid product properties | | |
| Viscosity@40° C. (cP) | 8.5 | 2.0 |
| Density (g/cm$^3$) | 0.91 | 0.82 |
| pH | 7 | 7 |

TABLE 22

Characteristics of catalytic tire crumb and liquid pyrolysis oils.

| | Tire crumb | Pyrolysis char | Pyrolysis oil | Hydrotreated pyrolysis oil |
|---|---|---|---|---|
| C (wt %) | 79.31 | 79.21 | 87.42 | 87.59 |
| H (wt %) | 7.45 | 1.41 | 10.40 | 11.73 |
| N (wt %) | 0.55 | 0.31 | 1.41 | 0.61 |
| S (wt %) | 2.23 | 2.61 | 0.38 | 0.00 |
| O (wt %) | 3.56* | nd | 0.38 | 0.08 |
| Ash (wt %) | 6.9 | 22 | nd | nd |

| TGA-simulated distillation of liquid products | | | | |
|---|---|---|---|---|
| Distillation cuts | 40-80° C. cut (wt %) | 80-180° C. cut (wt %) | 180-350° C. cut (wt %) | 350+ ° C. cut (wt %) |
| Pyrolysis oil | 10 | 35 | 55 | <1 |
| Hydrotreated pyrolysis oil | 15 | 45 | 40 | <1 |

Oxygen by difference;
nd = not detected

The elemental composition of the oil showed very low sulfur content of 0.38 wt %, which is much lower than the 1 wt % to 1.5 wt % reported in published literature. The lower sulfur content was attributed to the retention on the TC char and the catalyst. The oil had a very high hydrocarbon content as expected and very low oxygen content. The nitrogen content of the oil was relatively high because it appears the nitrogenous (nylon fiber origin) compounds, which are usually basic, were not removed by the catalyst because the catalyst was also basic, and only a small amount was retained by the TC char (Table 22). The TGA-simulated distillation shows a relatively low amount of light fraction and over 50% in the light gas oil fraction, which may require some further cracking for some vehicular applications.

Figure 55:
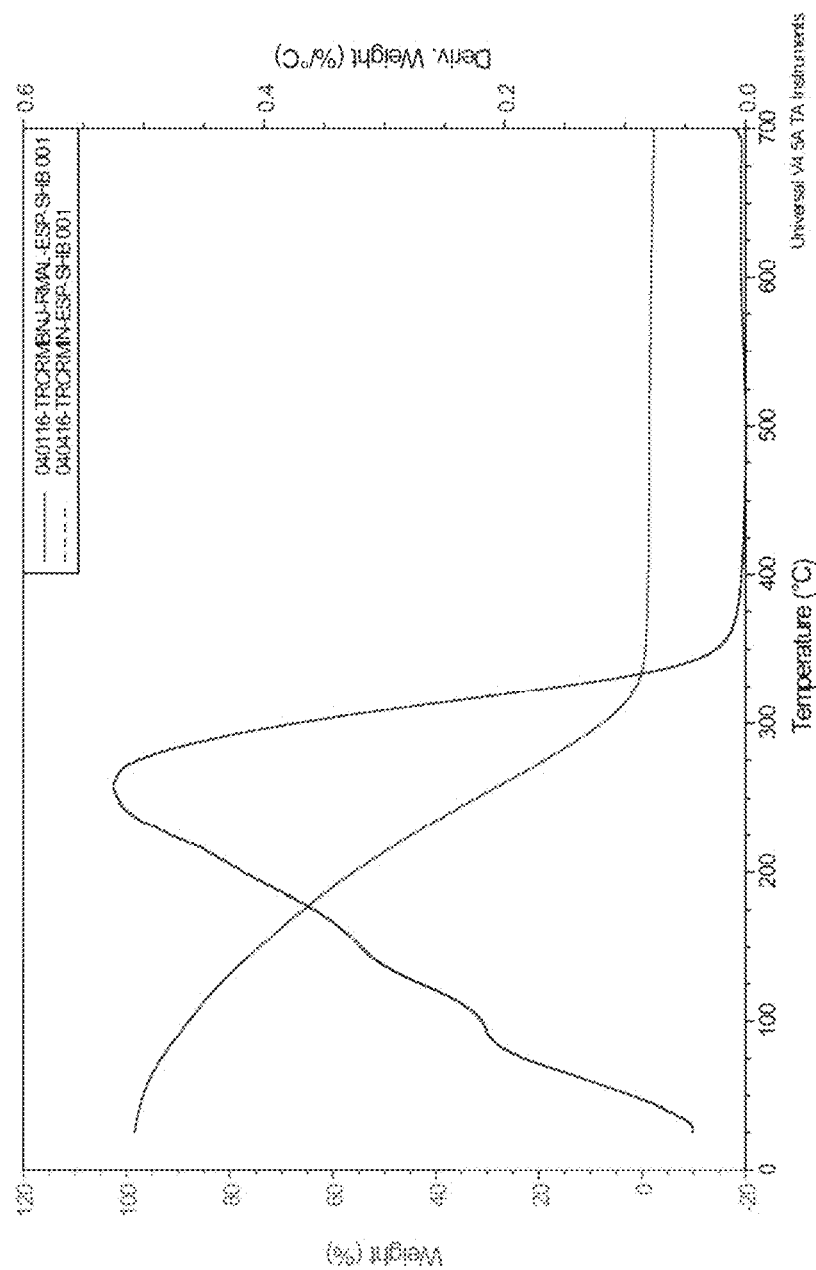
FIG. 55 depicts from Example 5 thermogram of India and New Jersey tire samples red mud pyrolysis oils.

The TGA analysis of the TC pyrolysis oils also showed that the rate of weight loss under nitrogen atmosphere was similar to tire samples obtained from India and New Jersey (FIG. 55). Thus, it appears the process was independent of the source of feedstock. This is very important because tires obtained from different suppliers normally have differences in their formulation.

Hydrotreatment of the TC Pyrolysis Oils

Figure 56:
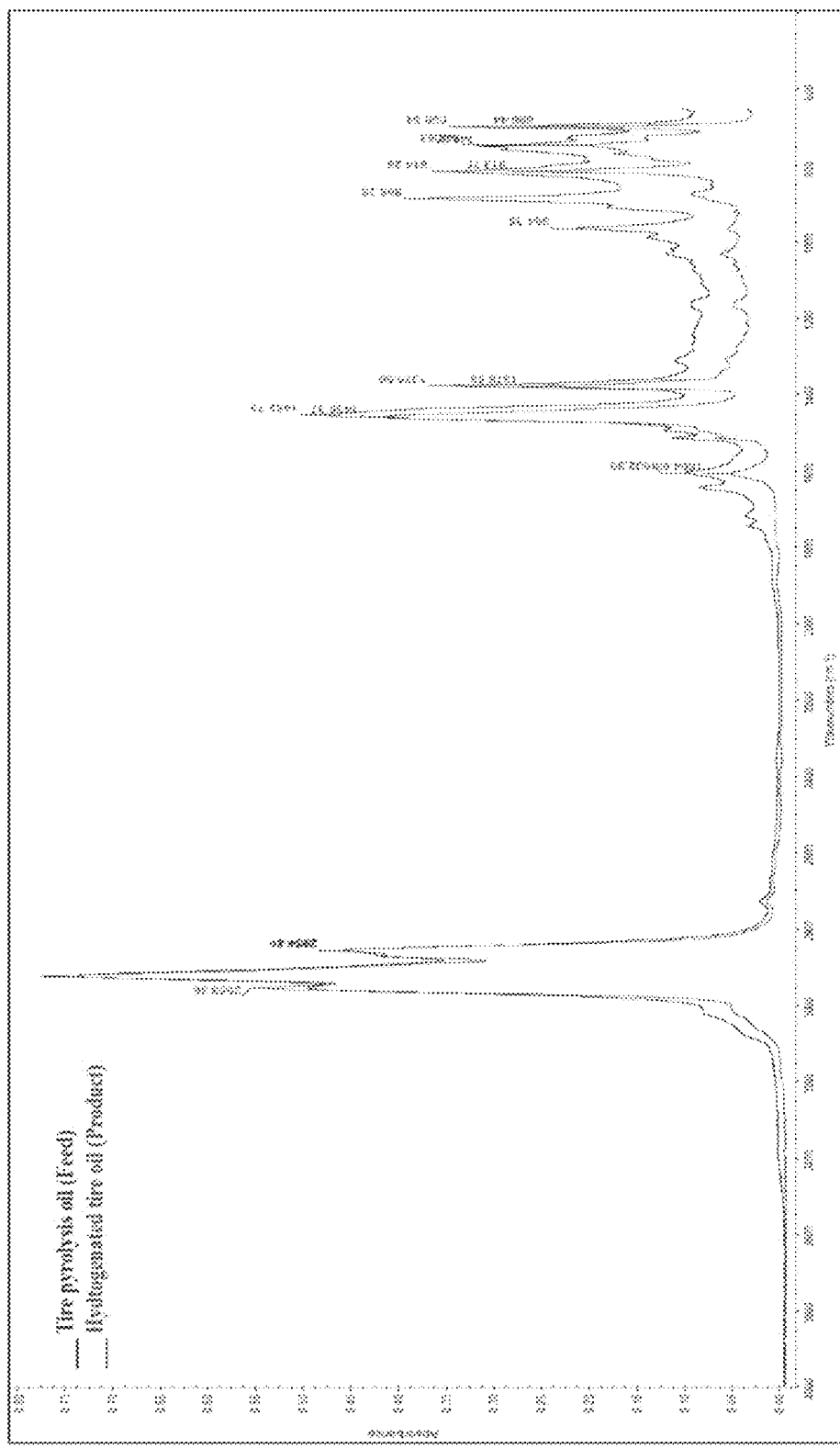
FIG. 56 depicts FT-IR spectra of raw and hydrotreated tire crumb (TC) pyrolysis oil from Example 5.

The hydrotreatment of the TC pyrolysis oils using commercial nickel on silica alumina catalysts showed that the oil could be easily hydrogenated at 400° C. with over 75 wt % yield of organic fraction and 9.5 wt % water. The hydrogen consumption was 0.022 g/g TC pyrolysis oil. The viscosity and density of the products were in the diesel fuel range (Table 20). Additionally, the sulfur content of the product using our elemental analyzer showed that all the sulfur had been removed after hydrotreatment, probably because of the conversion of the sulfur to hydrogen sulfide. The TGA-simulated distillation data showed that the diesel cut decreased, while the gasoline cut increased after the hydrotreatment (Table 21). FIG. 56 shows the FT-IR spectra of TC pyrolysis oil and hydrotreated oil. Clearly, the hydrotreatment deoxygenated the TC pyrolysis as shown by the reduction in peak intensities between 1700 and 1800 cm$^{-1}$ due to carbonyl and carboxylic compounds. The strong $CH_2$ and $CH_3$ peaks at 2800 to 3000 cm$^{-1}$ and 1456 cm$^{-1}$ confirm the presence of long-chain hydrocarbons in the TC pyrolysis oils after hydrotreatment. The aromatic content was relatively low as shown by the low intensity peak at 1604 cm-1.

TC Char Product

The char yield was very high as expected because of the high carbon black content of the TC. The ash content of the TC was relatively low (6.9 wt %) and so did not contribute as much to the high char yield. The elemental analysis of the TC char (Table 21) showed similar carbon content as the raw material, but hydrogen content was much lower and the ash content was 22 wt %. The high ash content was probably because some residual red mud was left with the char. The nitrogen content was relatively low because a large fraction of nitrogen was in the oil and not much was retained by the char. The sulfur content however was relatively high, constituting about 51 wt % of the sulfur in the raw material, because the zinc oxide in the tire tends to react with the sulfur forming zinc sulfide which was retained in the char.

The TC char was separated from the red mud catalyst using the magnetic separator. The sample was sieved and the coarse fraction was activated with steam while the fine fraction was evaluated for plant bioavailability. FIG. 57 shows that after a one-week incubation the bioavailable nutrients such as zinc, potassium, and magnesium increased in the two types of soils. Zinc in particular showed almost a hundred-fold increase in bioavailable micronutrient. Potassium and magnesium bioavailable nutrients doubled over the control sample, which had no TC char. It is also interesting to note that the addition of TC char to both soils reduced the Cu content significantly. It appears that there was a reaction between the TC char that tied up the bioavailable Cu in the soil.

TC Char-Activated Carbon

The coarse fraction of the biochar was activated with steam for about two hours at 850° C. The burnoff of the TC char was about 46%, and the BET-specific surface area of the activated char was 700 m$^2$/g. This was slightly lower than commercial activated carbon that has a specific surface area 800 m$^2$/g. The lower surface area of the TC char was attributed to the high ash content. There were indications that the ash (22 wt %) could be reduced further, and therefore the BET surface area of the activated carbon could be improved and be comparable to what is on the market.

Gas Production

The gas yield was also relatively high compared to published literature probably because of the difficulty in the condensation of the vapor products (Table 21). The gas composition is shown in Table 23 for several runs using several different sources of TC. In all cases, it can be clearly seen that the dominant combustible gases were hydrogen, pentane, methane, and butane, which constituted more than 70 vol % of the total gases produced. The non-combustible gas was mostly carbon dioxide. Potentially, the gaseous products could be used either for combustion to provide energy for the pyrolysis process or to hydrogenate the TC pyrolysis oils to improve on its properties and reduce the sulfur content.

TABLE 23

Composition of TC pyrolysis gases from different feedstocks.

|  | New Jersey Mar. 29, 2016 | New Jersey Apr. 1, 2016 | India Apr. 4, 2016 | P. Rico Apr. 7, 2016 | Mixture Apr. 19, 2016-PP* |
|---|---|---|---|---|---|
| $CH_4$ | 5.8 | 6.3 | 6.9 | 5.7 | 8.5 |
| CO | 4.6 | 4.2 | 4.3 | 4.9 | 3.2 |
| $CO_2$ | 22.0 | 18.0 | 19.6 | 20.5 | 7.5 |
| ETHYLENE | 1.3 | 1.4 | 1.7 | 1.6 | 3.4 |

TABLE 23-continued

Composition of TC pyrolysis gases from different feedstocks.

|  | New Jersey Mar. 29, 2016 | New Jersey Apr. 1, 2016 | India Apr. 4, 2016 | P. Rico Apr. 7, 2016 | Mixture Apr. 19, 2016-PP* |
|---|---|---|---|---|---|
| ETHANE | 1.0 | 1.3 | 1.5 | 1.3 | 2.4 |
| PROPYLENE | 0.6 | 0.8 | 1.2 | 1.1 | 3.4 |
| PROPANE | 1.6 | 1.7 | 3.0 | 0.6 | 1.5 |
| BUTENE | 9.5 | 13.9 | 15.9 | 22.7 | 13.7 |
| PENTANE | 18.8 | 22.3 | 29.0 | 21.9 | 20.9 |
| $H_2$ | 34.8 | 30.2 | 17.0 | 19.7 | 35.5 |
|  | 100.0 | 100.0 | 100.0 | 100.0 | 100.0 |

PP* is a scale-up studies on a pilot plant.

Example 6—Aqueous Phase Synthesis of Hydrocarbons from Low Molecular Weight Biomass Pyrolysis Oxygenates Catalytic pyrolysis of lignocellulosic biomass generates water soluble low molecular weight oxygenates such as acetic acid, acetone, furfural, butanone, guaiacol, phenol etc. These components are usually not suitable for conventional hydrocarbon fuel application. The example catalyst below simultaneously catalyzes addition, hydrodeoxygenation, and hydrogenation of these small oxygenate molecules in an aqueous medium to produce $C_6$ to $C_{15}$ hydrocarbons in a one-pot synthesis. These hydrocarbons consist of branched and straight chain alkanes as well as alkylated aromatics. In this synthesis, acetic acid, furfural, and butanone react to produce straight and branched chain alkanes. These compounds also react with guaiacol to produce alkylated aromatics, cycloalkanes, and straight and branched chain alkanes and branched chain alkenes.

Methods and Materials

The selection of model compounds for this research was based on the analysis of the aqueous phase red mud catalytic pyrolysis liquid as described in Example 3. The major compounds detected in this liquid were used for the model compounds studies to elucidate the reactions that occur during the hydrotreating of the aqueous phase liquids reported elsewhere. The liquid was obtained from the red mud catalytic pyrolysis of pinyon juniper wood. The model compounds used for these studies were obtained from various chemical vendors and were used as received without any further purification. The compounds included acetic acid (EMD Millipore, Billareca, Md.), guaiacol, anisole, 2,3 butanedione, 3-hydroxy-2-butanone (Alfa Aesar), acetaldehyde, phenol, benzene, furfural, furan, methyl furan (Sigma-Aldrich, St. Louis, Mo., USA), acetone, hydroxyacetone, ethanol, toluene, methanol (Pharmco-Aaper). Various standards were also obtained from these companies for product identification and quantification.

Nickel/red mud (Ni/RM) catalyst was prepared using the wet-impregnation procedure described in Example 1 [1,2]. The catalysts were prepared at 20-40 wt % nickel loading. BET, ICP, and SEM analysis of the produced catalyst was carried out as described in Example 1.

All aqueous phase hydrodeoxygenation (AQHDO) experiments were conducted in a Parr Series 4560 300 mL autoclave reactor (Parr Instruments, Moline, Ill., USA). This reactor had a variable speed magnetic drive and turbine agitator. A pressure gauge was used to measure the total pressure inside the reactor. A K-thermocouple immersed in the reactor was used to measure the reactant temperature.

The reaction temperature was maintained at its desired value with an accuracy of ±1° C. The setup had an electrically heated jacket to ensure isothermal conditions. The temperature and speed of agitation were controlled by a Parr 4848 controller.

In each experiment, the reactor was charged with reactant (85 g) and catalyst (4.5 g). The reactant consisted of 15 wt % organic fraction. Thus, for a single compound 15 g of material was added to the water and 4.5 g catalyst was added. It was assumed that the water was only a reaction medium. If two compounds were under investigation, then 7.5 g of each compound was dissolved in the water. If three compounds were being investigated, then 5 g of each compound was added to the deionized water to make 15 wt %. The reactor was purged with $N_2$ to ensure an inert atmosphere. The reactor was then charged with high purity hydrogen supplied from a reservoir tank to the desired pressures of 4.83, 5.52, or 6.21 MPa (700, 800, or 900 psi) via a pressure regulator. A gas sample was taken from a gas release valve from the gas sampling port for gas analysis when the reactor was at room temperature. The reactor was then heated to a reaction temperature (300, 350, or 400° C.) at a heating rate of 15° C./min. The reaction time was recorded when the set temperature was reached. After the desired reaction time (30 minutes), the reactor was cooled to room temperature using the internal cooling coil. A gas sample was collected in a tedlar bag for gas analysis when the reactor was cooled to room temperature. The reproducibility of experiments was checked and the error in all experimental measurements was found to be less than 3%.

Another set of experiments was carried out on the reduced red mud (RRM) which did not contain any nickel to determine the effect on the reactants. The reaction conditions were identical to those for the Ni/RM.

In a blank experiment (without catalyst) 30 g of guaiacol was charged into the reactor, and the reactor was pressurized to 6.2 MPa (900 psi) with hydrogen and allowed to react for 30 minutes at 400° C. to determine if the reactor walls played any role in the observed reactions. All experiments were conducted in triplicate. The blank experiment showed no reactivity of the reactor walls. All results reported were therefore assumed to have no reactor wall influence.

Analysis of AQHDO Products

Hydrogen consumption, gas analysis, and product yields were determined as described in previous work [12]. The liquid products of AQHDO experiments were analyzed by HPLC (Shimadzu Scientific, Columbia, Md., USA) using a RID-10A detector and a Kromasil 100-5-C18 column (AkzoNobel Amsterdam, Netherlands). The HPLC was equipped with an LC-10AT pump, SCL-10Avp controller, and SIL-10A autosampler. CLASS-VP 7.3 SP1 software was used to analyze HPLC chromatograms. A CTO-10A column oven was used to maintain the column temperature at 55° C. during the analysis. The injection volume was 0.25 µl and acetonitrile at flow rate of 0.6 ml/min. was used as the mobile phase. Data acquisition time was 60 minutes for all analyses.

The liquid samples were analyzed for guaiacol, anisole, catechol, phenol, cyclohexane, hexane, benzene, toluene, xylene, ethylbenzene, isopropylbenzene, furan, methyl furan, tetrahydrofuran, tetrahydromethyl furan, 3-methyl octane, 2-methyl heptane, and butylbenzene. To quantify the amount of each compound, five solutions of 20, 40, 60, 80, and 100 wt % of each compound were prepared and injected to the HPLC system, and peak area vs. concentration were plotted to obtain the calibration curve of the compounds.

The identity of the synthesized compounds were confirmed by Gc/MS, NMR (1H and 13C), FTIR, and CHNOS analyses.

The elemental composition of AQHDO products were determined using Thermo Fisher Scientific Flash 2000 organic elemental analyzer (Thermo Fisher Scientific, Inc., Waltham, Mass., USA), and the oxygen content was calculated by difference according to ASTM D5291. The higher heating value (HHV) of the products were determined using a bomb calorimeter (IK Works, Wilmington, N.C., USA).

Results

The AQHDO results were grouped according to the main substrates investigated such as acetic acid, furfural, 2-butanedione, and guaiacol. AQHDO of individual compounds on red mud supported nickel (Ni/RM) and reduced red mud (RRM) are reported below.

Neat and Aqueous Acetic Acid HDO on Ni/RM and RRM

The 15 wt % acetic acid water solution was hydrotreated on Ni/RM without any other compound as a baseline for comparison, and it was also investigated without water addition (neat). When the aqueous acetic acid was hydrotreated, several hydrodeoxygenation and partial reduction compounds were produced in both the liquid and gaseous phases. The liquid products were ethanol, propanol, acetaldehyde, ethyl acetate, and acetone, which are reduction products of acetic acid and cross reactions of the reaction products. The ethyl acetate derived from the reaction of acetic acid with ethanol and the propanol from the hydrogenation of acetone. The most interesting aspect of the aqueous phase acetic acid AQHDO was the formation of acetone, which was not reported by other researchers using the nickel catalyst. The acetone was formed by the reaction of two acetic acid molecules in ketonization reaction shown in equation (11) below.

$$CH_3COOH+CH_3COOH=CH_3COCH_3+H_2O+CO_2 \quad (11)$$

When aqueous acetic acid was treated under similar conditions using RRM, only acetone was produced, clearly showing that RRM promoted the ketonization reaction, which is in agreement with Yathavan and Agblevor [13] who observed production of high levels of ketones in the biomass pyrolysis products. The acetic acid reduction products were catalyzed by the Ni element, while the oxides in the red mud promoted the ketonization reaction.

When the acetic acid HDO was run in the neat form, there was rapid deactivation of the catalyst and a large amount of coke and gases were formed. The liquid products yield was very low, but the composition of the liquid products was similar to that of the aqueous acetic acid HDO.

The cokes formed on the catalyst surface from both the aqueous acetic acid and neat acetic acid HDO were examined with a thermogravimetric analyzer (TGA) in nitrogen and air atmospheres. When nitrogen was used for the TGA, no weight loss was detected, showing that no volatile compounds were left on the catalyst and only coke was present. However, when air was used on the recovered catalyst, the aqueous acetic acid AQHDO coke produced only one weight loss peak at 289° C. In the case of neat acetic acid HDO coke, three weight loss peaks were observed. The first peak corresponded with the peak produced in aqueous acetic acid, but the three other weight loss peaks occurred at higher temperatures of 350, 390 and 486° C. The occurrence of the two extra peaks at higher temperatures suggested that there was further deoxygenation of the initial coke formed resulting in a coke with less $H_2$ and $O_2$ contents.

The gaseous products analyzed using microGC were dominated by methane and ethane, which were due to methanation of $CO_2$ and CO as well as cracking of other low molecular weight hydrocarbon components.

Aqueous Phase Furfural HDO on Ni/RM and RRM

The AQHDO of furfural was conducted in a similar manner as the acetic acid. On the Ni/RM, the products detected in the liquid products were tetrahydrofuran (THF), methyl tetrahydrofuran (MeTHF), furan, methylfuran, and hexane. These products were clearly partial hydrogenation, hydrodeoxygenation and ring opening products. In addition to these products, there were also gaseous products dominated by methane and butane. When aqueous furfural was run on the RRM, there were no products, clearly confirming that the products detected were due to the nickel hydrodeoxygenation and not much contribution from the support as was the case of the acetic acid.

Aqueous Phase Guaiacol HDO on Ni/RM and RRM

The AQHDO of the guaiacol on Ni/RM using similar conditions as the acetic acid and furfural showed the occurrence of partial hydrogenation, ring saturation, and hydrodeoxygenation reactions. Thus the products detected in the liquid phase included: benzene, toluene, xylene, hexane, cyclohexane, methanol, phenol, and anisole. The presence of BTX can be explained in terms of the hydrodeoxygenation of guaiacol promoted by the nickel component of the catalyst, and this was followed by the alkylation of the benzene ring by the methyl group resulting in the formation of toluene and xylenes. The cyclohexane was formed by the hydrogenation of the benzene ring catalyzed by Ni. The detection of hexane was attributed to the ring opening of cyclohexane also catalyzed by Ni. Phenol formation was attributed to the demethoxylation of the benzene ring, which produced methanol and phenol. Phenol and methanol were considered partial AQHDO products because only part of the oxygen was removed. Anisole was also produced by the hydrodeoxygenation of the hydroxyl group on the benzene ring. It appears this was the first step in the hydrodeoxygenation of the guaiacol because, as will be shown in the reactions of multiple reactants, anisole is the critical intermediate for the formation of other products. In such cases, BTX and other products were not detected in the liquid phase. Ring saturation and other reactions only occurred after the AQHDO step.

When guaiacol was treated on the RRM, there was no reaction, so it was clear that unlike the acetic acid, the RRM did not have any effect on the formation of the above compounds. The RRM was not capable of either hydrodeoxygenating or saturation of the benzene ring.

The AQHDO of the neat guaiacol produced similar products as the aqueous phase reaction, but unlike the acetic acid, no excess coke was formed on the catalyst surface. Thus, it appears that the acidity of the reactants is important in the deactivation of the catalyst. It could also mean that the guaiacol molecules were too large to enter the pores of the catalyst, and hence less coke was formed on the active catalyst sites.

Aqueous Phase HDO of 2,3-Butanedione on Ni/RM and RRM

The AQHDO of the 2,3-butanedione was similar to those for the other compounds. In this case, the main products were butanol, butanone, and gaseous products like butane, methane and $CO_2$. Butanol and butanone formation were both attributed to the AQHDO on the Ni catalyst because when the 2,3-butanedione was run on RRM, no products were formed, which again confirmed that RRM did not participate in the hydrodeoxygenation of the ketone.

Aqueous Phase HDO of Dual Compounds on Ni/RM and RRM

In these series of studies dual reactants were investigated to assess the interactions between them. Thus, a combination of acetic acid/furfural, acetone/furfural, acetone/methyl furfural, 2,3-butanone/methylfurfural acetic acid/guaiacol, acetone/guaiacol, and 2,3-butanone/guaiacol were investigated using AQHDO.

Aqueous Phase HDO of Acetic Acid/Furfural on Ni/RM and RRM

The AQHDO of the acetic acid/furfural mixture on the Ni/RM catalyst showed very interesting results. The products consisted of hexane, octane, tetrahydrofuran, methyl tetrahydrofuran, and acetone. The production of tetrahydrofuran, methyl tetrahydrofuran and acetone was typical furfural hydrodeoxygenation products as shown in the AQHDO of furfural on Ni/RM. However, what is significant is the near absence of the acetic acid AQHDO products observed when it was run alone and the absence of some of the furfural AQHDO products. In place of the acetic acid AQHDO products, hexane and octane were the major products. The formation of these two products can be explained in terms of new reactions shown below.

$$CH_3COOH + H_2 = CH_3CHO + H_2O \qquad (12)$$

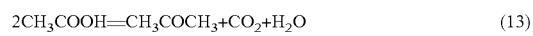
$$2CH_3COOH = CH_3COCH_3 + CO_2 + H_2O \qquad (13)$$

$$C_5H_4O_2 + 2H_2 = C_4H_4O + CH_3OH \qquad (14)$$

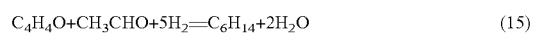
$$C_4H_4O + CH_3CHO + 5H_2 = C_6H_{14} + 2H_2O \qquad (15)$$

$$C_5H_6O + CH_3COCH_3 + 6H_2 = C_8H_{18} + 3H_2O \qquad (16)$$

Products of reactions (12) and (14) are intermediate products formed on the nickel surface, but the products of reactions (13), (15) and (16) were formed on the RM surface. Reaction (13) was already explained in the AQHDO of acetic acid. To verify this hypothesis, pure reactants for reaction (15) (furan and acetaldehyde) were obtained from vendors and reacted on the RRM. The only product obtained was hexane ($C_6H_{14}$), but there was a lot of $H_2$ consumption. The structure of $C_6H_{14}$ was verified by running GC/MS and $^{13}C$ NMR of the sample and comparing it to those of authentic standards.

Similarly, pure reactants of reaction (16) (methylfuran and acetone) were obtained from vendors and reacted on the RRM, and this produced only 2-methylheptane with a lot of hydrogen consumption. The $^{13}C$ NMR of the synthesized 2-methylheptane was in agreement with the published NMR of 2-methylheptane. Thus, it is clear that the RRM was responsible for the addition and hydrodeoxygenation reactions of the intermediates. The role of nickel then was to produce the intermediate reactants which then reacted on the RRM. This also explains why methylfuran and furan were not present in the products. In contrast, it appears the tetrahydrofuran and methyl tetrahydrofuran did not participate in these reactions and were still present in the products. The reaction rate of the AQHDO was probably slower than the formation of THF and Me-THF reactions, so some of the rings were saturated to form these compounds. The acetone for reaction (15) was attributed to the ketonization reaction shown in reaction (11).

Aqueous Phase HDO of Acetic Acid/Guaiacol on Ni/RM and RRM

Guaiacol is also one of the pyrolysis products derived from lignocellulosic biomass, and some fraction is usually found in the aqueous phase of the catalytic pyrolysis products. This compound was co-reacted with acetic acid. As expected, most of the acetic acid AQHDO products were not detected and some of the guaiacol AQHDO products were also absent. The detected AQHDO products of this mixture were more complex than those for the acetic acid/furfural mixture. The products were: methanol ($CH_3OH$), hexane ($C_6H_{14}$), 2-methylheptane ($C_8H_{18}$), ethylbenzene ($C_8H_{10}$), benzene ($C_6H_6$), cyclohexane ($C_6H_{12}$), ethylcyclohexane ($C8H_{16}$), propylbenzene ($C_9H_{12}$), 2-methyloctane ($C_9H_{20}$), propylcyclohexane ($C_9H_{18}$), phenol ($C_6H_5O$) and catechol ($C_6H_6O_2$). Some of these products were expected because of the AQHDO reactions of guaiacol, but what is more interesting is the formation of 2-methyloctane, 2-methylheptane, hexane, ethylbenzene, propylbenzene, and ethylcyclohexane. We hypothesized that these six compounds were produced from the reaction of acetic acid reduction intermediates with guaiacol reduction intermediates. Further we hypothesized that the reaction occurred on the RRM surface similar to what obtained with the acetic/furfural reaction. The proposed reactions are shown below:

$C_7H_8O_2 + H_2 = C_7H_8O + H_2O$      (17) anisole formation $CH_3CHO + C_7H_8O + 2H_2 = C_8H_{10} + CH_3OH + H_2O$
(18) methyl benzene formation $CH_3CHO + C_7H_8O + 6H_2 = C_8H_{18} + CH_3OH + H_2O$
(19) octane formation $C_8H_{10} + 3H_2 = C_8H_{16}$      (20) methylcyclohexane formation $C_8H_{16} + H_2 = C_8H_{18}$      (21) octane formation $CH_3COCH_3 + C_7H_8O + H_2 = C_9H_{12} + CH_3OH + H_2O$
(22) isopropylbenzene (cumene)

$CH_3COCH_3 + C_7H_8O + 7H_2 = C_9H_{20} + CH_3OH + H_2O$
(23) 2-methyl octane formation $CH_3COCH_3 + C_7H_8O + H_2 = C_9H_{18} + H_2O$
(24) isopropyl cyclohexane formation $C_7H_8O + H_2 = C_6H_6 + CH_3OH$      (25) benzene formation $C_6H_6 + 3H_2 = C_6H_{12}$      (26) cyclohexane formation $C_6H_{12} + H_2 = C_6H_{14}$      (27) hexane formation Reactions (12) and (13) were the intermediate products from the reduction and ketonization of acetic acid and reaction (17) was the reduction guaiacol to anisole. These intermediates were responsible for a plethora of reactions and products observed for this process. The two most important reactions of the intermediates were reactions (18) and (22). These reactions occurred on the RM and then the subsequent reactions occurred on the nickel surface. As a proof of this hypothesis, these two reactions were carried out using pure reactants on RRM under similar conditions as the Ni/RM. As expected in each case methanol and hydrocarbons were the only products with no gas production. In both reactions (18) and (22) there were hydrodeoxygenation and alkylation of the benzene ring producing methyl benzene and isopropylbenzene (cumene) with loss of water and methanol. The conversion was 100% and the reaction was stoichiometric with stoichiometric yields of methanol, ethylbenzene, and isopropylbenzene. None of the other hydrocarbon products in reactions (19), (20), (21), (23), (24), (25), (26), (27) that were detected in Ni/RM were found in these products.

The authentication of ethylbenzene and isopropylbenzene products was verified by running GC/MS, $^{13}C$ NMR, FTIR and CHNOS analysis of the products and comparing them with authentic products obtained from vendors. In the case of the Ni/RM products, these were a complex mixture, but FTIR and CHNOS analysis revealed that they were mostly hydrocarbon products.

Again reactions (18) and (22) demonstrated alkyl addition and hydrodeoxygenation (AQHDO) of the low molecular weight oxygenated compounds to produce hydrocarbons of increased carbon chain length.

The formation of $C_8CH_{18}$ (2-methylheptane), $C_9H_{20}$ (3-methyloctane) and all the other hydrocarbons required ring saturation and ring opening, and did not occur on RRM. The reactions (19), (20), (21), (23), (24), (25), (26), (27) occurred because of ring saturation and ring opening of the initial products in reactions (18) and (22). It is interesting to note that the only carbon lost in reactions (18) and (22) was the methoxyl carbon, which resulted in the methanol formation. All other carbon atoms were conserved in these reactions.

Gaseous products were also formed in the case of the Ni/RM. These products were dominated by methane, ethane, and propane, which derived from the methanation of $CO_2$ and cracking of some of the hydrocarbon products.

Aqueous Phase HDO of Acetone/Furfural and Acetone/Guaiacol on Ni/RM and RM

Acetone is one of the soluble oxygenates found in the biomass pyrolysis aqueous phase products, and it is also an intermediate in the AQHDO of acetic acid. The reactions of acetone with furfural and guaiacol were investigated under similar AQHDO conditions as those described above to support the proposed pathways for the acetic acid reactions with furfural and guaiacol.

In the case of acetone/furfural AQHDO on Ni/RM the only liquid hydrocarbon formed was 2-methylheptane (octane). The other liquid products were THF, Me-THF, and furan. When the reaction was conducted on RRM, there were no products either in the liquid or gas phases. Since no methylfuran was detected in this product it was hypothesized that the octane was produced from the reaction of methylfuran with acetone. This hypothesis was proved by conducting AQHDO on RM using pure methylfuran and acetone. The only product of this reaction was octane, which was identified with HPLC, $^{13}C$ NMR, FTIR, and CHNOS analyses (see Table 24). The reaction was stoichiometric with 100% conversion and stoichiometric yield of octane. It is interesting to note that in this case, there was ring saturation and opening of the methylfuran product on the RRM, unlike the case of guaiacol products where there was neither ring saturation nor ring opening. Unlike the acetaldehyde, acetone did not react with the furan. This observation was true for other ketones investigated.

$CH_3OCH_3 + C_5H_6O + 5H_2 = C_8H_{18} + 2H_2O$      (28)

The 2-methylheptane (octane) formation can also be attributed to the addition of acetone to an ether (methylfuran) and elimination of water through hydrodeoxygenation reaction, which also occurred on the RM. The production of THF, Me-THF, and furan were attributed to HDO of the furfural on nickel. The furan was converted to THF through ring saturation, and the Me-THF was produced from the saturation of the methylfuran ring. It appears that the reaction of methylfuran with acetone was slower than the ring saturation reaction, and thus some of the methylfuran formed initially was converted to Me-THF. Significant amounts of butane were detected in the gaseous products because of the ring opening and further hydrogenation of THF on the nickel. Further investigation of the reaction with furan showed that acetone did not react with this compound despite the fact that it is also a cyclic ether.

The AQHDO of acetone with guaiacol was conducted under similar conditions as those reported for the acetone/furfural. This reaction produced a complex mixture of both aliphatic, aromatic, and alkylated aromatics. The major products detected were: 2-methyloctane, isopropylbenzene, propylcyclohexane, benzene, cyclohexane, hexane, methanol, phenol, and catechol. When the same AQHDO was conducted on the RRM using guaiacol and acetone there was no reaction. However, when anisole, a reduction intermediate of guaiacol, was investigated with acetone, it produced methanol and isopropylbenzene and no other products. The conversion was 100% and the yields of products were stoichiometric. It was hypothesized that the most important reaction was the acetone addition hydrodeoxygenation of anisole to form isopropylbenzene on the RRM, which then underwent further reactions on the nickel to form other hydrocarbons. The isopropylbenzene was identified using methods described above. The reaction pathways for this process are similar to those described for acetic acid/guaiacol in equations (22) to (27), since in that process acetone was produced which underwent similar reactions producing the same products.

It is noteworthy that the benzene ring was neither saturated nor opened on the RRM. The proposed pathways for the observed reactions was probably the initial HDO of the guaiacol to anisole on the nickel surface which then reacted with acetone on the RRM to form isopropylbenzene. The isopropylbenzene competed with other parallel reactions, which produced other products. Once the isopropylbenzene was produced, it underwent ring saturation and ring opening reactions on the nickel sites producing 2-methyloctane, which reduced the yield of the isopropylbenzene in the mixture compared to when it was run on the RRM without any nickel present. The ring saturation reaction produced propylcyclopentane. The parallel reactions also produced benzene, cyclohexane, and hexane.

Aqueous Phase HDO of 2,3-Butanedione/Furfural and 2,3 Butanedione/Anisole on Ni/RM and RM 2,3-butanedione is one of the compounds found in the catalytic pyrolysis products of lignocellulosic biomass, so it was also investigated to ascertain if it produced any hydrocarbons. The AQHDO was performed as described for butanedione/furfural and butanedione/anisole combinations.

The butanedione/furfural AQHDO on Ni/RM produced only two liquid compounds, 3-methyloctane and furan. It appeared that the HDO converted the furfural to furan and methylfuran on the nickel while the butanedione was converted to butanone. The butanone, which behaves like other ketones such as acetone, reacted only with methylfuran and not furan. Thus, in this process, the butanone reacted with the methylfuran to produce 3-methyloctane ($C_9H_{20}$) and the furan was left unreacted.

When the 2,3-butanedione was reacted with methylfuran on Ni/RM the products were 3-methyloctane, furan, and THF. It is therefore clear that the active reactant was the methylfuran and not the furfural itself. Thus, if the furfural cannot be reduced to methylfuran, the production of the aliphatic hydrocarbon may not occur. The presence of nickel in the catalyst is very important for the effectiveness of this process.

$$C_4H_6O_2 + 2H_2 = C_4H_8O + H_2O \quad (29)$$

$$C_4H_8O + C_5H_6O + 4H_2 = C_9H_{20} + H_2O \quad (30)$$

The AQHDO of butanedione/anisole produced four liquid products: butylbenzene ($C_{10}H_{14}$), 3-methylnonane ($C_{10}H_{22}$), benzene, cyclohexane, and methanol. The methanol was obviously produced from the hydrodeoxygenation of the methoxyl group on the benzene ring while butylbenzene was the addition product of butanone and anisole. The 3-methylnonane was produced from the saturation and ring opening of butylbenzene. Cyclohexane was produced from the saturation of the benzene ring, and the benzene was produced from the hydrodeoxygenation of the anisole. The proposed reaction pathways are shown below.

$$C_4H_6O_2 + 2H_2 = C_4H_8O + H_2O \quad (31)$$

$$C_7H_8O + C_4H_8O = C_{10}H_{14} + CH_3O + H_2O \quad (32)$$

$$C_{10}H_{14} + 4H_2 = C_{10}H_{22} \quad (33)$$

Aqueous phase HDO of furfural/acetic acid/guaiacol/acetone/2,3-butanedione

The AQHDO of the four compounds produced 16 compounds, which were all identified to be hydrocarbons except THF and Me-THF. The compounds identified were the sum of those obtained from the dual component mixtures. Thus, this mixture contained all the compound shown in Table 24. The reactivity of the pairs of compounds appeared to be independent of each other so long as there were sufficient amounts of reactants.

TABLE 24

|  | F | F/Ac | F/Ace | F/bu | Gu/Ac | Gu/Ace | Gu/Bu | F/Ac/Ace/Bu/Gu |
|---|---|---|---|---|---|---|---|---|
| Methanol |  |  |  |  | x | x | x | x |
| Hexane | x | x |  |  |  |  |  | x |
| Cyclohexane |  | x |  |  | x | x |  | x |
| Octane |  | x | x | x |  |  |  | x |
| Benzene |  |  |  |  | x | x | x | x |
| 2-Methyl-Octane |  |  |  |  |  | x |  | x |
| Toluene |  |  |  |  | x | x | x | x |
| 3-Methyl-Nonane |  |  |  |  |  |  | x | x |
| Xylene |  |  |  |  | x | x | x | x |
| THF | x |  | x |  |  |  |  | x |
| Methyl-THF | x |  | x |  |  |  |  | x |
| Ethylbenzene |  |  |  |  | x |  |  | x |
| Ethylcyclohexane |  |  |  |  | x |  |  | x |
| Proylcyclohexane |  |  |  |  |  | x |  | x |
| Propylbenzene |  |  |  |  |  | x |  | x |
| Butylbenzene |  |  |  |  |  |  | x | x |

Aqueous Phase HDO of Aqueous Phase Pyrolysis Oils

The AQHDO of the biomass pyrolysis oils produced twice the number of compounds detected from the above five compounds. The missing compounds seem to suggest the presence of higher molecular weight hydrocarbons in the AQHDO. The identity of these products was not determined. Attempts to quantify the components of the aqueous phase pyrolysis oil only accounted for 45% of the total carbon in this mixture, and thus it is not surprising that more compounds were produced from the AQHDO of pyrolysis oil. However, the procedure seems to be effective because after the AQHDO, the water content of the aqueous layer was 99.5% as determined by Karl Fischer titration.

Discussion

The results of the AQHDO of the various compounds clearly showed that low molecular weight oxygenates can be hydrodeoxygenated in the aqueous phase to produce a wide range of long chain hydrocarbon compounds. In principle, these are catalytic reactions between unsaturated c ethers (e.g., furan, methylfuran, and anisole) with aldehydes and ketones in a water medium. The driving factor appeared to be a few small molecules such as acetic acid, furfural, 2,3-butanedione, and guaiacol whose reduction products underwent several reactions to produce hydrocarbons of various chain lengths.

The furfural was reduced to furan and methylfuran (ether) that participated in the reaction. The double bonds in furan and methylfuran appeared to be crucial for these reactions. When the furan ring was saturated to THF or the methylfuran saturated to Me-THF, neither reacted with any of the components in the mixture. The role of nickel in this process was therefore to produce the partially reduced compounds that underwent further reactions with other reduced components. If the nickel was too active and produced unsaturated compounds there were no addition reactions and subsequent increases in chain length.

Similarly, acetic acid and other acids did not react with any of the components unless they were either reduced to acetaldehydes or converted to ketones before they underwent any of the addition reactions. When acetone was reduced to propanol, it did not partake in any of the reactions. The reactivity of guaiacol also depended on it being partially reduced to anisole (aryl alkyl ether) before it participated in the reaction. 2,3-butanedione and hydroxyl-2-butanone also did not react until they were converted to butanone.

The RRM appeared to play a very important role in these reactions. When the RRM support was replaced with silica-alumina, none of these reactions were observed and the major products were gases (data not reported). The RRM therefore served as the site for addition and hydrodeoxygenation of the reactants. In the case of acetic acid, the RRM catalyzed the ketonization reaction with the loss of $H_2O$ and $CO_2$. In the reactions of the aldehydes (acetaldehyde) with the ethers (furan, anisole), the presence of $H_2$ and $H_2O$ was important. These reactions involved the nucleophilic addition to the carbon-oxygen double bond catalyzed by the RRM. The addition compound was then hydrodeoxygenated to the subsequent longer carbon chain hydrocarbon. In the case of the furans, both the ring opening and ring saturation occurred on the RRM. However, in the case of anisole, ring opening occurred when carbon chain was C5 or greater in which case it formed an a long chain alkene. The exact sequence of the reactions is not well understood at this time; however, in all cases studied, only one alkyl group was added to the ring, for instance only the ethyl group from acetaldehyde was added to the anisole to form ethylbenzene. Since ethylbenzene was detected in the medium, it is clear that this reaction occurred before the ring saturation and ring opening. This assertion is also supported by the observation that THF, Me-THF, methylcyclohexane or propylcyclohexane once formed did not participate in any further reactions unless in ring opening reactions to form the straight or branched chain alkane products.

The reactions of ketones such as acetone and butanone and higher ketones were also very specific. Acetone never reacted with furan under the reaction conditions; it only reacted with the methylfuran or anisole. Similarly substituted butanones such as 2,3-butanedione and 2-hydroxy butanone did not react with either methylfuran or anisole unless they were converted to butanone before they underwent the reaction. Alcohols did not undergo these reactions.

The addition of aldehydes and ketones to anisole followed by the hydrodeoxygenation resulted in the alkylation of the benzene ring, which is not like the traditional Friedel-Crafts aromatic alkylation reactions. The alkylation of the benzene ring was limited to C2 to C4 aldehydes and ketones, but when C5 and higher aldehydes and ketones were added to the benzene ring, this caused opening of the ring to form long chain alkenes. The aqueous medium was beneficial for the reactions. In the absence of water, there was rapid coking and deactivation of the catalyst especially when the medium was acidic. The coke properties were different from those produced under the aqueous conditions. This observation is similar to the effect of steam on FCC reactions in the hydrocracking processes in the petroleum industry. Clearly these are unique reactions referred to herein as "alkyl addition hydrodeoxygenations" or "alkyl addition hydrodeoxygenating" because in all cases it appeared the straight chain ketone or aldehyde was added to the unsaturated ether ring and then it was saturated, followed by ring opening to form the aliphatic hydrocarbon.

In the reactions of the furans (furan or methylfuran), the number of carbons was conserved and therefore the length of the aliphatic carbon chain produced was always the sum of the carbons in the two reactants. Thus, methylfuran which has five carbons when reacted with butanone will produce alkane with nine carbons. The reactions of anisole did not conserve all the carbons in the subsequent alkane hydrocarbon produced, because the methoxyl carbon atom was lost as methanol and therefore the length of carbon chain was always one less.

Example 7—Flocculation/Coagulation Experiments

Jar test experiments were carried out to compare the effect of reformulated red mud (RFRM) and commercial magnetite (BioMag) as coagulants for wastewater treatment. Two forms of RFRM were tested, i.e., Nexceris red mud (NXRM) and pyrolysis red mud (PYRM). The NXRM was composed of 60 wt % red mud, 30 wt % colloidal alumina, and 10 wt % colloidal silica. The NXRM was calcined using combustion gases, which provided a reducing atmosphere and rendered the NXRM magnetic. The PYRM was pyrolyzed in a reducing atmosphere and was rendered magnetic. Synthetic wastewater (SWW) was used in the experiments. The SWW composition was 100 mg/L kaolin powder and 10 mg/L humic acid in deionized water (DIW). The dosage of coagulant was 1 g/L for all experiments. Parallel experiments were run to investigate the effect of coagulants by themselves on turbidity. As such all coagulant samples were also tested in DIW.

A turbidity meter was calibrated using four standards with turbidities of 10, 20, 100, and 800 Nephelometric Turbidity Units (NTU). The percent error of the turbidity meter was within 4% for all standards (Table 25).

TABLE 25

Turbidity Meter Calibration Verification

| Calibration verification | Turbidity (NTU) | | | |
|---|---|---|---|---|
| Standard | 10 | 20 | 100 | 800 |
| Reading | 10.11 | 20.71 | 102 | 796 |
| Error % | 1.10 | 3.55 | 2.00 | 0.50 |

The test samples were prepared by loading six beakers with 0.5 g coagulant in 500 ml SWW or DIW as follows:

1—NXRM in SWW
2—PYRM in SWW
3—BioMag in SWW
4—NXRM in DIW
5—PYRM in DIW
6—BioMag in DIW

The jar test equipment was programmed to run in a sequential mode (standard mode of operation for turbidity test). The sequence consisted of three steps: 1) 3 minutes of stirring at 300 rpm, 2) 15 minutes of stirring at 30 rpm, and 3) 30 minutes of settling time. Turbidity of samples were measured at four stages of the experiment: 1) turbidity of SWW and DIW prior to addition of the coagulant, 2) turbidity immediately after addition of the coagulant and before step 1 of the programmed sequence, 3) turbidity after the final step 3 of the programmed sequence, and 4) turbidity after an additional 60 minutes of settling time (total settling time of 90 minutes). Three turbidity measurements of each sample were taken and recorded at the defined stage, and the average and standard deviation of the measurements of each sample at each stage were calculated. Table 26 shows the turbidity results.

TABLE 26

Turbidity of various wastewater mixtures and references.

| Sample | Turbidity (NTU) | | | | |
|---|---|---|---|---|---|
| | T 1 | T 2 | T 3 | Average | Std. Dev. |
| DIW | 0.12 | 0.10 | 0.10 | 0.11 | 0.01 |
| SWW | 93.60 | 93.40 | 93.80 | 93.60 | 0.20 |
| 1: NXRM in SWW - Initial | 90.90 | 92.00 | 90.60 | 91.17 | 0.74 |
| 2: PYRM in SWW - Initial | 93.80 | 95.80 | 94.80 | 94.80 | 1.00 |
| 3: BioMag in SWW - Initial | 139.00 | 134.00 | 131.00 | 134.67 | 4.04 |
| 4: NXRM in DIW - Initial | 3.31 | 3.23 | 3.42 | 3.32 | 0.10 |
| 5: PYRM in DIW- Initial | 3.25 | 3.08 | 3.35 | 3.23 | 0.14 |
| 6: BioMag in DIW- Initial | 28.80 | 28.90 | 29.10 | 28.93 | 0.15 |
| 1: NXRM in SWW - After (30 min) | 93.80 | 95.10 | 94.80 | 94.57 | 0.68 |
| 2: PYRM in SWW - After (30 min) | 94.00 | 95.40 | 95.70 | 95.03 | 0.91 |
| 3: BioMag in SWW - After (30 min) | 102.00 | 101.00 | 101.00 | 101.33 | 0.58 |
| 4: NXRM in DIW - After (30 min) | 4.57 | 4.59 | 4.51 | 4.56 | 0.04 |
| 5: PYRM in DIW- After (30 min) | 2.88 | 2.87 | 2.67 | 2.81 | 0.12 |
| 6: BioMag in DIW- After (30 min) | 4.52 | 4.71 | 4.64 | 4.62 | 0.10 |
| 1: NXRM in SWW - After (90 min) | 84.70 | 85.00 | 85.50 | 85.07 | 0.40 |
| 2: PYRM in SWW - After (90 min) | 88.80 | 88.50 | 88.50 | 88.60 | 0.17 |
| 3: BioMag in SWW - After (90 min) | 93.00 | 92.40 | 92.50 | 92.63 | 0.32 |
| 4: NXRM in DIW - After (90 min) | 4.06 | 4.19 | 4.11 | 4.12 | 0.07 |
| 5: PYRM in DIW- After (90 min) | 2.73 | 2.65 | 2.48 | 2.62 | 0.13 |
| 6: BioMag in DIW- After (90 min) | 3.30 | 3.35 | 3.37 | 3.34 | 0.04 |

The turbidity results after 30 minutes of settling time and after 90 minutes of settling time (Table 26) clearly showed that both Nexceris red mud (NXRM) and pyrolysis red mud (PYRM), were more effective than the commercial coagulant (BioMag) in reducing the turbidity of the synthetic wastewater without addition of any external flocculant/coagulant. After 30 minutes of settling time, the RFRM showed about 6% improvement in turbidity compared to the BioMag. After 90 minutes of settling time, the RFRM again showed 8% improvement compared to the BioMag. The better performance of the RFRM in reducing the synthetic wastewater turbidity may be attributed to the presence of both aluminum and iron compounds in the RFRM, which could have aided in the flocculation process.

The effect of coagulant addition on pH of synthetic wastewater and deionized water was also tested. The pH of treated wastewater before discharge into the environment is very important to meet USA Environmental Protection Agency (EPA) regulations. Thus, evaluation of new coagulants should produce discharged wastewater that has a pH which meets EPA rules. In this series of experiments, the pH of the synthetic wastewater was measured before and after the addition of Nexceris (NXRM), pyrolysis red mud (PYRM), and the commercial coagulant (BioMag). As with the turbidity test above, the dosage of coagulant in the synthetic wastewater was 1 g/L. Three pH measurements of each sample were taken and recorded, and the average and standard deviation of the measurements of each sample were calculated.

TABLE 27 pH of various wastewater mixtures and references

| Sample | T 1 | T 2 | T 3 | Average | Std. Dev. |
|---|---|---|---|---|---|
| DIW | 7.09 | 6.81 | 7.54 | 7.15 | 0.37 |
| SWW | 7.98 | 8.01 | 7.64 | 7.88 | 0.21 |
| 1: NXRM in SWW | 6.82 | 7.20 | 6.90 | 6.97 | 0.20 |
| 2: PYRM in SWW | 6.79 | 6.00 | 6.66 | 6.48 | 0.42 |
| 3: BioMag in SWW | 6.89 | 7.27 | 7.15 | 7.10 | 0.19 |
| 4: NXRM in DIW | 7.29 | 7.20 | 7.16 | 7.22 | 0.07 |
| 5: PYRM in DIW | 6.72 | 6.61 | 7.12 | 6.82 | 0.27 |
| 6: BioMag in DIW | 7.38 | 7.33 | 7.25 | 7.32 | 0.07 |

The addition of the RFRM did not have any negative impact on the pH of the treated samples (Table 27). In all cases after addition of the 1.0 g/l of the RFRM, the change in pH was not significant. Thus, the wastewater after treatment with RFRM may meet the pH specifications for discharge into the environment.

As the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

References (the contents of which are incorporated herein by reference in their entirety)

[1] Z. Xinghua, W. Tiejun, M. Longlong, W. Chuangzhi, Fuel 89 (2010) 2697-2702.
[2] X. Zhang, L. Chen, W. Kong, T. Wang, Q. Zhang, J. Long, Y. Xu, L. Ma, Energy 84 (2015) 83-90.
[3] R. Gavlak, R. Horneck, R. O. Miller, J. Kotuby-Amacher, Soil, Plant Water Ref. Methods West. Reg. 1 (2000) 129-134.
[4] H. Jahromi, F. A. Agblevor, Energy 141 (2017) 2186-2195.
[5] X. Zhang, T. Wang, L. Ma, Q. Zhang, T. Jiang, Bioresour. Technol. 127 (2013) 306-311.
[6] J. Wiley, K. Hepburn, O. Levenspiel, Chemical Reaction Engineering, 1964.
[7] I. Coronado, M. Stekrova, L. Garcia Moreno, M. Reinikainen, P. Simell, R. Karinen, J. Lehtonen, Biomass and Bioenergy 106 (2017) 29-37.
[8] S. Chenna, R. Banerjee, P. A. Crozier, Chem. Cat. Chem., 3 (2011) 1051-1059.
[9] Q. Jeangros, T. W. Hansen, J. B. Wagner, C. D. Damsgaard, R. E. Dunin-Borkowski, C. Hebert, J. Van Herle, A. Hessler-Wyser, J. Mater. Sci. 48 (2013) 2893-2907
[10] J. Pu, K. Nishikado, N. Wang, T. T. Nguyen, T. Maki, E. W. Qian, Appl. Catal. B Environ. 224 (2018) 69-79.
[11] C. Boscagli, C. Yang, A. Welle, W. Wang, S. Behrens, K. Raffelt, J. D. Grunwaldt, Appl. Catal. A Gen. 544 (2017) 161-172.
[12] S. Sushil, V. S. Batra, Appl. Catal. B. Environ. 81 (2008) 64-77.
[13] B. K. Yathavan, F. A. Agblevor, Energy and Fuels 27 (2013) 6858-6865.
[14] S. Danaci, L. Protasova, J. Lefevere, L. Bedel, R. Guilet, P. Marty, Catal. Today 273 (2016) 234-243.
[15] N. Joshi, A. Lawal, Chem. Eng. Sci. 74 (2012) 1-8.
[16] H. Wan, R. V. Chaudhari, B. Subramaniam, Top. Catal. 55 (2012) 129-139.
[17] Asphaug S. Catalytic hydrodeoxygenation of bio-oils with supported MoP-catalysts. Thesis. Norwegian Universit.
[18] J. Wildschut, I. Melian-Cabrera, H. J. Heeres, Appl. Catal. B Environ. 99 (2010) 298-306.
[19] P. M. Mortensen, J. Grunwaldt, P. A. Jensen, K. G. Knudsen, A. D. Jensen, "Applied Catal. A, Gen. 407 (2011) 1-19.
[20] K. Li, R. Wang, J. Chen, Energy and Fuels 25 (2011) 854-863.
[21] C. Sepulveda, R. Garcia, N. Escalona, D. *Laurenti*, L. Massin, M. Vrinat, Catal. Letters 141 (2011) 987-995.
[22] T.-R. Viljava, R. S. Komulainen, A. O. I. Krause, Catal. Today 60 (2000) 83-92.
[23] N. T. T. Tran, Y. Uemura, S. Chowdhury, A. Ramli, Appl. Catal. A Gen. 512 (2016) 93-100.
[24] Q. Lai, C. Zhang, J. H. Holles, Appl. Catal. A Gen. 528 (2016) 1-13.
[25] Z. Cai, F. Wang, X. Zhang, R. Ahishakiye, Y. Xie, Y. Shen, Mol. Catal. 441 (2017) 28-34.
[26] A. Aqsha, L. Katta, N. Mahinpey, Catal. Letters 145 (2015) 1351-1363.
[27] M. D. Skoglund, C. L. Jackson, K. J. Mckim, H. J. Olson, S. Sabirzyanov, J. H. Holles, "Applied Catal. A, Gen. 467 (2013) 355-362.
[28] X. Zhu, L. L. Lobban, R. G. Mallinson, D. E. Resasco, J. Catal. 281 (2011) 21-29.
[29] B. K. Yathavan, F. A. Agblevor, Catalytic pyrolysis of pinyon-juniper using red mud and HZSM-5, Energy Fuels.
[30] O. D. Mante, F. A. Agblevor, Catalytic pyrolysis for the production of refinery-ready biocrude oils from six
[31] Z. Xinghua, W. Tiejun, M. Longlong, W. Chuangzhi, Aqueous-phase catalytic process for production of pentane from furfural over nickel-based catalysts, Fuel. 89 (2010) 2697-2702.
[32] X. Zhang, L. Chen, W. Kong, T. Wang, Q. Zhang, J. Long, Y. Xu, L. Ma, Upgrading of bio-oil to boiler fuel by catalytic hydrotreatment and esterification in an efficient process, Energy. 84 (2015) 83-90.
[33] R. Gavlak, R. Horneck, R. O. Miller, J. Kotuby-Amacher, Soil, plant and water reference methods for the western region, 3rd Ed. (2005) 1679-169.
[34] S. V. Vassilev, D. Baxter, L. K. Andersen, C. G. Vassileva, An overview of the chemical composition of biomass, Fuel. 89 (2010) 913-933.
[35] S. K. Tanneru, P. H. Steele, Direct hydrocracking of oxidized bio-oil to hydrocarbons, Fuel. 154 (2015) 268-274.

[36] T. S. Kim, S. Oh, J. Y. Kim, I. G. Choi, J. W. Choi, Study on the hydrodeoxygenative upgrading of crude bio-oil produced from woody biomass by fast pyrolysis, Energy. 68 (2014) 437-443.

[37] H. Habazaki, M. Yamasaki, B.-P. Zhang, A. Kawashima, S. Kohno, T. Takai, K. Hashimoto, Co-methanation of carbon monoxide and carbon dioxide on supported nickel and cobalt catalysts prepared from amorphous alloys, Appl. Catal. A. Gen. 172 (1998) 131-140.

[38] W. Wang, W. Chu, N. Wang, W. Yang, C. Jiang, Mesoporous nickel catalyst supported on multi-walled carbon nanotubes for carbon dioxide methanation, Int. J. Hydrogen Energy. 41 (2016) 967-975.

[39] B. Nematollahi, M. Rezaei, E. N. Lay, Selective methanation of carbon monoxide in hydrogen rich stream over Ni/CeO2 nanocatalysts, J. Rare Earths. 33 (2015) 619-628.

[40] O. D. Mante, F. A. Agblevor, S. T. Oyama, R. McClung, The effect of hydrothermal treatment of FCC catalysts and ZSM-5 additives in catalytic conversion of biomass, Appl. Catal. A. Gen. 445-446 (2012) 312-320.

[41] G. D. Strahan, C. A. Mullen, A. A. Boateng, Characterizing biomass fast pyrolysis oils by 13C NMR and chemometric analysis, Energy Fuels. 25 (2011) 5452-5461.

[42] H. Jahromi, F. A. Agblevor, Upgrading of pinyon-juniper catalytic pyrolysis oil via hydrodeoxygenation, Energy. 141 (2017) 2186-2195.

[43] S. Kadarwati, S. Oudenhoven, M. Schagen, X. Hu, M. Garcia-Perez, S. Kersten, C. Z. Li, R. Westerhof, Polymerization and cracking during the hydrotreatment of bio-oil and heavy fractions obtained by fractional condensation using Ru/C and NiMo/Al2O3 catalyst, J. Anal. Appl. Pyrolysis. 118 (2016) 136-143.

[44] N. I. Bento, P. S. C. Santos, T. E. de Souza, L. C. A. Oliveira, C. S. Castro, Composites based on PET and red mud residues as catalyst for organic removal from water, J. Hazard. Mater. 314 (2016) 304-311.

[45] X. Zhang, T. Wang, L. Ma, Q. Zhang, T. Jiang, Hydrotreatment of bio-oil over Ni-based catalyst, Biores. Technol. 127 (2013) 306-311.

The invention claimed is:

1. A composition comprising:
    dried and calcined catalytic particles comprising colloidally-dispersed red mud bound by colloidally-dispersed alumina, wherein the dried and calcined catalytic particles comprise at least about 50% colloidally-dispersed red mud by weight and about 10% to about 30% colloidally-dispersed alumina by weight, wherein the dried and calcined catalytic particles have a specific surface area of greater than 30 m²/g.

2. The composition of claim 1, wherein the one or more additives further comprising nickel deposited onto the surface of the particles.

3. The composition of claim 2, wherein the nickel comprises up to and including about 40% of the particles by weight.

4. The composition of claim 2, wherein the particles comprise dried, calcined, and reduced particles.

5. The composition of claim 2, wherein the particles have a mean particle size of about 50 micron to about 250 micron.

6. The composition of claim 2, wherein the particles have a specific surface area of about 50 m²/g to about 80 m²/g.

7. The composition of claim 1, wherein the particles comprise a dried, extruded, and calcined particle.

8. The composition of claim 7, wherein the particles have a mean particle size of about 1 mm to about 5 mm.

9. The composition of claim 7, wherein the particles have a specific surface area of about 30 m²/g to about 65 m²/g.

10. The composition of claim 8, further comprising colloidally-dispersed silica.

11. The composition of claim 10, wherein the particles comprise spray dried and agglomerated particles.

12. The composition of claim 11, wherein the particles have a mean particle size of about 250 micron to about 650 micron.

13. The composition of claim 8, further comprising colloidally-dispersed calcium oxide.

14. The composition of claim 7, further comprising colloidally-dispersed zirconia.

15. The composition of claim 1, wherein the particles are calcined at a temperature of about 600° C. to about 800° C.

16. A method of making the composition of claim 1, the method comprising:
    mixing a slurry of red mud and one or more additives;
    drying the mixture at a first temperature; and
    calcining the dried mixture at a second temperature higher than the first temperature to form dried and calcined catalytic particles comprising red mud and the one or more additives.

17. The method of claim 16, wherein the second temperature is about 600° C. to about 800° C.

18. The method of claim 16, further comprising reducing the dried and calcined catalytic particles in a reducing atmosphere.

19. The method of claim 18, wherein the reducing atmosphere comprises 10% hydrogen and 90% nitrogen by volume and the particles are heated to about 450° C.

20. A method of hydrotreating a pyrolysis oil, the method comprising:
    providing a pyrolysis oil; and
    mixing the pyrolysis oil with a catalyst comprising the composition of claim 1.

21. The method of claim 20, wherein the hydrotreating comprises hydrodeoxygenating, alkyl addition, or alkyl addition hydrodeoxygenating and the catalyst comprises the composition of claim 2.

22. The method of claim 20, further comprising:
    regenerating the catalyst in a hydrogen-containing atmosphere at about 400° C. to about 500° C.; and
    reusing the regenerated catalyst during hydrotreating.

23. The method of claim 22, further comprising:
    reducing the regenerated catalyst prior to reusing the regenerated catalyst.

24. A method of pyrolysis, the method comprising:
    feeding a catalyst comprising the composition of claim 1 to a reactor and heating the catalyst;
    introducing a feedstock into the reactor; and
    pyrolyzing the feedstock and thereby producing pyrolysis products.

25. A method of clarifying wastewater, the method comprising:
    adding a composition of claim 1 to the wastewater, wherein the composition is magnetic;
    allowing floc to form with the composition; and
    removing at least a portion of the floc from the wastewater.

26. The method of claim 25, wherein the composition has been calcined in a reducing atmosphere.

* * * * *